(12) United States Patent
Hippmann et al.

(10) Patent No.: US 9,624,378 B2
(45) Date of Patent: Apr. 18, 2017

(54) COATED METAL PIGMENTS, METHOD FOR THE PRODUCTION AND USE THEREOF, COATING AGENT AND ARTICLE

(71) Applicant: Eckart GmbH, Hartenstein (DE)

(72) Inventors: Frank Hippmann, Hartenstein (DE); Sebastian Hoefener, Nuremberg (DE); Oliver Struck, Henfenfeld (DE); Oliver Bedford, Ober-Ramstadt (DE); Dirk Schumacher, Auerbach (DE)

(73) Assignee: ECKART GMBH, Hartenstein (DE)

( * ) Notice: Subject to any disclaimer, the term of this patent is extended or adjusted under 35 U.S.C. 154(b) by 0 days.

(21) Appl. No.: 15/103,484

(22) PCT Filed: Dec. 11, 2014

(86) PCT No.: PCT/EP2014/077443
§ 371 (c)(1),
(2) Date: Jun. 10, 2016

(87) PCT Pub. No.: WO2015/086771
PCT Pub. Date: Jun. 18, 2015

(65) Prior Publication Data
US 2016/0304721 A1    Oct. 20, 2016

(30) Foreign Application Priority Data

Dec. 11, 2013 (DE) .................. 10 2013 113 885

(51) Int. Cl.
| | | |
|---|---|---|
| *C09C 3/12* | (2006.01) | |
| *C09C 3/06* | (2006.01) | |
| *C09C 1/64* | (2006.01) | |
| *C09C 1/62* | (2006.01) | |
| *C09D 5/03* | (2006.01) | |
| *C09D 7/12* | (2006.01) | |

(52) U.S. Cl.
CPC .................. *C09C 3/12* (2013.01); *C09C 1/62* (2013.01); *C09C 1/648* (2013.01); *C09C 3/063* (2013.01); *C09D 5/035* (2013.01); *C09D 7/1225* (2013.01); *C01P 2004/20* (2013.01); *C01P 2004/22* (2013.01); *C01P 2004/24* (2013.01); *C01P 2004/54* (2013.01)

(58) Field of Classification Search
CPC .. C09C 3/13; C09C 1/62; C09C 3/063; C09D 7/1225; C09D 5/035
See application file for complete search history.

(56) References Cited

U.S. PATENT DOCUMENTS

| | | | |
|---|---|---|---|
| 5,629,400 A | 5/1997 | Standke et al. | |
| 5,679,147 A | 10/1997 | Standke et al. | |
| 5,808,125 A | 9/1998 | Standke et al. | |
| 5,964,936 A | 10/1999 | Reisser | |
| 6,176,918 B1 * | 1/2001 | Glausch ................. | A61Q 1/02 106/415 |
| 6,645,286 B2 | 11/2003 | Ostertag et al. | |
| 7,172,812 B2 | 2/2007 | Greiwe et al. | |
| 7,745,003 B2 | 6/2010 | Hennemann et al. | |
| 8,163,079 B2 | 4/2012 | Proelss et al. | |
| 8,304,077 B2 * | 11/2012 | Bubat .................. | C09C 1/0015 106/272 |
| 8,697,776 B2 | 4/2014 | Schumacher et al. | |
| 8,709,145 B2 | 4/2014 | Maul et al. | |
| 8,709,146 B2 | 4/2014 | Schlegl et al. | |
| 9,051,471 B2 | 6/2015 | Gruner et al. | |
| 2002/0169244 A1 | 11/2002 | Ostertag et al. | |
| 2006/0154072 A1 * | 7/2006 | Schlossman ........... | A61K 8/25 428/405 |
| 2007/0199478 A1 | 8/2007 | Schlegl et al. | |
| 2010/0047199 A1 | 2/2010 | Trummer et al. | |
| 2011/0160389 A1 | 6/2011 | Bubat et al. | |
| 2013/0058988 A1 | 3/2013 | Winkelmann et al. | |
| 2013/0164529 A1 | 6/2013 | Yu et al. | |
| 2014/0050768 A1 | 2/2014 | Struck et al. | |

FOREIGN PATENT DOCUMENTS

| | | |
|---|---|---|
| DE | 102004006145 A1 | 8/2005 |
| DE | 102008031901 A1 | 1/2010 |
| DE | 102009023157 A1 | 12/2010 |
| DE | 102010020507 A1 | 11/2011 |
| DE | 102011015338 A1 | 10/2012 |
| DE | 102012112092 A1 | 7/2013 |
| EP | 0716127 A2 | 6/1996 |
| EP | 0716128 A2 | 6/1996 |
| EP | 1251152 A1 | 10/2002 |
| EP | 1613702 B1 | 10/2009 |
| EP | 2128203 A1 | 12/2009 |
| EP | 2102294 B1 | 6/2012 |
| WO | 9638505 A1 | 12/1996 |
| WO | 9813426 A1 | 4/1998 |
| WO | 9957204 A1 | 11/1999 |
| WO | 03043567 A2 | 5/2003 |
| WO | 2004087816 A2 | 10/2004 |
| WO | 2005118722 A1 | 12/2005 |
| WO | 2007017195 A2 | 2/2007 |
| WO | 2008077612 A2 | 7/2008 |
| WO | 2008095697 A1 | 8/2008 |
| WO | 2009144005 A1 | 12/2009 |
| WO | 2009149834 A2 | 12/2009 |
| WO | 2009152941 A2 | 12/2009 |
| WO | 2012130680 A1 | 10/2012 |

OTHER PUBLICATIONS

Beari, F. et al, "Organofunctional alkoxysilanes in dilute aqueous solution: New accounts on the dynamic structural mutability", Journal of Organometallic Chemistry, 2001, pp. 208-216, vol. 625.

* cited by examiner

*Primary Examiner* — Robert Harlan
(74) *Attorney, Agent, or Firm* — The Webb Law Firm

(57) ABSTRACT

The present invention concerns coated metal pigments, the production thereof, and the use thereof. The present invention also concerns coating agents containing the aforementioned metal pigments, as well as objects coated with such coating agents.

31 Claims, 2 Drawing Sheets

COATED METAL PIGMENTS, METHOD FOR THE PRODUCTION AND USE THEREOF, COATING AGENT AND ARTICLE

CROSS-REFERENCE TO RELATED APPLICATIONS

This application is the United States national phase of International Application No. PCT/EP2014/077443 filed Dec. 11, 2014, and claims priority to German Patent Application No. 10 2013 113 885.3 filed Dec. 11, 2013, the disclosures of each of which are hereby incorporated by reference in their entireties.

BACKGROUND OF THE INVENTION

Field of the Invention

The invention concerns metal pigments with a metallic substrate and coating, as well as methods for the production thereof and use thereof. The invention further concerns coating agents comprising such metal pigments, as well as coated objects. The invention also concerns the use of special polysiloxanes for modifying various properties of coated metal pigments.

Description of Related Art

WO 1999/057204 A2 concerns effect pigments coated with surface modifying agents in which the starting pigment has a layer with at least one reactive surface modifying agent.

US 2002/0169244 A1 concerns soft iron effect pigments with a metallic luster that are obtained by means of grinding reduced carbonyl iron powder. These pigments are passivated during or after grinding.

WO 2004/087816 A2 and WO 2008/077612 A2 concern specific aluminum effect pigments that are characterized by outstanding optical properties. The pigments can be provided with an inhibiting or anti-corrosion layer.

WO 2008/095697 A2 concerns metal effect pigments with a surrounding homogeneous synthetic resin coating in which the synthetic resin coating comprises polyacrylate and/or polymethacrylate, as well as organofunctional silane.

WO 2009/144005 A1 concerns special iron effect pigments characterized by their special optical properties. In this case, an inhibiting and/or anti-corrosion layer can be applied.

WO 2009/149834 A2 concerns a mixture of copper-containing metal effect pigments with a cellulose derivative and/or at least one additive having antioxidant and/or radical-inhibiting properties. In this case, the copper-containing metal effect pigments can be provided with a surrounding anti-corrosion layer.

WO 2012/130680 A1 concerns copper-containing metal pigments, said copper-containing metal pigments having at least one surrounding metal oxide layer and at least one surrounding chemically non-reactive plastic layer.

SUMMARY OF THE INVENTION

In some examples, there is provided a metal pigment comprising a metallic substrate and coating, wherein the coating comprises at least one first coating layer surrounding the metal pigment comprising at least one metal oxide, and at least one second coating layer comprising at least one heteropolysiloxane, wherein the term metal oxide comprises metal oxides, oxide hydrates and hydroxides, wherein the at least one heteropolysiloxane-comprises at least one aminosilane component and at least one silane component selected from the group consisting of alkylsilanes, vinylsilanes, arylsilanes and mixtures thereof, wherein the heteropolysiloxane is applied in precondensed form to the at least one first surrounding coating layer, and wherein the heteropolysiloxane is the outermost coating layer of the metal pigment.

In some examples, there is provided a method for the production of metal pigments with a metallic substrate and coating, wherein the method comprises: provision of an optionally precoated metal pigment; production of at least one first coating layer surrounding the metal pigment, wherein the at least one first coating layer comprises at least one metal oxide on the optionally precoated metal pigment; and application of at least one second coating layer comprising at least one precoated heteropolysiloxane to the at least one first coating layer comprising at least one metal oxide, wherein the term metal oxide comprises metal oxides, oxide hydrates and hydroxides, wherein a coating layer comprising at least one precoated heteropolysiloxane constitutes the outermost coating layer of the metal pigment, and wherein the at least one precondensed heteropolysiloxane comprises at least one aminosilane component and at least one silane component selected from the group consisting of alkylsilanes, vinylsilanes, arylsilanes, and mixtures thereof.

BRIEF DESCRIPTION OF THE DRAWINGS

The foregoing summary, as well as the detailed description, will be better understood when read in conjunction with the appended drawings. The present invention is described herein in greater detail using an embodiment and associated drawings. In the drawings.

DETAILED DESCRIPTION

Figure 1:
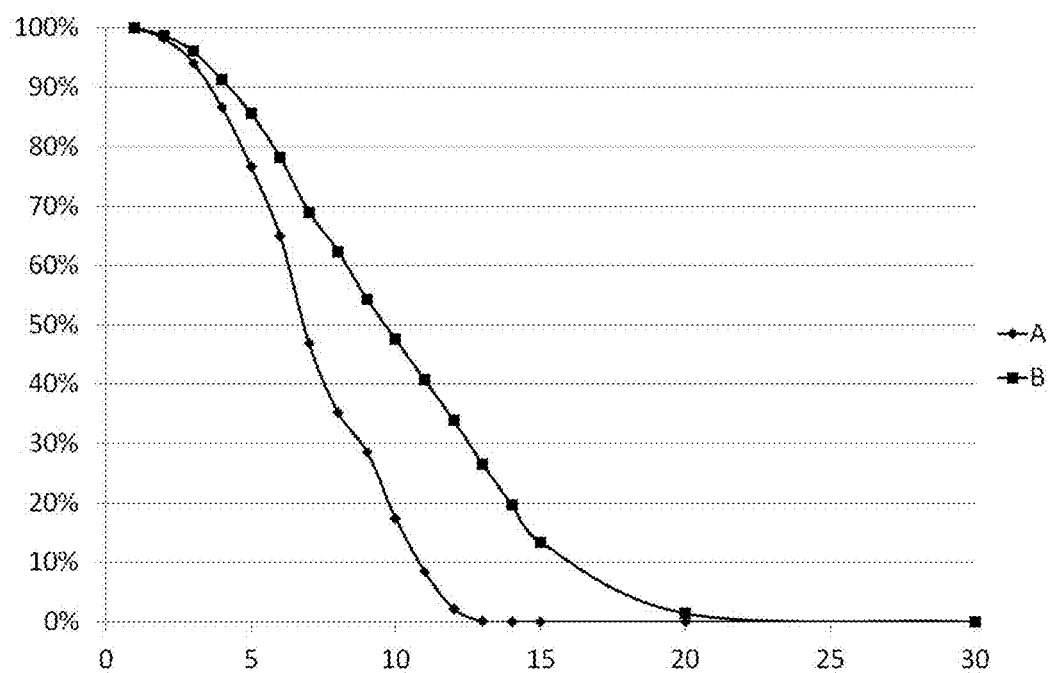
FIG. 1 shows the drying curves of a coated metal powder according to the invention referring to example 3-1 (A) and comparative example 3-2 (B), as described in application example 1. Here, the weight loss of the pigments is plotted against drying time.

Although the aforementioned coatings already provide properties such as improved corrosion resistance, chemical stability, and/or mechanical stability compared to conventional coated or even uncoated pigments, there is still a need for further improvement in stability. As the stability of pigments such as aluminum pigments can be strongly affected, for example, by other paint components such as colored pigments or by high pH values, it would be advantageous to ensure greater stability with respect to such conditions in order to allow simple formulation of metal effect coatings.

An object of the present invention is therefore to provide metal pigments showing improved stability, even under very aggressive conditions such as high pH. It is also an object of the present invention to provide methods for the production thereof as well as uses thereof.

The metal effect pigments available on the market already show outstanding lightness flop. However, there is a general need for further improvement in optical properties. A further object of the present invention is therefore to provide metal pigments characterized by improved optical properties, particularly improvement in the property of lightness flop. In this case, other fundamental application-specific properties such as condensation resistance should not be impaired. It is also an object of the present invention to provide methods for the production of such pigments, as well as uses thereof.

Metal effect pigments produced by means of physical vapor deposition in PVD processes, referred to as PVD metal pigments or PVD pigments, show the problem of a very strong tendency to agglomerate. For example, this has the effect of allowing such pigment pastes to be concentrated only to a certain degree. This makes their storage and transportation more difficult, makes rewetting with other solvents complex or impossible, and in the best case, PVD metal pigment powders not showing strong agglomeration of the PVD metal pigments can be obtained only by disproportionately complex methods.

A special object of the present invention is therefore to provide readily obtainable PVD pigments that show a sharply reduced tendency or no tendency at all to agglomerate, even at higher concentrations or when dried out.

Metal effect pigments can be successfully used in powder coatings, but it is particularly important in the case of powder coatings to ensure good integration into the coating system. For example, powder coatings are often applied in the form of economical single-layer coatings in order to obtain a highly resistant coating. Accordingly, favorable integration must be ensured if only in order to protect pigments from aggressive external conditions.

A particular object of the present invention is therefore to provide ferromagnetic pigments characterized by particularly favorable application properties and orientation of the pigments when used in a powder coating.

The objectives of the invention are achieved by means of the objects, methods, and applications specified in the claims and aspects.

The object of the invention is achieved by providing a metal pigment having a metallic substrate and coating, wherein the coating comprises at least one first coating layer surrounding the metal pigment containing at least one metal oxide, and
at least one second coating layer containing at least one heteropolysiloxane, wherein the term metal oxide also includes oxide hydrates and hydroxides,
wherein the at least one heteropolysiloxane has at least one aminosilane component and at least one silane component selected from the group composed of alkylsilanes, vinylsilanes, and arylsilanes, and
wherein the heteropolysiloxane is applied in precondensed form to the at least one first surrounding coating layer.

According to a preferred embodiment, the at least one heteropolysiloxane comprises at least one aminosilane and at least one alkylsilane. In further embodiments, the aforementioned metal pigments should preferably be flaky metal pigments. Flaky metal pigments can also be referred to as metal effect pigments.

The object of the invention is further achieved by providing a method for the production of metal pigments with a metallic substrate and coating, said method comprising the following steps:
provision of an optionally precoated metal pigment,
production of at least one first coating layer surrounding the metal pigment, wherein the at least one first coating layer comprises at least one metal oxide on the optionally precoated metal pigment, and
application of at least one second coating layer comprising at least one precondensed heteropolysiloxane to the at least one first coating layer having at least one metal oxide, wherein the term metal oxide also includes oxide hydrates and hydroxides, and wherein the at least one heteropolysiloxane has at least one aminosilane component and at least one silane component selected from the group of alkylsilanes, vinylsilanes, and arylsilanes.

The optionally precoated metal pigment is preferably flaky.

The present invention also concerns the use of at least one precondensed heteropolysiloxane for providing improvements in the application properties of metal pigments selected from the group composed of improving the stability of metal pigments, improving the applicability and orientability of metal pigments in the wet coating or powder coating, reducing the tendency to agglomerate of metal pigments, improving the orientation of metal pigments in coating systems, and combinations thereof, wherein the metal pigments have at least one first coating layer comprising at least one metal oxide, and wherein the heteropolysiloxane has at least one aminosilane component and at least one silane component selected from the group composed of alkylsilanes, vinylsilanes, and arylsilanes.

The heteropolysiloxane preferably contains at least one aminosilane and at least one alkylsilane. It is further preferred that the aminosilane and alkylsilane be selected according to one of aspects 9 to 19.

The present invention also concerns the use of a coated metal pigment according to the invention in a cosmetic, a plastic or a coating agent.

The present invention also concerns a coating agent comprising coated metal pigments according to the invention.

The present invention also concerns an object comprising metal pigments according to the invention or a coating agent according to the invention.

The present invention concerns metal pigments with the above-mentioned coating.

It is particularly preferred in this case that the coated metal pigment be flaky. In many cases, for example, it is the coating that facilitates or allows the desired orientation in a coating agent.

The term "metal pigment having a metallic substrate" within the meaning of the present invention includes spherical and flaky metal-containing particles, unless otherwise specified. In particular, this includes particles in which at least one metal layer is applied to a nonmetallic substrate and particles composed essentially or preferably completely of at least one metal or at least one metal alloy.

The term "metal effect pigment" within the meaning of the present invention refers to flaky metal-containing particles. Flaky metal-containing particles also include flaky particles in which at least one metal layer is applied to a nonmetallic flaky substrate and flaky particles composed essentially or preferably completely of at least one metal or at least one metal alloy. Unless otherwise specified, the terms "metal pigment" and "metal effect pigment" in the present invention also include a plurality of pigments, particularly if the value pertaining thereto constitutes a statistical value that can only be obtained in a larger number of particles in averaged form. Unless specific indications are given with respect to such averaging, the corresponding averaged value refers to the arithmetic average of the values in question. The term "nonmetallic substrate" within the meaning of the present invention includes, for example, polymer substrates, glass substrates such as glass flakes, and pure metal oxide substrates, for example silicon oxide flakes, aluminum oxide flakes, or titanium oxide flakes. Natural or synthetic mica flakes can also be used as nonmetallic substrates. In particular, however, it is preferred that "metal pigments" and "metal effect pigments" according to the invention be composed essentially or preferably completely of metal or metal alloys.

In further embodiments, it is particularly preferred that the metallic substrate be flaky. The term "metal core" within the meaning of the present invention refers to metallic substrates composed essentially, and preferably completely, of metal or metal alloys.

The term "flaky" within the meaning of the present invention signifies that the particle in question is significantly smaller in one dimension compared to the other two. This means, for example, that the average height of the particle is at least 10 times smaller than the average width and length. The dimensions of the pigment are determined by methods commonly known to the person skilled in the art, such as raster electron microscopy. Such pigments show particularly advantageous properties and are the focus of the present invention. For example, a flaky form allows directed reflection of both electromagnetic radiation and visible light. This in turn allows particular optical effects to be achieved. For example, the most uniform plane form possible is found to be advantageous for achieving a particularly high degree of brilliance, because this allows spatially aligned reflection of the pigment to be achieved with only minor accompanying scattering.

In most of the metal pigments according to the invention, optical effects in particular are the main priority, and flaky pigments are therefore preferred. In particular, however, the use of ferromagnetic pigments allows special effects to be achieved, for example by applying a magnetic field, and this allows a subsequent shift and local areas of increased or decreased pigment concentration in partial areas of the applied coating to be obtained.

Surprisingly, it has been found that among other effects, application of the at least one precondensed heteropolysiloxane to the at least one surrounding layer comprising at least one metal oxide layer improves the stability of the pigment coated therewith, particularly its gassing stability.

It is thought that a reaction of the precondensed heteropolysiloxane with the metal oxide component of the surrounding coating takes place, causing the heteropolysiloxane to be anchored to the surface. This bonded heteropolysiloxane appears to form a protective layer that compensates for weak sites in the underlying coating layer containing at least one metal oxide. At the same time, the use of a precondensed heteropolysiloxane allows much simpler methods to be used in applying a specified product to the surface. Surprisingly, it was found that an extremely homogeneous coating can be applied using the precondensed heteropolysiloxanes. Conversely, it was found that the direct use of monomeric silanes in the presence of the metal pigment to be coated results in heterogeneous coating of the pigments.

The pigments according to the invention were found to show properties such as increased chemical stability, increased oxidation stability, and reduced gassing compared to pigments in which monomeric silanes were used for coating instead of precondensed heteropolysiloxanes. The improvement in stability was particularly high with respect to gassing stability.

Precondensed Heteropolysiloxanes According to Variant I

The precondensed heteropolysiloxanes to be used according to the invention can be produced, for example, by mixing of aminoalkylalkoxysilanes of general formula (RI) with alkyltrialkoxysilanes and/or dialkyldialkoxysilanes of general formulae (RII) and (RIII), mixing of this mixture with water, adjustment of the pH of the reaction mixture to a value between 1 and 8, and removal of the alcohols present and/or produced in the reaction. Precondensed heteropolysiloxanes are essentially free of organic solvents. The precondensed heteropolysiloxanes produced in this manner are clear, stable solutions that have a flash point significantly higher than 80° C. and also release essentially no alcohols on dilution with water.

The heteropolysiloxanes to be used according to the invention are therefore preferably water-based organopolysiloxane-containing compounds that are essentially free of organic solvents, have a flash point significantly higher than 80° C., and release essentially no alcohols by hydrolysis on dilution with water.

For example, the precondensed heteropolysiloxanes to be used according to the invention may comprise linear cocondensates of formula (SI)

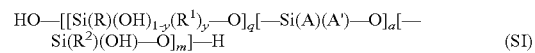

and/or cyclic cocondensates of formula (SII)

(SII)

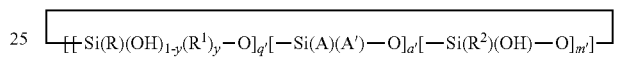

and/or linear condensates of formula (SIII)

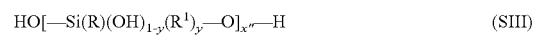

and/or linear condensates of formula (SIV)

and/or linear condensates of formula (SV)

and/or cyclic condensates of formula (SVI)

(SVI)

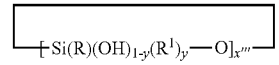

and/or cyclic condensates of formula (SVII)

(SVII)

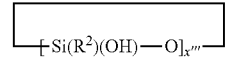

and/or cyclic condensates of formula (SVIII)

(SVIII)

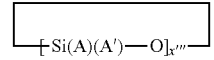

and/or silanols of formula (SIX)

and/or silanols of formula (SX)

and/or silanols of formula (SXI)

wherein the above formulae do not specify any order of the individual silane components within the respective polysiloxane, wherein the R, independently of each other, are selected from aminofunctional organic groups of formula (SXII)

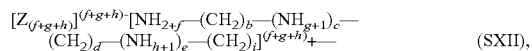  (SXII), wherein $0 \leq b \leq 3$, $0 \leq d \leq 3$, $0 \leq i \leq 3$, $0 \leq f \leq 1$, $0 \leq g \leq 1$, $0 \leq h \leq 1$, $0 \leq c \leq 1$, $0 \leq e \leq 1$, $b+d+i \neq 0$, if $b=0$, then $c=0$, if $d=0$, then $e=0$, if $i=0$, then $e=0$, if $d=i=0$, then $c=0$, and Z is a monovalent inorganic or organic acid radical selected for example from the group composed of chloride, nitrate, formate, and acetate, wherein the $R^1$, independently of each other, are selected from the group composed of methyl and ethyl, the $R^2$, independently of each other, are selected from the group composed of linear, cyclic, and branched alkyl groups with 1 to 8 C atoms, the A, independently of each other, are selected from the group composed of unbranched and branched alkyl groups with 1 to 3 C atoms, the A', independently of each other, are selected from the group composed of unbranched and branched alkyl groups with 1 to 3 C atoms, in each case, independently of each other, $0 \leq y \leq 1$, and q+a+m, q'+a'+m', x" and x''' in each case have an averaged value of at least 4. Here, the x" and x''' of formulae (SIII), (SIV), (SV), (SVI), (SVII) and (SVIII) are considered separately in each case. The ratio of M/Q is preferably between 0 and 2, and more preferably between 0.1 and 2, wherein Q is the total number of moles of the amino-containing silanes according to formula (SIX) and the corresponding silane components contained in the condensates, M is the total number of moles of $M^1$ and $M^2$, $M^1$ is the total number of moles of the silanes according to formula (SX) and the corresponding silane components contained in the condensates, and $M^2$ is the total number of moles of the silanes according to formula (SXI) and the corresponding silane components contained in the condensates. As mentioned above, the aforementioned structures do not specify the order of the silane components contained therein.

In particular, the polysiloxanes used above according to the invention are not limited solely to corresponding block polymers. The averaged values of q+a+m, q'+a'+m', x" and x''' are derived from the arithmetic average of the corresponding compounds.

In further embodiments, it is preferred that $M^2/M^1$ be less than 0.1, and more preferably 0.

Moreover, precondensed heteropolysiloxanes to be used according to the invention can be obtained, for example, by mixing of water-soluble aminoalkylalkoxysilanes of general formula (RI)

$Si(R)(R^1)_y(OR^{1*})_{3-y}$  (RI)

with non-water-soluble alkyltrialkoxysilanes of general formula (RII)

$Si(R^2)(OR^{1**})_3$  (RII)

or non-water-soluble dialkyldialkoxysilanes of general formula (RIII)

$Si(A)(A')(OR^{1***})_2$  (RIII)

or mixtures of non-water-soluble alkyltrialkoxysilanes and dialkyldialkoxysilanes of general formulae (RII) and (RIII), wherein the R, independently of each other, are selected from aminofunctional organic groups according to formula (RIV)

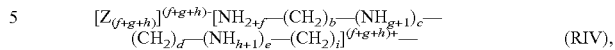  (RIV), wherein $0 \leq b \leq 3$, $0 \leq d \leq 3$, $0 \leq i \leq 3$, $0 \leq f \leq 1$, $0 \leq g \leq 1$, $0 \leq h \leq 1$, $0 \leq c \leq 1$, $0 \leq e \leq 1$, $b+d+i \neq 0$, if $b=0$, then $c=0$, if $d=0$, then $e=0$, if $i=0$, then $e=0$, if $d=i=0$, then $c=0$, and Z is a monovalent inorganic or organic acid radical, the $R^1$, $R^{1*}$, $R^{1}$ and $R^{1*}$, in each case independently of one another, are selected from the group composed of methyl and ethyl, the $R^2$, independently of each other, are selected from the group composed of linear, cyclic, and branched alkyl groups with 1 to 8 C atoms, the A, independently of each other, are selected from the group composed of unbranched and branched alkyl groups with 1 to 3 C atoms, the A', independently of each other, are selected from the group composed of unbranched and branched alkyl groups with 1 to 3 C atoms, and in each case, independently of each other, $0 \leq y \leq 1$, in the molar ratio of $0 < M/Q \leq 2$, wherein Q is the total number of moles of the aminoalkylalkoxysilanes of general formula (RI) and M is the total number of moles of the alkyltrialkoxysilanes of general formula (RII) and the dialkyldialkoxysilanes of general formula (RIII), and blending of the mixture with water, adjustment of the pH of the reaction mixture to a value between 1 and 8 and removal of the alcohols already present and/or produced in the reaction. The term "water-soluble" within the meaning of the present invention preferably means that at least 1 g/l of the compound in question can be dissolved in water at 20° C. and a pH of 7. The term "non-water-soluble" within the meaning of the present invention preferably means that no more than 0.1 g/l of the compound in question can be dissolved in water at 20° C. and a pH of 7.

In this case, as non-water-soluble starting components, mixtures of alkyltrialkoxysilanes of general formula (RII) and dialkyldialkoxysilanes of general formula (RIII) are preferably obtained by simultaneous esterification of the corresponding tri- and dichlorosilanes of general formulae (RV) and (RVI)

$Si(R^2)(Cl)_3$  (RV)

$Si(A)(A')(Cl)_2$  (RVI), wherein the $R^2$, independently of each other, are selected from the group composed of linear, cyclic, and branched alkyl groups with 1 to 8 C atoms, the A, independently of each other, are selected from the group composed of unbranched and branched alkyl groups with 1 to 3 C atoms, and the A', independently of each other, are selected from the group composed of unbranched and branched alkyl groups with 1 to 3 C atoms, with methanol or ethanol. However, the mixtures per se can also be obtained from the pure individual components, the alkyltrialkoxy- and dialkyldialkoxysilanes of general formulae (RII) and (RIII), by mixing.

Reference is also made to EP 0 716 128 A2, the contents of which are hereby incorporated by reference.

Precondensed Heteropolysiloxanes According to Variant II

Water-based precondensed heteropolysiloxanes to be used according to the invention can also be obtained if non-water-soluble organosilanes of general formula (III) are mixed with water-soluble organosilanes of general formula (TI) in a molar ratio of M, i.e. relative to the non-water-soluble organotrialkoxysilanes, to Q, i.e. relative to the water-soluble aminoalkylalkoxysilanes, of $0<M/Q\leq 2$, the mixture is blended with water, the pH of the reaction mixture is adjusted to a value between 1 and 8, and alcohol already present or produced in the reaction is removed by distillation. During removal by distillation, water is preferably added in an amount equal to that of the alcohol or alcohol/water removed from the reaction medium. Monobasic acids are particularly well-suited for pH adjustment. Precondensed heteropolysiloxanes produced in this manner release no further alcohols by hydrolysis, even on dilution with water, and have a flash point significantly higher than 70° C.

Precondensed water-based heteropolysiloxanes according to the invention that are essentially free of organic solvents, have a flash point of more than 70° C., and release essentially no alcohols by hydrolysis on dilution with water can also be used, wherein the alcohol content in the compounds is less than 5 wt. %, said heteropolysiloxanes being obtainable by mixing of Q moles of water-soluble aminoalkylalkoxysilanes of general formula (TI)

   (TI)

with M moles of non-water-soluble alkylalkoxysilanes of general formula (TII)

,   (TII)

wherein the R, independently of each other, are selected from aminofunctional organic groups of general formula (TIII)

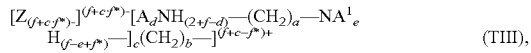   (TIII), wherein $1\leq a\leq 6$, $1\leq b\leq 6$, $0\leq c\leq 6$, $0\leq d\leq 2$, $0\leq e\leq 1$, $0\leq f\leq 1$, $0\leq f^*\leq 1$, the A and $A^1$, in each case independently of each other, are selected from the group composed of benzyl groups and vinyl groups, N denotes a nitrogen atom, and Z is a monovalent inorganic or organic acid radical, $R^1$, $R^{1*}$, $R^{1**}$, in each case independently of one another, are selected from the group composed of methyl and ethyl, and $R^2$, independently of each other, are selected from the group composed of linear, cyclic, and branched alkyl groups having 1 to 6 C atoms and ureidoalkyl groups of formula (TIV)

   (TIV)

wherein $1\leq b\leq 6$, in each case, independently of each other, $0\leq y\leq 1$, in the molar ratio of $0<M/Q\leq 2$, and blending of the mixture with water, adjustment of the pH of the reaction mixture to a value between 1 and 8, and removal of the alcohols already present and/or produced in the reaction.

The precondensed heteropolysiloxanes to be used according to the invention can thus contain, for example, linear cocondensates of formula (UI)

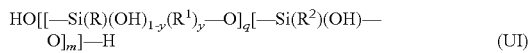   (UI)

and/or cyclic cocondensates of formula (UII)

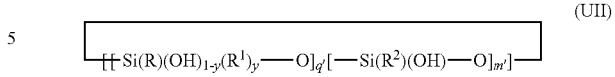   (UII)

and/or linear condensates of formula (UIII)

HO[—Si(R)(OH)$_{1-y}$(R$^1$)$_y$—O]$_{x''}$—H   (UIII)

and/or linear condensates of formula (UIV)

HO[—Si(R$^2$)(OH)—O]$_x$—H   (UIV)

and/or cyclic condensates of general formula (UV)

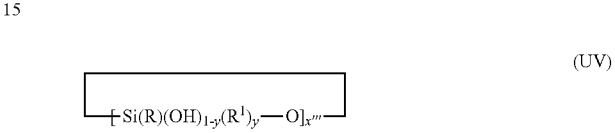   (UV)

and/or cyclic condensates of formula (UVI)

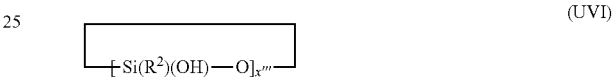   (UVI)

and/or silanols of formula (UVII)

Si(R)(R$^1$)$_y$(OH)$_{3-y}$   (UVII)

and/or silanols of formula (UVIII)

Si(R$^2$)(OH)$_3$   (UVIII)

wherein the above formulae do not specify any order of the individual silane components within the respective polysiloxane, wherein the R, independently of each other, are selected from aminofunctional organic groups of formula (UIX)

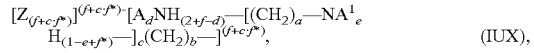,   (IUX), wherein $1\leq a\leq 6$, $1\leq b\leq 6$, $0\leq c\leq 6$, $0\leq d\leq 2$, $0\leq e\leq 1$, $0\leq f\leq 1$, $0\leq f^*\leq 1$, the A and $A^1$, independently of each other, are selected from the group composed of benzyl groups and vinylbenzyl groups, N is a nitrogen atom, and Z is a monovalent inorganic or organic acid radical selected for example from the group composed of Cl$^-$, NO$_3^-$, HCOO$^-$ and CH$_3$COO$^-$, wherein the $R^1$, independently of each other, are selected from the group composed of methyl and ethyl, the $R^2$, independently of each other, are selected from the group composed of linear, cyclic, and branched alkyl groups having 1 to 6 C atoms and ureidoalkyl groups of formula (UX)

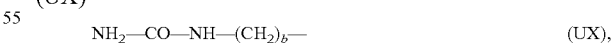   (UX), wherein $1\leq b\leq 6$, wherein, in each case independently of one another, $0\leq y\leq 1$, and q+m, q'+m', x'' and x''' in each case have an averaged value in the range of 2 to 20. Here, the x'' and x''' of formulae (UIII), (UIV), (UV) and (UVI) are considered separately in each case. Preferably, the ratio of M/Q is between 0 and 2, wherein Q is the total number of moles of the amino-containing silanes according to formula (UVII) and the corresponding silane components contained in the condensates, and M is the total number of moles of the silanes according to formula (UVIII) and the corresponding silane components contained in the condensates. As mentioned above, the aforementioned structures do not specify the order of the silane components contained therein. In particular, the polysiloxanes used above according to the invention are not limited solely to corresponding block polymers. The averaged values of q+m, q'+m', x''' and x''' are derived from the arithmetic average of the corresponding compounds.

Moreover, precondensed heteropolysiloxanes to be used according to the invention can be obtained, for example, by mixing of Q moles of water-soluble aminoalkylalkoxysilanes of formula (TI)

with M moles of non-water-soluble alkylalkoxysilanes of formula (TII)

wherein the R, independently of each other, are selected from aminofunctional organic groups of formula (TIII)

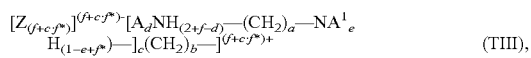

wherein $1 \le a \le 6$, $1 \le b \le 6$, $0 \le c \le 6$, $0 \le d \le 2$, $0 \le e \le 1$, $0 \le f \le 1$, $0 \le f^* \le 1$, A and $A^1$ represent a benzyl or vinylbenzyl radical, N denotes a nitrogen atom, Z is a monovalent inorganic or organic acid radical selected for example from the group composed of $Cl^-$, $NO_3^-$, $HCOO^-$, and $CH_3COO^-$, $R^1$, $R^{1*}$, $R^{1**}$, in each case independently of one another, are selected from the group composed of methyl and ethyl, $R^2$, independently of each other, are selected from the group composed of linear, cyclic, and branched alkyl groups having 1 to 6 C atoms and ureidoalkyl groups of formula (TIV)

wherein $1 \le b \le 6$, and, in each case independently of one another, $0 \le y \le 1$, in the molar ratio of $0 < M/Q \le 2$, and blending this mixture with water, adjusting the pH of the reaction mixture to a value between 1 and 8, and removing the alcohol already present and/or produced in the reaction.

Reference is also made to EP 0 716 127 B1, the contents of which are hereby incorporated by reference.

Preferred heteropolysiloxanes can be obtained from Evonik Industries AG, 45128 Essen, Germany, under the brand names Dynasylan Hydrosil 2627, Dynasylan Hydrosil 2776, Dynasylan Hydrosil 2909, Dynasylan 1146, and Dynasylan Hydrosil 2907. Particularly preferred water-based heteropolysiloxanes are Dynasylan Hydrosil 2627, Dynasylan Hydrosil 2776, Dynasylan Hydrosil 2907, and Dynasylan Hydrosil 2909.

According to a preferred variant of the invention, the precondensed heteropolysiloxane is selected from the group composed of Dynasylan Hydrosil 2627, Dynasylan Hydrosil 2776, Dynasylan Hydrosil 2909, Dynasylan 1146, Dynasylan Hydrosil 2907, and mixtures thereof.

The heteropolysiloxanes preferably have an average molecular weight of at least 500 g/mol, particularly preferably of at least 750 g/mol, and most particularly preferably of at least 1000 g/mol. The average molecular weight can be determined, for example, by means of NMR spectroscopic methods such as $^{29}$Si-NMR, optionally in combination with $^1$H-NMR. A description of such methods can be found, for example, in publications such as "Organofunctional alkoxysilanes in dilute aqueous solution: New accounts on the dynamic structural mutability", Journal of Organometallic Chemistry, 625 (2001), 208-216.

Moreover, the coated metal pigments according to the invention were surprisingly found to show significantly reduced agglomeration compared to conventional coated pigments. In addition to allowing simplified handling, processing, and use of the pigments according to the invention in highly-concentrated form, such as in the form of a paste, surprisingly, this also has a significant effect on the properties of the pigments in the form of a dry preparation. For example, it is even possible with the pigments according to the invention to obtain PVD pigments in powder form in the simplest possible manner without having to accept a significant reduction in quality of the PVD pigments with respect to agglomeration, and consequently their optical properties.

The possibility of processing high-quality but sensitive pigments, such as PVD pigments in particular, in highly concentrated form without having to accept substantial decreases in quality provides several advantages, for example, the handling of the pigments is simplified, and the possible scope of application is considerably broadened. Purification of the pigment is also simplified, and consistent high quality for the end user is ensured, with reduced requirements concerning transportation, storage, and processing.

The possibility of significantly concentrating PVD pigments and even drying such pigments allows the pigments to be handled in a completely novel manner. For example, corresponding pigments can be filtered off by means of simple procedural steps without noticeable decreases in quality prior to further processing steps. For example, the pigments can be directly used in solvent-free coating applications after complete removal of the solvent. For example, transportation and storage are made much simpler by the possibility of removing the solvent.

For example, new modification possibilities, such as modification of the pigments in a gas-phase reaction, are provided. For example, the present invention allows the use of the pigments in solvent-free systems, such as powder coating or plastics, or in systems in which solvents can cause problems, such as UV coatings and printing inks. For example, components that would tend to migrate in the product can easily be removed. This simplifies or allows the use of pigments in the area of foods. For example, rewetting with another solvent, i.e. exchanging the solvent, is made much simpler.

Moreover, the pigments according to the invention were surprisingly shown to provide favorable applicability, as well as quite favorable coverage and abrasion resistance, when applied in a powder coating. In powder coating application of aluminum pigments according to the invention, applicability was found to be superior to that of similar aluminum pigments without heteropolysiloxane. In particular, the coating to be applied according to the invention was found to be advantageous in coating using ferromagnetic pigments, which also show particularly favorable orientation during or after application of the powder coating.

Ferromagnetic pigments can be displaced, for example by applying a magnetic field using e.g. a magnet arranged, e.g. fixed, on the back of the material to be coated, resulting in accumulation of ferromagnetic pigments in specified locations and a lack thereof at other locations. Moreover, for example, the orientation of the pigments after application can be affected by means of a magnetic field, allowing particular optical effects to be achieved. Particular optical effects can therefore be reproducibly generated using ferromagnetic pigments according to the invention.

In a variant according to the invention in which the arranged magnet remains on the material to be coated while the coating agent, for example a lacquer, is cured e.g. in an oven, it is possible to generate optics that cannot be achieved with any other two-layered configuration, for example a metal oxide layer with an acrylate layer arranged on it.

Surprisingly, it was found in a second variant according to the invention in which the magnet is removed prior to curing of the coating agent that pigments with a metal oxide layer and a heteropolysiloxane modification produce particular haptics. These haptics are similar to those of braille embossing. In contrast, these haptics were not observed in use of ferromagnetic pigments with a different two-layered configuration applied under the same conditions, for example a metal oxide layer with an acrylate layer arranged on it.

In particular, the coating composed of two layers to be applied according to the invention was found to be advantageous for the coating of ferromagnetic pigments that can also be oriented during or after application of the powder coating, preferably under the effect of a magnetic field.

A feature characterizing the pigments according to the invention, their metal cores, and their metallic substrates is the size of the pigments. This size is typically indicated using D values. Here, the number indicates the percentage of particles smaller than a specified size contained in a volume-averaged particle size distribution. For example, the $D_{50}$ value indicates the size that is larger than 50% of the particles. These measurements are conducted e.g. by means of laser granulometry using a particle size analyzer manufactured by Quantachrome (model: Cilas 1064). Here, measurement is conducted according to data from the manufacturer. For this purpose, 1.5 g of the powdered coating material or paste with a solid content of 1.5 g is dispersed in approx. 100 ml of ethanol, treated for 300 seconds in an ultrasound bath (model: Sonorex IK 52, Bandelin), placed using a Pasteur pipet in the sample preparation cell of the measuring device, and measured several times. The individual measurement results yield the resulting average values. Here, evaluation of the scattered light signals is carried out by the Fraunhofer method.

The metal pigments according to the invention, particularly the metal effect pigments, preferably have an average pigment diameter ($D_{50}$ value) in the range of 2 to 66 µm, more preferably in the range of 4 to 50 µm, and even more preferably in the range of 8 to 47 µm.

Moreover, the $D_{90}$ value is preferably in the range of 10 to 81 µm, more preferably in the range of 16 to 80 µm, and even more preferably in the range of 21 to 79 µm.

It is also preferable for the $D_{10}$ value to be in the range of 0.5 to 34 µm, more preferably in the range of 1 to 29 µm, and even more preferably in the range of 2 to 27 µm.

In particular, it is preferred in embodiments of the invention that the $D_{50}$ value be in the range of 2 to 66 µm, the $D_{90}$ value be in the range of 10 to 81 µm, and the $D_{10}$ value be in the range of 0.5 to 34 µm. Preferably, the $D_{50}$ value is in the range of 4 to 50 µm, the $D_{90}$ value is in the range of 16 to 80 µm, and the $D_{10}$ value in the range of 1 to 29 µm.

Another feature for characterizing the metal pigments according to the invention, preferably metal effect pigments, is the span ΔD, which is defined as follows:

$$\Delta D = (D_{90} - D_{10})/D_{50}.$$

Preferably, the metal pigments according to the invention, particularly metal effect pigments, have a span in the range of 0.6 to 2.1, preferably in the range of 0.7 to 1.9, and even more preferably in the range of 0.75 to 1.7.

Moreover, the coated metal effect pigments according to the invention, preferably metal effect pigments, are also preferably characterized by a certain average thickness ($h_{50}$ value). The average thickness constitutes the value at which 50% of the metal pigments in a cumulative frequency distribution, also referred to as a cumulative passage curve, are of the specified thickness or less, wherein at least 100 pigments, for example 100 pigments, are measured.

The pigments for determining thickness distribution are prepared and measured according to the method described in EP 1 613 702 B1 ([0125]-[0126]). In this method, only pigments with an azimuthal angle of less than 10° are counted. The determination of relevant values in the cumulative passage may be carried out using a standard program such as Excel (quantile function).

Should the above-mentioned method for preparing the pigments not be usable, for example, preparation in a coating may be carried out as an alternative. In this case, it is important to ensure the most favorable possible orientation of the flakes in the application medium. After this, the cured coating is partially abraded, and its cross-section is observed by REM. Only particles showing a favorable orientation are counted.

It is therefore preferred in the coated metal effect pigments according to the invention for the $h_{50}$ value to be in the range of 15 nm to 2 µm, and preferably in the range of 20 nm to 1.5 µm. In particular, it is preferred in further embodiments for the coated metal effect pigments according to the invention to have an $h_{50}$ value in the range of 20 nm to 370 nm, more preferably in the range of 20 nm to 240 nm, particularly preferably in the range of 15 to 80 nm, and most particularly preferably in the range of 20 to 50 nm.

For example, the aspect ratio may be used to characterized the particularly preferred metal effect pigments according to the invention. This is determined according to the following formula:

$$\text{aspect ratio} = \frac{D_{50}}{h_{50}}.$$

In preferred embodiments, the coated metal effect pigments according to the invention are thus characterized by an aspect ratio in the range of 1500:1 to 10:1, preferably in the range of 1200:1 to 15:1, and more preferably in the range of 950:1 to 25:1.

The metallic substrates are preferably metal effect pigments. The term "metallic substrates" within the meaning of the present invention is understood to refer to uncoated metal-containing pigments having no more than one thin oxidation layer. These should be metal pigments that are essentially, and preferably completely, composed of at least one metal or at least one metal alloy. In particular, these metallic substrates are not nanoparticles or nanoparticle agglomerates. The term "nanoparticle" within the meaning of the present invention is understood to refer to particles with an average particle size of less than 400 nm. The metallic substrates are preferably not particles with an average particle size of less than 500 nm or agglomerates thereof. Determination of such small particles is conducted for example by means of a DelsaNano C manufactured by Beckman Coulter according to data from the manufacturer.

In applications in which high metallic luster values are desired without major color changes resulting from oxidation of the metallic substrate, it is preferred that the metal of the metallic substrate used according to the invention be predominantly present in elemental metal form, i.e. in non-oxidized form. In further embodiments, the oxygen content of the metal in the metallic substrate is therefore no more than 15 wt. %, preferably no more than 12 wt. %, more preferably no more than 8 wt. %, even more preferably no more than 5 wt. %, and most preferably no more than 3 wt. %, relative in each case to the weight of the metal in the metallic substrate.

However, if specific shades are desired, these can be obtained without additional colored pigments or as a supplement to existing colored pigments by means of coloring by targeted oxidation of the metal pigments, thus producing an oxide layer that provides the desired coloring.

The metal pigments according to the invention comprise the metallic substrate and at least one surrounding coating layer having at least one metal oxide. The second coating layer having at least one heteropolysiloxane is applied to this surrounding first coating layer. The second coating layer can be configured as a non-surrounding layer or a surrounding layer. The metallic substrate is preferably a metal core.

This metal core is preferably composed largely of a metal selected from the group composed of aluminum, copper, iron, zinc, tin, titanium, chromium, cobalt, silver, stainless steel, nickel, antimony, magnesium, zirconium, silicon, and boron and mixtures, as well as alloys thereof. Within the meaning of the present invention, the term "metal" also includes the metalloids silicon and boron, particularly silicon, which should preferably be used as alloy components. Preferably, the aforementioned metals make up at least 95 wt. % of the metal core relative to the weight of the metal core without oxygen. Because of surface oxidation, which is difficult to prevent in most cases, the content of oxygen is not taken into consideration in calculating the metal content of the aforementioned metals.

Unless otherwise specified, it is particularly preferred in the present invention that "essentially" signify at least 95%, and preferably at least 99%. When these values pertain to a material property such as the content of a specific metal or the amount of a coating, they signify wt. %.

In further embodiments, it is preferred that the metal in the metallic substrate be composed largely of a metal selected from the group composed of aluminum, copper, iron, zinc, tin, titanium, and stainless steel, as well as mixtures and alloys thereof. Composed "largely" of a metal X or a mixture of metal X and Z signifies, within the meaning of the present invention, that the metal X constitutes at least 60 wt. % relative to the weight of the metal in the metallic substrate without oxygen or in the metal core without oxygen. Preferably, the metal in the metallic substrate or the metal core is composed to at least 95 wt. %, and more preferably to at least 99 wt. %, of the specified metal or the specified metals, relative in each case to the weight of the metal in the metallic substrate without oxygen or in the metal core without oxygen.

In further embodiments, it is preferred that the aforementioned values, as well as subsequent values of the present invention, be relative not to the metal in the metallic substrate and the weight of the metal in the metallic substrate, but to the metal core and the weight of the metal core.

In further embodiments, it is preferred that the metal in the metallic substrate be composed to at least 95 wt. % of a metal selected from the group composed of aluminum, iron, zinc, tin, silver, copper, chromium, titanium, and mixtures thereof, relative to the weight of the metal in the metallic substrate without oxygen.

Preferred mixtures of metals are brass (gold bronze), zinc-magnesium alloys, and steel.

Particularly preferred are metal cores composed to at least 95 wt. % of aluminum, iron, zinc, steel, copper or brass, and more preferably aluminum, copper, iron or brass, relative to the weight of the metal core without oxygen.

A particularly preferred group of metallic substrates are aluminum-coated nonmetallic substrates and metal cores selected from aluminum pigments. In particular, metal cores selected from aluminum pigments are preferred. In further embodiments, the metal in the metallic substrate should be composed to at least 95 wt. % of aluminum relative to the weight of the metal in the metallic substrate without oxygen. Moreover, it is preferred in further embodiments for the percentage of the various metals in the metallic substrates to be less than 1 wt. %, and more preferably less than 0.1 wt. %, relative to the weight of the metal in the metallic substrate without oxygen.

A further preferred group of metallic substrates are copper-containing metallic substrates. These have a content of elemental copper of at least 50 wt. %, and preferably at least 70 wt. %, relative in each case to the weight of the metal in the metallic substrate without oxygen. In particular, it is preferred that copper-containing metal cores be used. Within the meaning of the invention, the aforementioned content of elemental copper is also understood to refer to the copper content of an alloy. Particularly preferred is the use of flaky copper-containing pigments, also referred to in the following as copper effect pigments.

According to further embodiments, copper pigments, particularly copper effect pigments, are used as metallic substrates. "Copper pigments" within the meaning of the present invention preferably have a content of elemental copper of 98 to 100 wt. %, and more preferably 99 to 99.999 wt. %, relative in each case to the weight of the metal in the metallic substrate. In particular, it is preferred in further embodiments that the copper pigments be metal cores. It must be understood that the person skilled in the art will interpret the figure of 100 wt. % of copper as also including any common foreign metals that may be contained in trace amounts. The term "trace amounts" within the meaning of the present invention refers to amounts of no more than 0.01 wt. % relative to the total weight of the metal.

According to further embodiments, brass pigments, particularly flaky brass pigments, also referred to in the following as brass effect pigments, are used as metallic substrates in the present invention. The term "brass pigment" within the meaning of the present invention refers to metallic pigments in which the metal is selected from an alloy composed at least largely of zinc and copper. Such pigments are also referred to as gold bronze pigments. Preferably, brass pigments used according to the present invention, particularly brass effect pigments, have a copper content of 70 to less than 98 wt. %, and more preferably 75 to 90 wt. %, relative in each case to the weight of the metal in the metallic substrate without oxygen. In particular, it is preferred in further embodiments that the brass pigments be metal cores.

In addition to copper, zinc constitutes another main component of the metal in brass pigments, with the total amount of copper and zinc in further embodiments preferably being at least 95 wt. %, more preferably at least 99 wt. %, and even more preferably at least 99.9 wt. %, relative in each case to the weight of the metal in the copper-containing metallic substrate without oxygen.

A special object of the present invention is achieved by the combination of a coating to be applied according to the invention with ferromagnetic metallic substrates, particularly ferromagnetic metal cores.

Surprisingly, it was found that the coating to be applied according to the invention provided particular advantages in application as a powder coating. For example, ferromagnetic pigments coated in this manner showed particularly good applicability, could be coated with an opaque finish, and were abrasion-resistant after hardening of the coating. It has been found to be particularly advantageous for applicability if the precondensed heteropolysiloxane is a component of the outermost coating layer or constitutes the outermost coating layer.

Moreover, the coated ferromagnetic pigments according to the invention make it possible to obtain particular haptics by means of specific process steps. For example, in application of a powder coating containing ferromagnetic pigments, a magnet can be arranged, e.g. attached, to the backing of a substance to be coated, and removed prior to curing of the coating. Surprisingly, images with remarkable haptics can be achieved in this manner, with deformation of the coating surface being observed. The resulting image can be identified by touch, similar to braille writing. Without this being understood to limit the invention in any way, the coated metal pigments of the invention appear to carry along noticeable amounts of the coating, resulting in corresponding deformations. The greater resistance to be expected in this case would explain the frequently observed slightly reduced line sharpness of ferromagnetic metal pigments. In particular, this is observed if the precondensed heteropolysiloxane is configured on the coating surface and can interact with the coating. In further preferred embodiments, the precondensed heteropolysiloxane therefore constitutes the outermost layer of the metal pigments according to the invention.

In further particularly preferred embodiments, the metal in the metallic substrate, and preferably in the metal core, is composed to at least 60 wt. % of at least one metal that is ferromagnetic at room temperature (25° C.) relative to the weight of the metallic substrate without oxygen. In addition to ferromagnetic metals, which show ferromagnetic properties in their pure form, such as iron, cobalt and nickel, alloys such as AlNiCo, SmCo, $Nd_2Fe_{14}B$, $Ni_{80}Fe_{20}$, and NiFeCo can also be used. However, the use of iron, cobalt and/or nickel, particularly iron, is particularly preferred. A particularly advantageous iron is so-called carbonyl iron. The production of flaky effect pigments from carbonyl iron is described in EP 1 251 152 B1. This material is obtained through the decomposition of iron pentacarbonyl and is characterized by its particularly high purity and high ductility. Further improvement of these properties is achieved by further reducing the content carbonyl iron. The method of such reduction is disclosed, for example, in U.S. Pat. No. 6,645,286 B2.

In preferred embodiments, the metal in the metallic substrate is composed to at least 50 wt. %, and more preferably to at least 60 wt. %, of iron relative to the weight of the metal in the metallic substrate. In particular, it is preferred that the metallic substrate be a metal core. Here, the iron can be in elemental form or can also be present e.g. as an oxide in the form of a superficial oxide layer. The term "elemental metal" within the meaning of the present invention signifies that the relevant metal is present in an oxidation state of 0, i.e., that it is neither in oxidized nor reduced form. Here, the elemental metal can also be in the form of an alloy component. Effects resulting for example from different electronegativity of the various metals in an alloy are not taken into account.

Moreover, it may be preferred for the metal in the metallic substrate, preferably in the metal core, to be composed to at least 90 wt. %, preferably to at least 97 wt. %, more preferably to at least 99 wt. % and even more preferably to at least 99.9 wt. % of ferromagnetic metal, particularly iron, relative in each case to the weight of the metal in the metallic substrate without oxygen. In this case, the iron can be in elemental form or be used as an oxide in the form of a superficial oxide layer. Because of the high content of ferromagnetic metal, it is possible to achieve significant effects even with weak magnetic fields or highly contrasting effects with strong magnets. In particular, it is preferred that the metal core be composed completely of iron, containing only trace amounts of other components. The term "trace amount" within the meaning of the present invention refers to amounts totalling no more than 0.01 wt. % relative to the metal.

In further embodiments of the invention, it is preferred to use specific alloys, particularly steel alloys, in which specific properties are achieved by means of targeted addition of components to the alloys. For example, chromium can be used to improve the corrosion resistance of ferrous pigments. This makes it possible, for example, to drastically reduce oxidation of the pigment before application of the coating according to the invention. Because of the lower content of ferromagnetic metal, however, the contrast when a magnetic field is applied with the same field strength decreases, so such pigments are e.g. particularly well-suited for less contrast-rich motifs, in which greater importance is placed, for example, on particularly high luster of the individual pigments. Steel pigments are a particularly preferred example of such alloy pigments.

In further preferred embodiments of the present invention, ferrous metal cores are used. The term ferrous pigments within the meaning of the present invention refers to pigments containing at least 60 wt. % of iron relative to the weight of the metal core without oxygen. In this case, it is particularly preferred to use either iron pigments or ferromagnetic steel pigments. The term "iron pigment" within the meaning of the present invention signifies that the metal core is composed to at least 90 wt. % of iron. In particular, it is preferred that the iron pigments be composed to at least 97 wt. %, more preferably to at least 99 wt. %, and even more preferably to at least 99.5 wt. % of iron. The term "steel pigment" within the meaning of the present invention signifies that the metal core is composed to at least 70 wt. % of iron and to at least 80 wt. % of iron, as well as the further components cobalt, nickel, or mixtures thereof, and contains at least 2, and preferably at least 3 metals as alloy components in addition to iron with a content of more than 1 wt. %. The aforementioned percentages by weight refer in each case to the weight of the metal core without oxygen, which can be present for example in the form of a superficial oxidation layer. Examples of metals that can be used as alloy components are tungsten, molybdenum, vanadium, cobalt, nickel, niobium, chromium, silicon, manganese, or mixtures thereof.

The term "ferromagnetic" within the meaning of the present invention is equivalent to the term as commonly understood by the person skilled in the art. Examples of ferromagnetic metals are iron, cobalt, and nickel. In such metals, Weiss fields are formed, exerting an effect on the magnetic properties of the corresponding materials. Weiss fields are further characterized by their Curie temperature, the temperature above which ferromagnetic properties are lost. In particular, it is preferred that the ferromagnetic metals according to the invention have a Curie temperature of at least 100° C., preferably at least 150° C., more preferably at least 250° C., and even more preferably at least 400° C.

A further property of ferromagnetic metals is their high relative permeability ($\mu_r \gg 1$). Relative permeability naturally depends on the magnetic field strength used for measurement, and for this reason, ranges are given for this value. Theoretically, continuously increasing the magnetic field applied would result in magnetic saturation, causing relative permeability to approach 1. The upper limit of relative permeability of the relevant metal $\mu_r$ should preferably be >75, more preferably >150, even more preferably >250, and most preferably >350, measured in each case at 20° C. Measurement of permeability can be carried out, for example, by using a Gouy balance or a SQUID (Superconducting QUantum Interference Device).

The iron pigments according to the invention are characterized by an extremely high iron content. For example, it is preferred to use highly pure iron produced by gas-phase decomposition of iron pentacarbonyl $Fe(CO)_5$ in tube furnaces. This material has an iron content of approx. 97 wt. % and also contains approx. 1.5 wt. % of carbon and approx. 1 wt. % of oxygen. Impurities can be removed to a greater extent by further reduction of this iron powder to obtain an iron content of at least 99.5 wt. %. The use of such pigments is particularly preferred, as this high-purity iron shows high ductility and can therefore quite easily be ground or deformed into particularly high-quality iron effect pigments.

Although the steel pigments according to the invention typically show less favorable magnetization than iron pigments according to the invention, the addition of further alloy components allows the properties of the material to be tailored to meet the desired requirements. In particular, it is preferred to use stainless steel alloys in order to achieve increased stability of the metallic substrate, preferably a metallic core. For example, this allows process control to be simplified, as pure iron in fine particulate form is pyrophoric and has a tendency to undergo spontaneous combustion. For this reason, saturation of the surface, for example by means of defined surface oxidation, is necessary and/or more stringent safety requirements must be met before the coating to be used according to the invention is applied. The use of stainless steel pigments therefore makes it possible e.g. to obtain ferrous pigments having a reduced surface oxidation layer or lacking such a layer using a significantly simpler process. In particular, the steel pigments according to the invention should contain at least 7 wt. %, preferably at least 10 wt. %, and more preferably at least 12 wt. % of chromium, relative in each case to the weight of the metal in the metallic substrate without oxygen.

Moreover, the steel pigments according to the invention are preferably characterized by containing no more than 1.8 wt. %, and more preferably no more than 1.5 wt. %, of carbon, relative to the weight of the metal in the metallic substrate without oxygen.

In general, flaky metal pigments, particularly those specifically listed above, can be obtained by means of various methods commonly known to the person skilled in the art. Examples include grinding of metal grit, particularly aluminum grit, copper-containing grit, and ferromagnetic grit, or gas-phase deposition of metal, particularly aluminum, by the PVD method. The two production methods mentioned above differ not only in the pigment quality typically obtained or obtainable, but also in their requirements with respect to further processing, their handling, and their specific properties.

A widely-used method for obtaining a broad range of metal effect pigments having widely differing properties is the grinding of metal grit. In this case, liquid metal is typically atomized in order to obtain a fine metal grit. Various metals can also be alloyed with one another in the metal melt. An example is the production of brass grit. The grit obtained is then optionally classified or subjected to post-treatment before being ground.

Grinding can be conducted according to dry or wet methods. The corresponding variant method is selected, among other factors, based on the desired overall conditions, the desired products, and the educts used. For example, wet grinding was found to be advantageous from the standpoint of safety and resulted in more homogenous and gentler deformation even with less optimal process parameters. In grinding of aluminum, for example, wet grinding is typically preferred. Dry grinding, on the other hand, allows simplified processing, because, for example, subsequent rewetting with another solvent is not needed. This method is used e.g. in grinding of copper or brass grit into flaky copper or brass pigments. The term "wet grinding" describes grinding of the pigments in the presence of a solvent.

In grinding, the metal grit is ground in ball mills in several grinding stages with varying grinding parameters, including the size, diameter, and rotation speed of the mill, ball size, grinding duration while adding lubricants such as stearic or oleic acid to prevent cold welding of the metal particles, and using grinding media such as steel balls. After grinding and optional classification into different containers, the flaky metal pigments are collected and then homogenized or mixed.

Further information on grinding methods that can be used in this case can be found in WO 2009/152941 A2, the disclosure of which is hereby incorporated in its entirety by reference.

A special object of the present invention is achieved by combining the coating to be applied according to the invention with PVD pigments, and particularly high-quality pigments obtained by grinding, which are characterized by their particularly homogeneous form. Surprisingly, it was observed that significantly higher concentrations of pigment suspensions can be used without the occurrence of noticeable agglomerations. A particularly surprising finding was that the coating according to the invention could be used to obtain a powder without adding binders.

The aforementioned metal effect pigments produced by grinding can be manufactured, for example, according to the methods described in US 2007/0199478 A1 or US 2010/0047199 A1.

According to a further embodiment, metal pigments obtained by grinding with an $h_{50}$ value in the range of 20 to 100 nm, a shape factor of at least 200, and a relative thickness distribution $\Delta h$ in the range of 30 to 140% are therefore used as metal cores. The $\Delta h$ value is calculated according to the formula VII:

$$\Delta h = (h_{90} - h_{10})/h_{50} \tag{VII}$$

The production of such metal pigments is described in EP 1 613 702 B1, EP 2 102 294 B1, and EP 2 128 203 A1.

PVD metal effect pigments show a completely flat surface and outstanding optical properties. In particular, the structure of pigments obtained by means of physical vapor deposition is virtually ideal for optical effects. The resulting outstanding optical properties made these pigments particularly attractive for top-quality applications.

A problem of the aforementioned pigments, particularly PVD pigments, has been their strong tendency to agglomerate, which makes concentration difficult and drying impossible, but without significantly impairing their advantageous properties, particularly their optical properties.

In use of metal pigments obtained by grinding with an $h_{50}$ value in the range of 20 to 100 nm, a shape factor of at least 200, and a Δh value in the range of 30 to 140% or use of PVD metal pigments as metallic substrates for the metal effect pigments according to the invention, high-luster pigments for use in paints, printing inks, coatings, and cosmetics can be obtained. In the case of both metal pigments obtained by grinding and PVD pigments, pigments composed of aluminum, copper, brass (gold bronze), and iron, preferably aluminum pigments, are preferred.

In further embodiments, it is preferred that both pigments obtained by means of PVD methods and pigments obtained by grinding have an $h_{50}$ value in the range of 20 to 100 nm, a form factor of at least 200, and a Δh value in the range of 20 to less than 70%, preferably 25 to 65%, and even more preferably 30 to 60%. The $h_{50}$ value is preferably in the range of 23 to 50 nm, the form factor is at least 250, and the Δh value is in the range of 20 to less than 70%, preferably 25 to 65%, and even more preferably 30 to 60%.

The production of such aluminum pigments by wet grinding is described in EP 2 102 294 B1.

For example, the production of the PVD pigments comprises the following steps:
a) vaporizing of a preferably mobile carrier material in a vacuum chamber by means of physical vapor-phase deposition (PVD) with at least one metal M(A), thus forming a layer A on the carrier material,
b) optional vaporizing of the layer A in a vacuum chamber by means of physical vapor-phase deposition (PVD) with at least one metal M(B), thus forming a layer B,
d) detaching of the metallic layer from the carrier material,
e) crushing of the metallic layer into metal effect pigments, and
f) optional conversion of the metal effect pigments into a dispersion or paste.

After production, the metal effect pigments are typically present in an organic solvent. Prior to application of the coating to be used according to the invention, the content of organic solvent in the metal effect pigment dispersion should preferably be at least 80 wt. %, and more preferably at least 85 wt. %, in each case relative to the total weight of the dispersion.

In cases where alloys are to be deposited on the carrier material rather than single metals, this can be carried out for example by means of separate evaporators, for example using flash evaporation or jumping beam evaporators. Evaporation of a finished alloy is disadvantageous in that, because of the differing properties of the alloy components, the more volatile component first evaporates to a considerable degree, making it impossible to deposit a homogeneous alloy on the carrier material. Homogeneous coating is only possible using special methods such as sputtering or the use of an electron beam.

Polymer films, such as those composed of polyterephthalate, polyethylene terephthalates, or metal bands, are particularly suitable as carrier materials. The use of polymer films has been found to be particularly advantageous. According to preferred embodiments, the mobile carrier material is provided with a separating layer ("release coat") that facilitates or allows the separation or detachment of the vapor-deposited PVD layer.

For example, a coating that is soluble in a solvent such as acetone or ethyl acetate or a water-soluble salt can be used as a separating layer.

For example, the use of polymer films, as well as the high amounts of energy required for vaporizing metal, make the production of PVD pigments very costly. If particularly high-quality pigments with outstanding luster are needed, metals produced by means of PVD methods are preferred in further embodiments. In cases where extremely high-quality pigments with outstanding luster and low cost are required, however, metal pigments produced by grinding are preferred.

The metal pigments of the present invention are characterized by having at least one surrounding coating layer comprising at least one metal oxide and at least one coating layer comprising at least one heteropolysiloxane, wherein the term metal oxide also includes oxide hydrates and hydroxides, and wherein the at least one heteropolysiloxane has at least one aminosilane component and at least one silane component selected from the group composed of alkylsilanes, vinylsilanes, and arylsilanes. The heteropolysiloxane has at least one aminosilane component and at least one alkylsilane component. In this case, the above-mentioned heteropolysiloxane is applied in precondensed form to the surrounding coating layer comprising at least one metal oxide.

In this case in particular, it is preferred that the surrounding coating layer comprising at least one metal oxide not be an oxidation product of the metal pigment and be thinner than 40 nm, more preferably thinner than 30 nm, and even more preferably at least 25 nm. The minimum thickness of the surrounding coating layer comprising at least one metal oxide is at least 5 nm, more preferably at least 10 nm, and even more preferably at least 15 nm. Preferably, the surrounding coating layer comprising at least one metal oxide is not an oxidation product of the metal pigment. Most metal pigments typically have an extremely thin superficial metal oxide layer. Moreover, a special effect, particularly with respect to color, can be achieved by targeted superficial oxidation, as can be seen for example from WO 1996/038505 A1 and WO 2012/130680 A1.

The pigments can be modified by further coating layers between the metallic substrate and the combination of coating layers according to the invention. Examples of such coatings are polymer coatings, coatings composed essentially of a metal oxide, particularly silicon oxide, inorganic/organic coatings, or aftercoatings suitable for metal pigment. Polymer coatings suitable for this purpose are disclosed for example in WO 2008/095697. Suitable coatings composed essentially of metal oxide are disclosed for example in WO 2005/118722 A1. Inorganic/organic mixed layers that are particularly well-suited for the pigments according to the invention and the production thereof are disclosed e.g. in WO 2007/017195. Examples of aftercoatings suitable for metal pigments are disclosed e.g. in WO 1999/057204.

In further embodiments, it is preferred that the pigments according to the invention not have a coating layer composed of or containing a thermoresponsive polymer. The term "thermoresponsive polymer" within the meaning of the present invention means that the solubility of the polymer changes greatly depending on temperature. Thermoresponsive polymers are categorized as LOST or UCST polymers. In the case of LOST polymers, the polymer is in a dissolved state at temperatures below the LOST temperature. In the case of UCST polymers, the polymer is in a dissolved state at temperatures above the relevant temperature.

In further embodiments, it is particularly preferred that the pigments according to the invention not have a coating layer composed completely, and preferably essentially, of an organic polymer. More preferably, the pigments according to the invention in further embodiments have no coating layer composed essentially of an organic polymer.

The percentage of the coating in the coated metal pigments according to the invention is preferably in the range of 2 to 30 wt. %, more preferably in the range of 3 to 27 wt. %, and most preferably in the range of 4 to 25 wt. %, relative in each case to the weight of the coated metal pigment.

Unless otherwise specified, the term "metal oxide layer" or "metal oxide" within the meaning of the present invention also includes oxidized forms of the metal such as hydroxides and oxide hydrates.

According to a preferred variant of the invention, the metal oxides applied in the first coating layer or as the first coating layer according to the invention are essentially, and preferably completely, selected from the group composed of silicon oxide, aluminum oxide, boron oxide, zirconium oxide, cerium oxide, iron oxide, titanium oxide, chromium oxide, tin oxide, molybdenum oxide, vanadium oxide, their oxide hydrates, their hydroxides, and mixtures thereof. Particularly preferably, the metal oxides to be applied according to the invention are essentially, and preferably completely, selected from the group composed of silicon oxide, aluminum oxide, and mixtures thereof, wherein the aforementioned metal oxides also include their oxide hydrates and hydroxides. In particular, the use of silicon oxides such as silicon oxide, silicon hydroxide, and/or silicon oxide hydrate has been found to be advantageous.

In further preferred embodiments, the metal core is composed essentially of aluminum, and the metal pigment, particularly the metal effect pigment, according to the invention comprises at least one coating layer composed essentially of silicon oxide, silicon hydroxide, silicon oxide hydrate, or mixtures thereof.

In pigments in which the optical effect must not to be influenced by interference effects of the coating, the use of low-refractive-index metal oxides is preferred. The term "low-refractive-index" within the meaning of the present invention signifies that the refractive index is no more than 1.7. Here, the value refers to the refractive index of the relevant metal oxide in macroscopic form. This can be determined by means of common methods, for example using a refractometer. In further embodiments, the metal oxides of the coating are selected to at least 95 wt. %, and preferably to at least 99 wt. %, from the group of low-refractive-index metal oxides, in each case relative to the total weight of the coating. More preferably, only trace amounts of metal oxides that do not have a low refractive index, and preferably less than 10 wt. % of such oxides, are contained in the coating. A particularly preferred low-refractive-index metal oxide is silicon oxide, including silicon oxide, silicon hydroxide, and/or silicon oxide hydrate.

Within the meaning of this invention, the term "composed essentially of metal oxide," or for example, "composed essentially of silicon oxide, silicon hydroxide, silicon oxide hydrate, or mixtures thereof" is understood to mean that the layer is composed predominantly, preferably to at least 90 wt. %, more preferably to at least 95 wt. %, and even more preferably to at least 99 wt. %, of metal oxide, or for example, of silicon oxide, silicon hydroxide, silicon oxide hydrate, or mixtures thereof. For example, layers that have been produced by the sol-gel process and not calcined can also contain alkoxy groups. The at least one coating layer to be applied according to the invention comprising at least one metal oxide is preferably is composed of (an) uncalcined coating(s). "Uncalcined" within the meaning of the present invention signifies that no heating is conducted in order to achieve essentially complete removal of the water present in the layer applied by sol-gel process. This can be carried out e.g. by heating at above 400° C. This allows pigments to be obtained whose "water content" in the relevant layer is less than 3 wt. %.

In further embodiments, the at least one coating layer comprising at least one metal oxide to which the at least one precondensed heteropolysiloxane is applied is composed essentially of a metal oxide. In particular, it is typically preferred that the above-mentioned coating layer be composed essentially of silicon oxide, silicon hydroxide, silicon oxide hydrate, or mixtures thereof.

In further embodiments, all of the coating layers composed essentially of metal oxide are composed essentially of silicon oxide, silicon hydroxide, silicon oxide hydrate, or mixtures thereof. Exceptions to this are coating layers produced by superficial oxidation of the metal in the metallic substrate or the metal core.

It has typically been found advantageous for the content of metal oxide in the coating to be at least 43 wt. %, preferably at least 65 wt. %, and even more preferably at least 82 wt. %, in each case relative to the total weight of the entire coating comprising metal oxide and heteropolysiloxane.

Determination of the percentage by weight of the metal oxide in the coating is conducted by determining the total amount of the oxidized metal obtained, including for example hydroxides, oxide hydrates, etc., using methods known to the person skilled in the art. Examples of this are atomic absorption spectroscopy, elemental analysis, inductively coupled plasma atomic emission spectroscopy (ICP-AES), and particularly combinations of such methods. This value is calculated based on the corresponding metal content. In cases where determination of the exact metal or the mixture contained in a metal oxide cannot be carried out by methods known to the person skilled in the art such as XPS, the stable oxide of the metal most highly oxidized under standard conditions is taken as a reference. Standard conditions within the meaning of the present invention are a temperature of 0° C. and a pressure of 1.01325 bar. For example, $SiO_2$ is adopted as a reference for silicon oxide.

Inorganic/organic mixed layers are also suitable for coating of the pigments according to the invention. The term "inorganic/organic mixed layer" or "mixed layer" within the meaning of the present invention refers to a layer comprising inorganic and organic components, characterized in that the mixed layer has at least one inorganic network composed of one or a plurality of inorganic oxide component(s) and at least one organic component. The organic component is at least partially bonded to the inorganic network by covalent bonds. Silicon oxide networks having organofunctional silanes as components are an example of this. Moreover, it is preferred in further embodiments for the organic component to be composed at least partially of an organic oligomer and/or polymer that is at least partially covalently bonded to the inorganic network by one or a plurality of organic network-forming agents.

Moreover, it is preferred in further embodiments for the above-mentioned mixed layer to at least partially be formed by covalent bonding of inorganic oxide components and organic oligomers and/or polymers at least partially induced by one or a plurality of organic network-forming agents having the general formulae (NI) or (NII)

$$R^{an1}{}_{xn1}R^{bn1}{}_{yn1}SiX_{(4-xn1-yn1)} \quad \text{(NI)}$$

$$(R^{an1}O)_{xn2}(R^{bn1}O)_{yn2}MX_{(zn2-xn2-yn2)} \quad \text{(NII)}$$

wherein the X, independently of each other, are selected from hydrolyzable groups which, after their hydrolysis, can form a covalent bond of organic network-forming agents to the inorganic network,
the $R^{an1}$, independently of each other, are selected from reactive organic groups that are covalently bondable with the organic oligomer and/or polymer,
the $R^{bn1}$, independently of each other, are selected from organic groups that can be bondable with the organic oligomer and/or polymer,
M is selected from the group composed of Al, Zr and Ti,
xn1 is a whole number from 1 to 3, yn1 is a whole number from 0 to (3−xn1),
zn2 is the formal oxidation number of M, xn2 is a whole number from 1 to (zn2−1),
yn2 is a whole number from 0 to (zn2−2), and
xn2+yn2≤zn2−1.

In further embodiments, in the organic network-forming agents according to formula (NI) and formula (NII), the X, independently of each other, are selected from the group composed of halogen groups, preferably Br, Cl and I, preferably Cl, the hydroxy group and C1-C20 alkoxy groups, which may also have heteroatoms, preferably O, S and/or N, in the carbon chain. The X, independently of each other, are preferably selected from the group composed of halogen groups, the hydroxy group, and C1-04 alkoxy groups.

In further embodiments, the optionally present substituents of $R^{an1}$ are selected from the group composed of amino, hydroxy, thiol, epoxy, acrylate, methacrylate, vinyl, allyl, alkenyl, alkinyl, carboxy, carboxyl anhydride, isocyanate, cyanate, ureido, carbamate groups, and mixtures thereof.

In further embodiments, the $R^{bn1}$, independently of each other, are selected from the group composed of H, C1-C40 alkyl, C2-C40 alkenyl, C2-C40 alkinyl, C6-C36-aryl, fluorinated C6-C36 aryl, partially fluorinated C6-C36 aryl, C7-C40 alkylaryl, C7-C40 arylalkyl, C8-C40 alkenylaryl, C8-C40 arylalkenyl, C8-C40 arylalkinyl, C8-C40 alkinylaryl, C5-C40 cycloalkyl, C6-C40 alkylcycloalkyl, and C6-C40 cycloalkyl alkylsilanes, wherein optionally contained substituents are selected from the group composed of amino, hydroxy, thiol, epoxy, acrylate, methacrylate, vinyl, allyl, alkenyl, alkinyl, carboxy, carboxyl anhydride, isocyanate, cyanate, ureido, carbamate, and ester groups and heteroatoms optionally contained in the carbon chains and carbon ring systems are selected from the group composed of 0, N, and S.

In further embodiments, the organic oligomer and/or polymer is composed of monomers provided with functionalities selected from the group composed of amino, hydroxy, thiol, epoxy, acrylate, methacrylate, vinyl, allyl, alkenyl, alkinyl, carboxy, carboxyl anhydride, isocyanate, cyanate, ureido and carbamate groups, and mixtures thereof.

In further embodiments, the organic component is composed of reactive organic oligomers and/or polymers having reactive groups that can bond to the inorganic network and/or at least to the group $R^{an1}$ of the organic network-forming agents.

In further embodiments, the reactive organic oligomer and/or polymer is selected from the group composed of silanol and/or methoxy-terminated silicones, trialkoxysilane-modified polyethylenimines, polyarylalkyl silsesquioxanes, aminosilane-modified polyethylene oxide urethanes, and mixtures thereof.

In further embodiments, the reactive organic oligomer and/or polymer is selected from the group composed of polyacrylates, polymethacrylates, polyethers, polyesters, polyamines, polyamides, polyols, polyurethanes, and polyolefins, wherein these oligomers and/or polymers have reactive functional groups that can bond to the inorganic network or an organic network-forming agent.

In further embodiments, the organic oligomer and/or polymer is covalently bonded via the functional group $R^{an1}$ to one or a plurality of organic network-forming agents in the inorganic/organic mixed layer.

In further embodiments, the inorganic/organic mixed layer is modified by at least one organic network-modifying agent according to formula (NIII) or (NIV)

$$R^{an3}{}_{xn3}SiX_{(4-xn3)} \quad \text{(NIII)}$$

$$(R^{an3}O)_{xn4}MX_{(yn4-xn4)} \quad \text{(NIV)},$$

wherein the X, independently of each other, are selected from hydrolyzable groups which, following their hydrolysis, can form covalent bonds of organic network-forming agents to the inorganic network, the $R^{an3}$, independently of each other, are selected from the group of non-reactive organic groups, M is selected from the group composed of Al, Zr and Ti, xn3 is 1, 2, or 3, yn4 is the formal oxidation number of M, and xn4 is a whole number from 1 to (yn4−1).

In further embodiments, at least one discrete essentially pure inorganic layer, at least one discrete layer of essentially pure organic polymer, or a combination of such layers is arranged between the metallic substrate and the inorganic/organic mixed layer.

In further embodiments, at least one discrete coating layer is arranged on the inorganic/organic mixed layer that constitutes an essentially pure inorganic layer composed essentially of organic polymer.

In further embodiments, the at least one discrete essentially pure inorganic layer of a metal oxide is composed of an element selected from the group composed of silicon, titanium, aluminum, zirconium, iron, copper, tin, cobalt, chromium, cerium, zinc, antimony, manganese, nickel, yttrium, molybdenum, vanadium, tantalum, tungsten, and mixtures thereof, wherein the above-mentioned metal oxide also includes hydroxides and oxide hydrates.

In further embodiments, the at least one separate essentially pure organic polymer layer is selected from the group composed of polyacrylate, polymethacrylate, polyether, polyester, polyamine, polyamide, polyol, polyurethane, polyphenol formaldehyde, polyolefin, and mixtures thereof.

In further embodiments, the at least one separate essentially pure organic polymer layer is selected from the group composed of polyacrylate, polymethacrylate, or mixtures thereof.

In this case, the metal oxide is preferably selected from the oxides of metals selected from the group composed of silicon, titanium, aluminum, zirconium, iron, tin, chromium, cerium, zinc, manganese, antimony, and mixtures thereof.

The precondensed heteropolysiloxane used according to the invention can be applied in various ways. Addition of the polysiloxane, preferably in dissolved or dispersed form, to a suspension comprising the metal pigments to be coated has been found to be particularly advantageous. In order to provide the suspension comprising the metal pigments to be coated, for example, a reaction product obtained from a prior coating step may be used together with a metal oxide, particularly silicon oxide.

In particular, the structure of the precondensed heteropolysiloxanes according to the invention can be chain-like, cyclic, crosslinked, or mixtures thereof.

Moreover, it is preferred in further embodiments that the heteropolysiloxane be composed to at least 87 wt. %, preferably at least 93 wt. %, and more preferably at least 97 wt. %, relative to the total weight of the heteropolysiloxanes, of silane monomer components selected from the group composed of aminosilanes, alkylsilanes, vinylsilanes, arylsilanes, and mixtures thereof. In particular, it is preferred that the heteropolysiloxane be composed of the aminosilane and alkylsilane components in the aforementioned amounts.

The silane monomers are used e.g. in the form of an alkoxide. This alkoxide is cleaved to initiate polymerization, and the silane monomers are converted or crosslinked to the respective heteropolysiloxane as a result of a condensation step. Preferably, methoxide and ethoxide are used as alkoxides in the present invention. Unless otherwise specified, the wt. % of the silane monomer components in the heteropolysiloxane within the meaning of the present invention is based on the weight of the silane monomers without the components that are cleaved by condensation into heteropolysiloxane, such as alkoxy groups. The production of such polysiloxanes is described in the literature. For example, corresponding manufacturing methods can be found in U.S. Pat. No. 5,808,125 A, U.S. Pat. No. 5,679,147 A, and U.S. Pat. No. 5,629,400 A.

Aminosilanes with 1 or 2 amino groups per Si have been found to be particularly advantageous for making up the heteropolysiloxanes according to the invention. In further embodiments, at least 92 wt. %, and preferably at least 97 wt. % of the aminosilane components contained in the heteropolysiloxane are selected from aminosilanes with 1 or 2 amino groups, in each case relative to the total weight of the aminosilane components contained in the heteropolysiloxane.

For example, $H_2N(CH_2)_3Si(OCH_3)_3$ ((3-aminopropyl)(trimethoxy)silane, AMMO), $H_2N(CH_2)_3Si(OC_2H_5)_3$ ((3-aminopropyl)(triethoxy)silane, AMEO), $H_2N(CH_2)_2NH(CH_2)_3Si(OCH_3)_3$ ((N-(2-aminoethyl)-3-aminopropyl)(trimethoxy)silane), (DAMO)), $H_2N(CH_2)_2NH(CH_2)_3Si(OC_2H_5)_3$ ((N-(2-aminoethyl)-3-aminopropyl)(triethoxy)silane), and mixtures thereof have been found to be advantageous. In further embodiments, the aminosilane components contained in the heteropolysiloxane are selected to at least 92 wt. %, and preferably at least 97 wt. %, from the aforementioned group, and mixtures thereof, in each case relative to the total weight of the aminosilane components contained in the heteropolysiloxane.

In further embodiments, it is preferred that the heteropolysiloxane used according to the invention contain only minor amounts of epoxysilanes, or none at all. Corresponding heteropolysiloxanes in conventional wet coating systems typically showed better adhesion. In particular, it is preferred in further embodiments for the heteropolysiloxane to comprise no more than 10 wt. %, preferably no more than 6 wt. %, more preferably no more than 4 wt. %, and even more preferably no more than trace amounts epoxysilane components relative in each case to the total weight of the heteropolysiloxane.

It has also be found that only small amounts of heteropolysiloxane are typically sufficient. In further embodiments, the coating layer comprising at least one and preferably only one heteropolysiloxane has an average thickness of no more than 20 nm, and more preferably no more than 10 nm. In particular, it is preferred that the at least one and preferably only one heteropolysiloxane be present essentially in the form of a monolayer.

It has been found to be particularly advantageous if at least one heteropolysiloxane is applied to a surrounding coating layer comprising silicon oxide.

The application of coating layers composed essentially of at least one metal oxide is preferably conducted by means of the sol-gel process.

The heteropolysiloxanes used according to the invention can be produced by condensation of e.g. alkylsilanes and aminosilanes. However, the person skilled in the art is aware that identical heteropolysiloxanes can also be produced by other means, for example by reaction of at least one alkylsilane, at least one halogenoalkylsilane, and at least one amine. Such heteropolysiloxanes, which could also formally be considered condensation products of corresponding alkylsilanes and aminosilanes, are included in the present invention. The person skilled in the art can select among various retrosynthetic routes based on awareness of the present invention and known expertise.

In further embodiments, it is also preferred for no more than 1 wt. % of the silane monomer components to be fluorinated silanes relative to the total weight of the heteropolysiloxane. Fluorinated silane components are preferably contained only in trace amounts in the applied heteropolysiloxane layer, or more preferably are absent from said layer.

The term "aminosilane" within the meaning of the present invention signifies that the relevant silane has at least one amino group. This amino group need not be directly bonded to the silicon atom of the silyl group. Examples of suitable aminosilanes for the production of the heteropolysiloxanes according to the invention are (6-amino-n-hexyl)(triethoxy)silane, (6-amino-n-hexyl)(trimethoxy)silane, (4-amino-3,3-dimethylbutyl)(trimethoxy)silane, $H_2N(CH_2)_3Si(OCH_3)_3$ ((3-aminopropyl)(trimethoxy)silane, AMMO), $H_2N(CH_2)_3Si(OC_2H_5)_3$ ((3-aminopropyl)(triethoxy)silane, AMEO), (3-aminoisobutyl)(trimethoxy)silane, (3-aminoisobutyl)(triethoxy)silane, (2-aminoethyl)(trimethoxy)silane, (2-aminoethyl)(triethoxy)silane, (aminomethyl)(trimethoxy)silane, (aminomethyl)(triethoxy)silane, (N-cyclohexylaminomethyl)(triethoxy)silane (Geniosil XL 926), (N-phenylaminomethyl)(trimethoxy)silane, (6-amino-n-hexyl)(methyl)(dimethoxy)silane, (3-aminopropyl)(methyl)(dimethoxy)silane, (3-aminopropyl)(methyl)(diethoxy)silane, (2-aminoethyl)(phenyl)(dimethoxy)silane, (2-aminoethylamino)(ethyl)(triethoxy)silane, (2-aminoethyl)(methyl)(diethoxy)silane, (2-aminoethyl)(methyl)(dimethoxy)silane, (1-aminomethyl)(methyl)(diethoxy)silane, (N-cyclohexyl-aminomethyl)(methyl)(diethoxy)silane (Geniosil XL 924), (N-ethylamino-i-butyl)(trimethoxy)silane, (N-n-butyl-3-aminopropyl)(trimethoxy)silane, (N-n-butyl-3-aminopropyl)(triethoxy)silane, (N-n-butyl-1-aminomethyl)(triethoxy)silane, (N-n-butyl-1-aminomethyl)(trimethoxy)silane, (benzyl-3-aminopropyl)(trimethoxy)silane, (benzyl-3-aminopropyl)(triethoxy)silane, (N-phenylaminomethyl)(trimethoxy)silane (Geniosil XL 973), (N-phenylaminopropyl)(trimethoxy)silane, (N-formyl-3-aminopropyl)(triethoxy)silane, (N-formyl-3-aminopropyl)(trimethoxy)silane, (N-formyl-1-aminomethyl)(methyl)(dimethoxy)silane, (N-formyl-1-aminomethyl)(methyl)(diethoxy)silane, (N-n-butyl-3-aminopropyl)(methyl)(diethoxy)silane, (N-n-butyl-3-aminopropyl)(methyl)(dimethoxy)silane, (N-n-butyl-1-aminomethyl)(methyl)-(dimethoxy)silane, (N-butyl-1-aminomethyl)

(methyl)(diethoxy)silane, (diaminoethylene-3-propyl)(triethoxy)silane, (N-(2-aminoethyl)aminoethyl)(trimethoxy)silane, (2-aminoethylaminoethyl)(triethoxy)silane, (N-(1-aminoethyl)aminomethyl)(trimethoxy)silane, (N-(1-aminoethyl)aminomethyl)(triethoxy)silane, ($H_2N$ ($CH_2$)$_2$NH($CH_2$)$_3$)Si(OCH$_3$)$_3$ ((N-(2-aminoethyl)-3-aminopropyl)(trimethoxy)silane, DAMO)), (2-aminoethylaminopropyl)(triethoxy)silane (Silquest A-1130), (2-aminoethylaminoethyl)(trimethoxy)silane, (2-aminoethylaminoethyl)(triethoxy)silane, (1-aminoethylaminopropyl)(trimethoxy)silane, (1-aminoethylaminopropyl)(triethoxy)silane, (1-aminoethylaminomethyl)(trimethoxy)silane, (1-aminoethylaminomethyl)(triethoxy)silane, (N-cyclohexyl-3-aminopropyl)(trimethoxy)silane, (N—(N-benzylaminoethyl)aminopropyl)(trimethoxy)silane, (3-ureidopropyl)(trimethoxy)silane, (3-ureidopropyl)(triethoxy)silane, (N-(2-aminoethyl)-3-aminopropyl)(methyl)(dimethoxy)silane, (N-(2-aminoethyl)-3-aminopropyl)(methyl)(diethoxy)silane, $H_2N(CH_2)_2NH(CH_2)_2NH(CH_2)_3Si(OCH_3)_3$ ((triaminodiethylene-3-propyl)(trimethoxy)silane, TRIAMO), (triaminodiethylene-3-propyl)(triethoxy)silane, (triaminodiethylene-3-propyl)(trimethoxy)silane, (triaminodiethylene-3-propyl)(triethoxy)silane, (((aminoethyl)aminoethyl)aminopropyl)(trimethoxy)silane, (((aminoethyl)aminoethyl)aminopropyl)(triethoxy)silane, bis(trimethoxysilane)amine, bis(triethoxysilane)amine, bis(trimethoxysilylethyl)amine, bis(triethoxysilylmethyl)amine, bis(triethoxysilylethyl)amine, bis(tri-methoxysilylpropyl)amine, bis(triethoxysilylpropyl)amine, bis(trimethoxysilylisopropyl)amine, bis(triethoxysilylisopropyl)amine, (3-trimethoxy)silylmethyl-O-methylcarbamate, N-dimethoxy-(methyl)silylmethyl-O-methylcarbamate, triethoxysilylpropyl)-t-butylcarbamate, triethoxysilyl-propylethylcarbamate, tris(trimethoxysilylmethyl)amine, tris(trimethoxysilylethyl)amine, tris(trimethoxysilyl-n-propyl)amine, tris(trimethoxysilyl-i-propyl)amine, $N[CH_2)_3Si(OC_2H_5)_3]_3$ (tris(triethoxysilylmethyl)amine, tris-AMEO), tris(triethoxysilylmethyl)amine, tris(triethoxysilylethyl)amine, tris(triethoxysilyl-n-propyl)amine, tris(triethoxysilyl-i-propyl)amine, $N[CH_2)_3Si(OCH_3)_3]_3$ (tris-AMMO), (($H_5C_2O)_3Si(CH_2)_3NH(CH_2)_3Si(OC_2H_5)_3$, (bis(triethoxysilylpropyl)amine, bis-AMEO), ($H_3CO)_3Si(CH_2)_3NH(CH_2)_3Si(OCH_3)_3$ (bis(trimethoxysilylpropyl)amine, bis-AMMO), ($H_3CO)_3Si(CH_2)_3NH(CH_2)_2NH(CH_2)_3Si(OCH_3)_3$ (bis-DAMO), ($H_3CO)_3Si(CH_2)_3NH(CH_2)_2NH(CH_2)_2NH(CH_2)_3Si(OCH_3)_3$ (bis-TRIAMO), ($H_3CO)_2(CH_3)Si(CH_2)_3NH(CH_2)_2NH(CH_2)_3Si(OCH_3)_2(CH_3)$, ($H_3CO)_3(CH_3)Si(CH_2)SiNH(CH_2)_2NH(CH_2)_2NH(CH_2)_3Si(OCH_3)_2(CH_3)$, ($H_3CO)_3Si(CH_2)_3NH(CH_2)_2NH(CH_2)_2NH(CH_2)_3Si(OCH_3)_3$ (bis-DAMO), ($H_3CO)_3Si(CH_2)_3NH(CH_2)_2NH(CH_2)_2NH(CH_2)_2NH(CH_2)_3Si(OCH_3)_3$ (bis-TRIAMO), (3-(trimethoxysilyl)methyl)(O-methyl)carbamate, (N-(dimethoxy)(methyl)silyl)methyl)(O-methyl)carbamate, (3-(triethoxysilyl)propyl)(t-butyl)carbamate, and ((triethoxysilyl)propyl)(ethyl)carbamate. Preferably, at least one aminosilane, preferably at least 95 wt. % aminosilane relative to the total weight of the aminosilane components contained in the heteropolysiloxane, and more preferably all aminosilanes, are selected from the aforementioned examples.

In particular, it is preferred that the at least one aminosilane be selected from the group of the aminosilanes according to formula (I):

$R^{a1}_{x1}R^{b1}_{y1}R^{c1}_{(4-x1-y1)}Si$             (I)

wherein the $R^{a1}$, independently of each other, are selected from functional groups substituted with at least one nitrogen group, wherein the functional group is selected from the group composed of C1-C16 alkyl groups, C2-C8 alkenyl groups, C2-C8 alkinyl groups and phenyl groups, C7-C12 alkylaryl groups, and C7-C12 arylalkyl groups, and mixtures thereof, the $R^{b1}$, independently of each other, are selected from the group composed of unsubstituted branched or unbranched C1-C18 alkyl groups, preferably C1-C16 alkyl groups, C2-C8 alkenyl groups, C2-C8 alkinyl groups, phenyl groups, C7-C12 arylalkyl groups, C7-C12 alkylaryl groups, and mixtures thereof,
the $R^{c1}$, independently of each other, are selected from alkoxy groups,
x1=is 1, 2, or 3, and
y1 is selected from the group of the whole numbers from 0 to (3−x1).

Preferably, at least 95 wt. % of the aminosilanes relative to the total weight of the aminosilane components contained in the heteropolysiloxane, and more preferably all aminosilanes, are selected from the aforementioned silanes. Moreover, it is preferred that x1=1 or 2 and that y1 be selected from the group of the whole numbers from 0 to (2−x1).

When a variable in the embodiments of the present invention is selected from a range of whole numbers, the specified endpoints of the number range are also included.

Unless otherwise specified in the present application, the aforementioned alkyl groups, alkenyl groups, alkinyl groups, and alkoxy groups in this or in the other embodiments of the application may be branched or unbranched.

In further embodiments, the $R^{a1}$, independently of each other, are selected from functional groups substituted with at least one nitrogen group, wherein the functional group is selected from the group composed of C1-C5 alkyl groups, C2-C5 alkenyl groups, C2-C5 alkinyl groups, and mixtures thereof, the $R^{b1}$, independently of each other, are selected from the group composed of unsubstituted branched or unbranched C1-C4 alkyl groups, C2-C4 alkenyl groups, C2-C4 alkinyl groups, phenyl groups, and mixtures thereof, and the $R^{c1}$, independently of each other, are selected from the group of C1-C4 alkoxy groups.

In particular, it is preferred that the $R^{c1}$ be selected from the group composed of methoxy and ethoxy.

In further embodiments, it is preferred that the at least one nitrogen group of $R^{a1}$ be selected from the group composed of $-NH_{(2-r1)}R^{d1}_{r1}$ and $-(NH_{(3-s1)}R^{d1}_{s1})^+$, wherein r1 is selected from the whole numbers from 0 to 2 and s1 is selected from the whole numbers from 0 to 3, and the $R^{d1}$, independently of each other, are selected from the group composed of C1-C16 alkyl groups, C2-C8 alkenyl groups, C2-C8 alkinyl groups, phenyl rings, C7-C12 alkylaryl groups, C7-C12 alkoxyalkyl groups, dialkylenediamine groups, and trialkylenetriamine groups, as well as saturated and unsaturated alkylenes and heteroalkylenes such as —(CH$_2$)$_3$—, —(CH$_3$)$_4$—, —(CH$_2$)$_5$—, —CH=CH—CH=CH— or —CH=N—(CH$_2$)$_2$— if r1 or s1≥2, wherein the heteroatoms in the heteroalkylenes are selected from N and O. The heteroatoms of the heteroalkylenes are preferably nitrogen atoms. Optionally present substituents of the aforementioned groups are preferably selected from nitrogen-containing substituents such as $-NH_{(2-t1)}R^{e1}_{t1}$ and $-(NH_{(2-u1)}R^{e1}_{u1})^+$, wherein t1 is selected from the whole numbers from 0 to 2, u1 is selected from the whole numbers from 0 to 3, and the $R^{e1}$ are selected from the group composed of C1-C4 alkyl groups. In particular, it is preferred that the aforementioned $R^{d1}$ be unsubstituted.

In further embodiments, the $R^{d1}$ are selected from the group composed of C1-C4 alkyl groups, C2-C4 alkenyl groups, C2-C4 alkinyl groups, phenyl rings, C7-C8 alkylaryl groups, C7-C8 alkoxyalkyl groups, dialkylenediamine groups, and trialkylenetriamine groups, as well as saturated and unsaturated C4-C7 alkylenes and C3-C6 heteroalkylenes such as —(CH$_2$)$_3$—, —(CH$_3$)$_4$—, —(CH$_2$)$_5$—, —CH=CH—CH=CH—, or —CH=N—(CH$_2$)$_2$— if r1 or s1≥2, wherein the heteroatoms in the heteroalkylenes are selected from N and O.

Moreover, it is preferred in further embodiments for the at least one nitrogen group of R$^{a1}$ to be selected from the group composed of —NH$_{(2-r1)}$R$^{d1}_{r1}$ and —(NH$_{(3-s1)}$R$^{d1}_{s1}$)$^+$, wherein r1 is selected from the whole numbers from 0 to 2 and s1 is selected from the whole numbers from 0 to 3 and the R$^{d1}$, independently of each other, are selected from the group composed of unsubstituted and substituted C1-C8 alkyl groups, preferably C1-C4 alkyl groups, wherein the substituents are selected from the group composed of —NH$_{(2-t1)}$R$^{e1}_{t1}$ and —(NH$_{(3-u1)}$R$^{e1}_{u1}$)$^+$, wherein t1 is selected from the whole numbers from 0 to 2 and u1 is selected from the whole numbers from 0 to 3, and the R$^{e1}$, independently of each other, are selected from the group composed of unsubstituted C1-C4 alkyl groups and C1-C4 aminoalkyl groups.

In further embodiments, it is preferred that at least one aminosilane be selected from the group composed of aminoalkyltrialkoxysilanes, bis(aminoalkyl)dialkoxysilanes, (alkyl)(aminoalkyl)(dialkoxy)silane, ((aminoalkyl)aminoalkyl)(trialkoxy)silanes, bis(trialkoxysilylalkyl)amines, tris(trialkoxylalkyl)amines, bis-N,N'-(trialkoxysilylalkyl)alkylenediamines, and bis-N,N'-(trialkoxysilylalkyl)dialkylenetriamines, wherein the alkyl groups, independently of each other, are selected from the group composed of methyl groups, ethyl groups, propyl groups, and butyl groups, and the alkoxy groups, independently of each other, are selected from the group composed of methoxy groups and ethoxy groups. Particularly preferably, at least one aminosilane is selected from the group composed of aminoalkyltrialkoxysilanes, ((aminoalkyl)aminoalkyl)(trialkoxy)silanes, and bis(trialkoxysilylalkyl)amines.

According to of the present invention, a distinction is made between alkylsilanes and silanes functionalized by the widest variety of methods, such as aminosilanes. The term "alkylsilane" within the meaning of the present invention does not include functionalized silanes such as aminosilanes, even if they have e.g. an unsubstituted alkyl group in addition to an aminoalkyl group. Examples of the at least one alkylsilane are (methyl)(trialkoxy)silane, (ethyl)(trialkoxy)silane, (n-propyl)(trialkoxy)silane, (i-propyl)(trialkoxy)silane, (n-butyl)(trialkoxy)silane, (i-butyl)(trialkoxy)silane, (n-octyl)(trialkoxy)silane, (i-octyl)(trialkoxy)silane, (decyl)(trialkoxy)silane, (dodecyl)(trialkoxy)silane, (hexadecyl)(trialkoxy)silane, and (dimethyl)(dialkoxy)silane, wherein alkoxy represents methoxy, ethoxy, and mixtures thereof. At least one alkylsilane, preferably at least 95 wt. % of the alkylsilanes relative to the total weight of the alkylsilane components contained in the heteropolysiloxane, and most preferably all of the alkylsilanes are selected from the aforementioned examples.

In further embodiments, it is preferred that the at least one alkylsilane have a structure according to formula (II)

$$R^{a2}_{x2}R^{b2}_{(4-x2)}Si \quad (II),$$

wherein the R$^{a2}$, independently of each other, are selected from the group of unsubstituted C1-C18 alkyl groups, and preferably C1-C16 alkyl groups, the R$^{b2}$, independently of each other, are selected from alkoxy groups, and x2 is selected from 1 and 2. Preferably, at least 95 wt. % of the alkylsilanes relative to the total weight of the alkylsilane components contained in the heteropolysiloxane, and more preferably all of the alkylsilanes, are selected from the aforementioned silanes.

In further embodiments, it is preferred that the R$^{ae}$, independently of each other, be selected from the group of unsubstituted C1-C8 alkyl groups, and that the R$^{b2}$, independently of each other, be selected from the group of C1-C4 alkoxy groups.

In further embodiments, it is preferred that at least one R$^{a2}$ of the at least one alkylsilane according to formula (II) be selected from the group of unsubstituted C1-C3 alkyl groups.

In particular, it is preferred that the R$^{c2}$ be selected from the group composed of methoxy and ethoxy.

In further embodiments, it is preferred that the R$^{a2}$ be selected from the group of branched or unbranched, unsubstituted C1-C8 alkyl groups, more preferably C1-C6 alkyl groups, and even more preferably C1-C4 alkyl groups. Examples of such alkyl chains are methyl, ethyl, i-propyl, n-propyl, n-butyl, i-butyl, t-butyl, hexyl, and octyl.

In further embodiments, it is preferred that the at least one vinylsilane component be selected from the group composed of (vinyl)(trialkoxy)silane, (vinyl)(methyl)(dialkoxy)silane, (vinyl)(tris(methoxyethoxy))silane, (vinyl)tris(2-methoxyethoxy)silane, (vinyl)(triacetoxy)silane, (((vinylbenzylamino)ethylamino)propyl)(trialkoxy)silane, (allyl)(trialkoxy)silane, and (allyl)(triethoxy)silane, wherein alkoxy represents methoxy, ethoxy, and mixtures thereof, and preferably methoxy. Preferably, at least one vinylsilane, more preferably at least 95 wt. % of the vinylsilanes relative to the total weight of vinylsilane components contained in the heteropolysiloxane, and most preferably all of the vinylsilanes, are selected from the aforementioned examples.

In further embodiments, it is preferred that the at least one vinylsilane have a structure according to formula (III)

$$R^{a3}_{x3}R^{b3}_{y3}R^{c3}_{(4-x3-y3)}Si \quad (III),$$

wherein the R$^{a3}$, independently of each other, are selected from the group of unsubstituted C2-C16 vinyl groups,
the R$^{b3}$, independently of each other, are selected from the group of unsubstituted C1-C18 alkyl groups, preferably C1-C16 alkyl groups,
the R$^{c3}$, independently of each other, are selected from alkoxy groups,
x3 is selected from 1 and 2, and
y3 is selected from the group of the whole numbers from 0 to (2−x3).

Preferably, at least 95 wt. % of the vinylsilanes relative to the total weight of the vinylsilane components contained in the heteropolysiloxanes, an more preferably all of the vinylsilanes, are selected from the aforementioned silanes.

In further embodiments, it is preferred that the R$^{a3}$, independently of each other, be selected from the group of unsubstituted C2-C7 vinyl groups, R$^{b3}$, independently of each other, be selected from the group of unsubstituted C1-C8 alkyl groups, and the R$^{c3}$, independently of each other, be selected from the group of C1-C4 alkoxy groups.

In particular, it is preferred that the R$^{b3}$ be selected from the group composed of methoxy and ethoxy.

In further embodiments, it is preferred that the at least one arylsilane be selected from the group composed of (phenyl)(trialkoxy)silane, (phenyl)(methyl)(dialkoxy)silane, (diphenyl)(dialkoxy)silane, (phenyl)(methyl)(dialkoxy)silane, and (benzyl-2-aminoethyl-3-aminopropyl)(trialkoxy)silane, wherein alkoxy represents methoxy, ethoxy, and mixtures thereof, and preferably methoxy.

In further embodiments, it is preferred that the at least one arylsilane have a structure according to formula (IV)

$$R^{a4}_{x4}R^{b4}_{y4}R^{x4}_{(4-x4-y4)}Si \qquad (IV),$$

wherein the $R^{a4}$, independently of each other, are selected from the group composed of phenyl groups, unsubstituted C7-C12 alkylaryl groups, and unsubstituted C7-C12 arylalkyl groups, the $R^{b4}$, independently of each other, are selected from the group of unsubstituted C1-C18 alkyl groups, and preferably C1-C16 alkyl groups,
the $R^{c4}$, independently of each other, are selected from alkoxy groups,
x4 is selected from 1 and 2, and
y4 is selected from the group of the whole numbers from 0 to (2−x4).

Preferably, at least 95 wt. % of the arylsilanes relative to the total weight of the arylsilane components contained in the heteropolysiloxane, and more preferably all of the arylsilanes, are selected from the aforementioned silanes.

In further embodiments, it is preferred that the $R^{a4}$ be selected from the group composed of phenyl groups, C7-C10 unsubstituted alkylaryl groups, and unsubstituted C7-C10 arylalkyl groups, the $R^{b4}$ be selected from the group of unsubstituted C1-C8 alkyl groups, and the $R^{c4}$, independently of each other, be selected from the group of C1-C4 alkoxy groups.

In particular, it is preferred that the $R^{c4}$ be selected from the group composed of methoxy and ethoxy.

Examples of acrylsilanes are (methacryloxymethyl)(methyl)(dialkoxy)silane, (methacryloxymethyl)(trialkoxy)silane, (3-methacryloxypropyl)(trialkoxy)silane, (3-methacryloxyisobutyl)(trialkoxy)silane, (3-methacryloxypropyl)(methyl)(dialkoxy)silane, (1-methacryloxymethyl)(trialkoxy)silane, (3-acryloxypropyl)(trialkoxy)silane, and (acryloxymethyl)(trialkoxy)silane, wherein alkoxy represents methoxy or ethoxy. A particularly preferred example is (methacryloxypropyl)(trimethoxy)silane (MEMO).

In further embodiments, it is preferred that at least one acrylsilane have a structure according to formula (V)

$$R^{a5}_{x5}R^{b5}_{y5}R^{c5}_{(4-x5-y5)}Si \qquad (V),$$

wherein the $R^{a5}$ are selected from the group composed of unsubstituted C3-C10 acryl groups and unsubstituted ((C3-C7-acryloxy)C1-C5-alkyl)trialkoxy,
the $R^{b5}$ are selected from the group of unsubstituted C1-C18 alkyl groups, preferably C1-C16 alkyl groups,
the $R^{c5}$ are selected from alkoxy groups,
x5 is selected from 1 and 2, and
y5 is selected from the group of the whole numbers from 0 to (2−x5).

Preferably, at least 95 wt. % of the acrylsilanes relative to the total weight of the acrylsilane components contained in the heteropolysiloxane, and more preferably all of the acrylsilanes, are selected from the aforementioned silanes.

In further embodiments, the $R^{a5}$ are selected from the group of unsubstituted C3-C7 acryl groups, the $R^{b5}$ are selected from the group of unsubstituted C1-C8 alkyl groups, and the $R^{c5}$ are selected from the group of unsubstituted C1-C4 alkoxy groups.

In particular, it is preferred that the $R^{c5}$ be selected from the group composed of methoxy and ethoxy.

Examples of epoxysilanes are 3-glycidoxypropyltrialkoxysilane, 3-g lycidoxypropyltrialkoxysilane glycidoxypropylmethyldialkoxysilane, and (beta-(3,4-epoxycyclohexyl)ethyl)(trialkoxy)silane, wherein alkoxy represents methoxy, ethoxy or propoxy.

The use of larger amounts of epoxysilane components, for example in typically used wet coating systems such as melamine systems, was found to be detrimental. In e.g. powder coating systems, in contrast, it was found not to be noticeably detrimental, and even to be advantageous. In combination with ferromagnetic pigments in particular, the use of a heteropolysiloxane comprising noticeable amounts of epoxysilanes is not problematic, or is even desirable. In further embodiments, however, it is preferred that the heteropolysiloxane to comprise less than 10 wt. %, more preferably less than 3 wt. %, and even more preferably less than 1 wt. % of epoxysilane components. The latter applies in particular in cases where ferromagnetic pigments, which are primarily intended for use in powder coating systems, are to be provided for a broader field of application.

In further embodiments, it is preferred that the precondensed heteropolysiloxane comprise at least one further monomer selected from the group composed of tetramethoxysilane, tetraethoxysilane, tetrapropoxysilane, and mixtures thereof.

In further embodiments, the heteropolysiloxane preferably comprises at least one silane according to formula (VI)

$$R^{a6}_{4}Si \qquad (VI),$$

wherein the $R^{a6}$, independently of each other, are selected from alkoxy groups. Preferably, the $R^{a}$, independently of each other, are selected from the group of C1-C4 alkoxy groups.

In further embodiments, it is preferred that at least 32 wt. % of the monomer components, preferably at least 36 wt. % of the monomer components, and even more preferably at least 41 wt. % of the monomer components making up the precondensed heteropolysiloxane be selected from the aminosilanes, relative in each case to the total weight of the heteropolysiloxane.

It is also preferred in further embodiments that the percentage of aminosilane components in the precondensed heteropolysiloxane be no more than 95 wt. %, more preferably no more than 89 wt. %, and even more preferably no more than 86 wt. %, relative in each case to the total weight of the heteropolysiloxane.

In particular, it is preferred in further embodiments that the percentage of aminosilane components in the precondensed heteropolysiloxane be in the range of 32 wt. % to 95 wt. %, more preferably in the range of 36 wt. % to 89 wt. %, and even more preferably in the range of 41 wt. % to 86 wt. %, relative in each case to the total weight of the heteropolysiloxane.

In further embodiments, it is preferred that at least 12 wt. % of the monomer components, more preferably at least 17 wt. % of the monomer components, and even more preferably at least 23 wt. % of the monomer components of the precondensed heteropolysiloxane be selected from the alkylsilanes, relative in each case to the total weight of the heteropolysiloxane.

Moreover, it is preferred in further embodiments that no more than 76 wt. % of the monomer components, more preferably no more than 72 wt. % of the monomer components, and even more preferably no more than 69 wt. % of the monomer components of the precondensed heteropolysiloxane be selected from alkylsilanes, relative in each case to the total weight of the heteropolysiloxane.

In particular, it is preferred in further embodiments that the percentage of alkylsilane components in the precondensed heteropolysiloxane be the range of 12 wt. % to 76 wt. %, more preferably in the range of 17 wt. % to 72 wt. %, and even more preferably in the range of 23 wt. % to 69 wt. %, relative in each case to the total weight of the heteropolysiloxane.

In further embodiments, it is preferred that the precondensed heteropolysiloxane be composed to at least 87 wt. %, more preferably to at least 93 wt. %, and even more preferably to at least 97 wt. % of monomer components selected from aminosilanes and alkylsilanes.

In further preferred embodiments, the aforementioned values concerning alkylsilane components and aminosilane components refer to the specific groups of alkylsilanes and aminosilanes listed above. This applies, for example, if at least 95 wt. % of the alkylsilane has a structure according to formula (II)

$$R^{a2}_{x2}R^{b2}_{(4-x2)}Si \qquad (II),$$

wherein the $R^{a2}$, independently of each other, are selected from the group of unsubstituted C1-C18 alkyl groups, preferably C1-C16 alkyl groups, the $R^{b2}$, independently of each other, are selected from alkoxy groups, and x2 is selected from 1 and 2. Preferably, at least 95 wt. % of the alkylsilanes relative to the total weight of the alkylsilane components contained in the heteropolysiloxane, and more preferably all of the alkylsilanes, are selected from the aforementioned silanes.

In further embodiments, the coating of the metal pigments according to the invention, particularly the metal effect pigments, preferably has an average thickness in the range of 20 nm to 160 nm, and more preferably in the range of 25 nm to 135 nm, as determined by raster electron microscopy.

The layer thicknesses of the metal oxide layers and the plastic layers on the metal pigments is determined, for example, on suitable cross-sections means of REM images. In this case, the pigments are applied in a coating, and this coating is cured. Here, it is important to ensure that the orientation of the flakes in the application medium is as favorable as possible. After this, the cured coating is partially abraded and observed by REM after preparing the samples by a commonly-use method. Only the particles having a favorable plane-parallel orientation are selected for counting. In this method, poorly oriented flakes cause high error rates because of the unknown viewing angle. These coatings show quite favorable contrast with respect to the metal core. If it is not possible to clearly distinguish between the layer thicknesses of the metal oxide and the plastic layer, spatially resolved EDX analyses can be carried out before the layer thicknesses are measured. The term "average layer thickness" within the meaning of the invention refers to the arithmetic average of the thicknesses of the layers of at least 30 metal pigments, and preferably 40 metal pigments. If the coating is uneven, the arithmetic average of the thinnest and thickest coating areas of the respective particle is determined. Significant individual deviations, caused for example by inclusion of already-coated fine particle pigments in the coating, are not taken into consideration in calculating average layer thickness.

The metal pigments according to the invention can be in the form of a dry preparation, paste, or suspension. Examples of dry preparations within the meaning of the present invention are powder and granulates. In particular, the pigments according to the invention can be incorporated into coating agents, selected for example from the group composed of wet coatings such as water-based coatings and solvent-containing coatings, powder coatings, coil coating formulations, and printing inks. The pigments according to the invention are also outstandingly suitable for use in plastics or cosmetics. A particularly preferred group of coating agents are coatings such as printing inks and other inks, wet coatings, and powder coatings. A particular field of application of the printing inks and other inks is the area of security inks.

The present invention also concerns the use of the pigments according to the invention in both water-based and solvent-based coatings. Such coatings are used for example in the automotive and industrial sectors. In use in water-based systems, the pigment according to the invention may be clarified in water or common cosolvents such butyl glycol. The pigment according to the invention can also be directly incorporated into the water-based application medium. The situation for use in solvent-based coatings is similar. In this case, the pigments according to the invention are characterized by outstanding dispersion behavior.

In conventional metal pigments, particularly metal effect pigments, changes may occur during long-term storage. This can be caused by agglomeration of the pigments and/or corrosion of e.g. aluminum pigments. This in turn results in a decrease in opacity. With the pigments according to the invention, however, particularly advantageous results can be achieved because they have less tendency to agglomerate.

Moreover, the coated pigments according to the invention surprisingly show improved orientation in wet coatings, allowing better lightness flops to be achieved.

The invention also concerns the use of the pigments according to the invention in powder coatings. Powder coatings are used, for example, in industrial mass production for the coating of electrically conductive and temperature-resistant materials. In this case, the powder coating to be applied is in the form of a solid and solvent-free powder. Moreover, powder coatings used as primer coats or single-layered top coats are almost fully recyclable. These environmentally friendly and versatile powder coatings contain binders, pigments, fillers and crosslinking agents, as well as optional additives. The term binder is to be understood according to the definition known to the person skilled in the art. This means that binders include both film-forming agents and non-volatile excipients such as plasticizers, fillers, and/or curing agents. Application of fine powder coatings is generally conducted electrostatically before they are baked or cured using radiant energy.

Metal effect pigments, among other substances, can be used for pigmentation of the powder coatings. In the case of powder coatings produced by mixed methods, however, the problem of damage to or destruction of the pigment flakes my arise because of the shear forces acting on these flakes during the extrusion and grinding process. In particular, this may adversely affect the luster and thus the optical effect of such pigmented applications.

For this reason, in the dry blend method, for example, the metal effect pigments are not mixed into the base powder coating until after grinding. The disadvantage of this, however, is the possible separation of pigment and powder concentration during coating application resulting from the differing loading behavior of the individual paint components. This results in an irregular optical effect as a result of decreases or increases in the concentration of the pigment in the powder coating during application thereof. Moreover, the separation of the pigment and binders causes changes in the composition of the "overspray," i.e. the portion of the powder coating that is sprayed past the object to be coated and should be recycled due to cost reasons. Alternatively, the so-called bonding method, in which the pigment is caused by heating to adhere to the particles of the base coating. However, the production of such bonding powder coatings is relatively costly. The least expensive powder coatings currently used are produced using mixed methods. In these methods, the pigments are mixed, extruded, and ground together with all of the various raw materials.

Moreover, the pigments according to the invention can be used in the coil coating process. This process is characterized by being highly environmentally friendly. Coating and drying take place continuously in a closed system, and in the no-rinse method, the need for rinsing off chemical residues is also obviated. Moreover, application efficiency of almost 100% can be achieved by means of optimized process control, while in most other coating methods, greater losses occur, e.g. due to overspraying. In coil coating method, however, as the coat is baked at temperatures of 240 to 280° C., only particularly stable pigments can be used in this method.

The pigments according to the invention can also be used in printing inks. Examples of such printing inks include deep printing, screen printing, or flexo printing inks. The pigments according to the invention are also particularly well-suited for water-based coatings (water-based finishes) and outdoor applications.

Deep printing, screen printing, or flexo printing inks contain solvents or solvent mixtures. These can be used for purposes such as dissolving the binders or also for adjusting of important application properties of the printing inks such as viscosity or drying rate. Low-boiling-point solvents are typically used, while higher-boiling-point solvents are used in small amounts for adjustment of the drying rate.

In addition to solvents, various other components may be contained in a coating, such as reactive diluents and photoinitiators in radiation-curable printing inks; binders such as nitrocellulose, ethylcellulose, hydroxyethylcellulose, acrylate, polyvinylbutyrate, aliphatic and aromatic polyurethanes and polyureas; fillers such as calcium carbonate, aluminum oxide hydrate, aluminum silicate, and magnesium silicate, waxes such as polyethylene waxes, oxidized polyethylene waxes, petroleum waxes and ceresin waxes; fatty acid amides, plasticizers, dispersing agents, fatty acids, and anti-settling agents.

The present invention also concerns the use of the pigments according to the invention in polymers. In addition to the additional protection provided by the coating according to the invention, the pigments can be favorably incorporated into and dispersed in polymers, for example thermoplastic polymers.

Examples of thermoplastic polymers are polyoxyalkylenes, polycarbonates (PC), polyesters such as polybutylene terephthalate (PBT) or polyethylene terephthalate (PET), polyolefins such as polyethylene (PE) or polypropylene (PP), poly(meth)acrylates, polyamides, vinyl aromatic (co) polymers such as polystyrene, impact-modified polystyrene such as HI-PS, or ASA, ABS, or AES polymers, polyarylene ethers such as polyphenylene ether (PPE), polysulfones, polyurethanes, polylactides, halogen-containing polymers, imide group-containing polymers, cellulose esters, silicone polymers, or thermoplastic elastomers. Mixtures of various thermoplastics can also be used.

In further embodiments, the cosmetic is selected from the group composed of body powders, face powders, pressed and loose powder, facial makeup, powder creme, creme makeup, emulsion makeup, wax makeup, foundation, foam makeup, rouge, eye makeup such as eye shadow, mascara, eyeliner, liquid eye liner, eyebrow pencils, lip care sticks, lipstick, lip gloss, lip liner, hairstyling compositions such as hair spray, hair mousse, hair gel, hair wax, hair mascara, permanent or semi-permanent hair dyes, temporary hair dyes, skin care compositions such as lotions, gels, emulsions, and fingernail polish compositions.

The invention also concerns the use of at least one precondensed heteropolysiloxane in order to increase the stability of metal pigments and provide improvements in the application properties of metal pigments, selected from the group composed of improving the stability of metal pigments, improving the applicability and orientability of metal pigments in the wet coating or powder coating, particularly in the powder coating, reducing the tendency to agglomerate of metal pigments, improving the orientation of metal pigments in coating systems, and combinations thereof, wherein the metal pigments have at least one first coating layer comprising at least one metal oxide, wherein the term metal oxide also includes oxide hydrates and hydroxides, and wherein the heteropolysiloxane comprises at least one aminosilane component and at least one silane component selected from the group composed of alkylsilanes, vinylsilanes, and arylsilanes. The heteropolysiloxane preferably contains at least one aminosilane component and at least one alkylsilane component. In particular, it is preferred that the silane monomer composing the heteropolysiloxanes be selected according to the above embodiments.

In further embodiments, the heteropolysiloxane is applied as the outermost layer to a surrounding coating layer comprising at least one metal oxide.

In further embodiments, the metal pigment comprises at least one inorganic/organic mixed layer.

In further embodiments, the heteropolysiloxane is applied to a coating layer composed essentially of metal oxides, preferably silicon oxide.

The invention also concerns a method for the production of a pigment according to the invention, wherein the method comprises the following steps:

provision of an optionally precoated metal pigment,
production of at least one first coating layer surrounding the metal pigment, wherein the at least one first coating layer comprises at least one metal oxide on the optionally precoated metal pigment,
application of at least one second coating layer comprising at least one precondensed heteropolysiloxane on the at least one first coating layer having at least one metal oxide, wherein the term metal oxide also includes oxide hydrates and hydroxides,
wherein a coating layer comprising at least one precondensed heteropolysiloxane constitutes the outermost coating layer of the metal pigment, and
wherein the at least one precondensed heteropolysiloxane has at least one aminosilane component and at least one silane component selected from the group composed of alkylsilanes, vinylsilanes, and arylsilanes.

In particular, it is preferred that the heteropolysiloxane comprise at least one aminosilane component and at least one alkylsilane component. The term "precondensed" in connection with the heteropolysiloxane, within the meaning of the present invention, signifies that the relevant silane monomers have already been condensed in a separate step prior to application of the heteropolysiloxane. The polycondensation of the silane monomers thus does not take place in the presence of the metal pigments to be coated. Preferably, the precondensed heteropolysiloxanes used according to the invention have no more than 25%, more preferably no more than 19%, and even more preferably no more than 16% uncondensed groups. Determination of the uncondensed groups, particularly hydroxyl groups, is conducted using methods commonly known to the person skilled in the art.

Here, the number of hydrolyzed and/or hydrolyzable condensable groups is related to the total number of already condensed and uncondensed groups.

In further embodiments, the method preferably comprises the following steps for precoating of the metal pigments:
conversion of at least one inorganic network-forming agent, at least one organic network-forming agent, and at least one reactive organic component to a liquid phase, thus forming a coating composition, and
application of the coating composition to metal pigments as a mixed layer,
wherein the metal pigments are added before, during or after the addition or conversion of the at least one inorganic network-forming agent, the at least one organic network-forming agent, and the at least one reactive organic component to the liquid phase,
wherein the mixed layer at least partially contains an inorganic network having one or a plurality of inorganic oxide component(s) and at least one organic component, and wherein the organic component is at least partially an organic oligomer and/or polymer that is at least partially covalently bonded to the inorganic network.

In further embodiments, the method comprises the following steps:
(a) provision of a reaction mixture of metal pigments in a liquid phase,
(b1) addition of at least one inorganic network-forming agent to the reaction mixture of step (a),
(c1) hydrolysis or condensation of the inorganic network-forming agent added in step (b1),
(d1) addition of at least one reactive organic network-forming agent and at least one reactive organic component beginning before or during and ending during or after the hydrolysis and/or condensation of step (c1), or
(b2) addition of at least one reactive organic network-forming agent and at least one reactive organic component to the reaction mixture of step (a),
(c2) addition of at least one inorganic network-forming agent to the reaction mixture of step (b2),
(d2) hydrolysis or condensation of the inorganic network-forming agent added in step (c2), and
(e) reaction of hydrolyzed and/or condensed inorganic network-forming agents with the reactive organic network-forming agents, as well as the reactive organic component, with concurrent and/or subsequent deposition of the inorganic/organic mixed layer,
(f) optional separation of the coated metal pigments of step (e) from the reaction mixture.

In further embodiments, the reactive organic component is added in the form of reactive polymerizable organic monomers, oligomers, and/or polymers.

The reactive organic component can be added in the form of monomers, oligomers, polymers, and mixtures thereof. In further embodiments, at least one reactive oligomer or polymer is added as a reactive organic component.

In further embodiments, at least one polymerization initiator is added, such as an azo or peroxoinitiator. Examples of corresponding polymerization initiators are AIBN, V601, Fenton's reagent, or benzoyl peroxide.

Provided that the metal pigment obtained after precoating has a surrounding coating layer that contains a metal oxide, and preferably the desired metal oxide(s), the second coating layer can immediately be applied to this first coating layer with or from the heteropolysiloxane.

Of course, first a coating layer comprising at least a first metal oxide and then a second heteropolysiloxane-containing coating layer can also be applied to a precoated metal pigment, which for example has an inorganic/organic mixed layer as its outer layer.

The precondensed heteropolysiloxane used according to the invention comprises at least one aminosilane component and at least one silane component selected from the group composed of alkylsilanes, vinylsilanes, and arylsilanes. The condensation of corresponding monomers, oligomers, and/or polymers for production of the heteropolysiloxanes used is conducted using methods known to the person skilled in the art such as those disclosed for example in U.S. Pat. No. 5,808,125 A, U.S. Pat. No. 5,679,147 A, and U.S. Pat. No. 5,629,400 A. Moreover, various heteropolysiloxanes are also commercially available.

Preferably, the heteropolysiloxane is used in the form of an aqueous formulation. In particular, formulations should preferably have a concentration of heteropolysiloxane in the range of 5 to 50 wt. % relative to the total weight of formulation.

Application of the heteropolysiloxane can be carried out using a method known to the person skilled in the art. A method that is preferred, because it allows outstanding results to be obtained with very little expense, is that of allowing an aqueous solution of the heteropolysiloxane to act on the pigment to be coated. In this case, the exposure time should be between 15 minutes and 240 minutes.

In further embodiments, it is particularly preferred for application of the heteropolysiloxane layer not to be followed by any curing step, particularly thermal curing, of the siloxane layer.

In further embodiments, the heteropolysiloxane contains less than 0.5 wt. % of alcohols released during production of the heteropolysiloxanes due to hydrolysis and/or condensation.

Surprisingly, it was also found that the heteropolysiloxane should be essentially completely, and preferably completely hydrolyzed. Despite the reduced possibility of further reaction or crosslinking, such heteropolysiloxanes show predominantly better results.

The heteropolysiloxanes used according to the invention preferably have a content of highly volatile organic solvents of less than 0.3 wt. % relative to the total weight of the heteropolysiloxanes.

The heteropolysiloxane is preferably used in the form of an aqueous formulation. It is typically preferred in most applications that the aqueous formulation comprising the heteropolysiloxane contain the smallest possible amounts of VOCs (volatile organic compounds) compared to the alcohol ordinarily produced in the reaction of the silane monomers. In further embodiments, it is preferred that the aqueous formulations contain less than 5 wt. %, preferably less than 1 wt. %, more preferably less than 0.5 wt. %, and even more preferably less than 0.1 wt. % of VOCs, relative in each case to the weight of the aqueous formulation. Ideally, aqueous formulations containing no VOCs are used.

Preferably, the alcohol produced in condensation of the silane monomers is continuously removed from the reaction mixture.

For example, production of the surrounding coating layer comprising at least one metal oxide according to the invention can be carried out by the sol-gel process.

In further embodiments, the metal oxide of the at least one surrounding coating layer comprising at least one metal oxide is essentially, and preferably completely, selected from the group composed of silicon oxide, aluminum oxide, boron oxide, zirconium oxide, cerium oxide, iron oxide, titanium oxide, chromium oxide, tin oxide, molybdenum oxide, their oxide hydrates, their hydroxides, and mixtures thereof. Particularly preferably, the metal oxides according to the invention are selected from the group composed of silicon oxide, aluminum oxide, and mixtures thereof, wherein the aforementioned metal oxides also include their oxide hydrates and hydroxides. In particular, the use of silicon oxides such as silicon dioxide, silicon hydroxide, and/or silicon oxide hydrate has been found to be advantageous.

It has also been found that highly favorable results are achieved by means of the combination according to the invention of the application of the precondensed heteropolysiloxane to the surrounding metal oxide-containing coating layer, even in use of a simple layer composted essentially of metal oxide. In further embodiments, therefore, the at least one coating layer to which the at least one precondensed heteropolysiloxane is applied is composed essentially of a metal oxide, preferably silicon oxide.

In contrast, particularly high-quality properties, for example with respect to stability, are achieved by using a more complex inorganic/organic mixed layer. In further embodiments, therefore, the applied coating layer comprising at least one metal oxide is composed of an inorganic/organic mixed layer. In particular, it is preferred that the above-mentioned inorganic/organic mixed layer comprise silicon oxide. Preferably, the metal oxide contained in the inorganic/organic mixed layer is composed essentially of silicon oxide, silicon hydroxide, silicon oxide hydrate, or mixtures thereof.

In further embodiments, the method comprises the application of at least one further coating layer containing at least one metal oxide.

In further embodiments, the method comprises the application of at least one further coating layer composed essentially of at least one organic polymer. The relevant layer is arranged between the at least one surrounding coating layer comprising at least one metal oxide and the metallic substrate.

According to further preferred embodiments, the at least one organic polymer is composed essentially of a polymer selected from the group composed of polyacrylate, polymethacrylate, polyacrylamide, polyacrylonitrile, polyvinyl chloride, polyvinyl acetate, polyamide, polyalkene, polydiene, polyalkine, polyalkylene glycol, epoxy resin, polyester, polyether, polyol, polyurethane, polycarbonate, polyethylene terephthalate, and mixtures thereof. Polymer layers in which the organic polymer is essentially selected from the group composed of polyacrylate, polymethacrylate, polyurethane, polyester, and mixtures thereof, and more preferably from the group composed of polyacrylate, polymethacrylate, and mixtures thereof, have been found to be particularly advantageous.

In further embodiments, the specified coating layers are applied in a one-pot reaction.

In further embodiments, the production of the surrounding coating layer comprising at least one metal oxide is at least largely completed before the coating containing the at least one coating layer comprising at least one heteropolysiloxane is applied. The term "largely completed" production of the coating layer is understood within the meaning of the present invention to mean that no more than 30 wt. % of the educts of the coating are still reactive. Preferably, less than 15 wt. %, and more preferably less than 5 wt. % of the educts are still reactive. The amount is determined based on the amounts of reactive educts still present in solution.

In further embodiments, at least one tetraalkoxysilane or an oligomer of at least one tetraalkoxysilane is used in the production of the at least one coating layer comprising at least one metal oxide. The alkoxy groups of the tetraalkoxysilane, independently of each other, may be selected for example from the group of the C1-04 alkoxy groups. However, tetraalkoxy groups with at least 3, and preferably at least 4 identical alkoxy groups constitute particularly preferred tetraalkoxysilanes. The tetraalkoxysilanes are preferably selected from the group composed of tetraethoxysilane and oligomers of tetraethoxysilane.

In further embodiments, an organofunctional silane is used in the production of at least one coating layer comprising at least one metal oxide.

In further embodiments, the liquid phase is a solvent selected from the group composed of water, alcohols, glycol ethers, ketones, acetate esters, white spirit, and mixtures thereof.

In further embodiments, the reaction temperature in steps (b) to (e) is in the range of 0° C. to 180° C., preferably 40° C. to 120° C., and more preferably in the range of 60° C. to 100° C.

In further embodiments, the pH in the steps (c1) or (d2) is in the range of 2 to 4, and the pH in step (e) is in the range of 8 to 9.

In particular, it is preferred in further embodiments for the coated metal pigments of the invention, particularly those described in the claims, to be produced according to the aforementioned method, and preferably specific embodiments thereof. Particularly preferred are the variant methods specified the claims and aspects below.

The invention also concerns coating agents containing coated metal pigments selected from the group composed of coated metal pigments according to one of the claims or aspects, as well as metal pigments produced according to a method according to one of the claims or aspects.

In further embodiments, the coating agent is selected from the group composed of water-based coatings, solvent-containing coatings, and powder coatings. Powder coatings constitute particularly preferred coating agents for the coated ferromagnetic pigments according to the invention.

The invention also concerns an object of the metal pigments with a coating, also referred to as coated metal pigments, according to one of the claims or aspects.

According to an aspect 1, the present invention concerns a metal pigment having a metallic substrate and coating, wherein the coating comprises at least one first coating layer surrounding the metal pigment containing at least one metal oxide and at least one second coating layer containing at least one heteropolysiloxane, wherein the term metal oxide also includes oxide hydrates and hydroxides, wherein the at least one heteropolysiloxane has at least one aminosilane component and at least one silane component selected from the group composed of alkylsilanes, vinylsilanes and phenylsilanes, and the heteropolysiloxane in precondensed form has been applied to at least one first surrounding coating layer comprising at least one metal oxide, and the heteropolysiloxane constitutes the outermost coating layer of the metal pigment. The metal pigments are preferably flaky metal pigments.

According to an aspect 2 of the present invention, the coated metal pigment according to aspect 1 is preferably flaky.

According to an aspect 3 of the present invention, the coated metal pigment according to one of aspects 1 to 2 preferably has a coating with an average thickness in the range of 20 nm to 160 nm. The thickness of the coating is conducted by raster electron microscopy.

According to an aspect 4 of the present invention the coated metal pigment according to one of aspects 1 to 3 preferably contains no coating layer composed of thermoresponsive polymer, preferably organic polymer. More preferably, the coated metal pigment contains no coating layer composed essentially of at least one thermoresponsive polymer, and preferably at least one organic polymer.

According to an aspect 5 of the present invention, in the coated metal pigment according to one of aspects 1 to 4, the precondensed heteropolysiloxane is preferably not applied to a surrounding coating layer comprising at least one metal oxide, which constitutes an oxidation product of the metal pigment and is thinner than 20 nm. Preferably, the surrounding first coating layer comprising at least one metal oxide, is not an oxidation product of the metal pigment.

According to an aspect 6 of the present invention, the metallic substrate of the coated metal pigment according to one of aspects 1 to 5 is preferably a metal core.

According to an aspect 7 of the present invention, the coated metal pigment according to one of aspects 1 to 6 preferably has a methanol content of less than 1 wt. % relative to the total weight of the pigment. In particular, it is preferred that the metal pigments according to the invention contain only trace amounts of methanol.

According to an aspect 8 of the present invention, the coating of the coated metal pigment according to one of aspects 1 to 7 preferably has a metal oxide content of at least 43 wt. %, preferably of at least 65 wt. %, and more preferably of at least 82 wt. %, in each case relative to the total weight of the coating.

According to an aspect 9 of the present invention, in the coated metal pigment according to one of aspects 1 to 8, at least 87 wt. %, preferably at least 93 wt. %, and more preferably at least 97 wt. % of the silane monomer components of the precondensed heteropolysiloxane are preferably selected from the group composed of aminosilanes, alkylsilanes, and mixtures thereof, relative in each case to the total weight of the heteropolysiloxane.

According to an aspect 10 of the present invention, in the coated metal pigment according to one of aspects 1 to 9, the at least one aminosilane component is selected to at least 92 wt. % relative to the total weight of the aminosilane components contained in the heteropolysiloxane, and preferably completely, selected from the group composed of (H$_2$N(CH$_2$)$_3$)Si(OCH$_3$)$_3$ ((3-aminopropyl)(trimethoxy)silane, AMMO), (H$_2$N(CH$_2$)$_3$Si(OC$_2$H$_5$)$_3$ ((3-aminopropyl)(triethoxy)silane, AMEO), (H$_2$N(CH$_2$)$_2$)NH(CH$_2$)$_3$)Si(OCH$_3$)$_3$ ((N-(2-aminoethyl)-3-aminopropyl)(trimethoxy)silane, (DAMO)), (N-(2-aminoethyl)-3-aminopropyl)(triethoxy)silane, and mixtures thereof.

According to an aspect 11 of the present invention, in the coated metal pigment according to one of aspects 1 to 10, the at least one aminosilane is preferably selected from the group of the aminosilanes according to formula (I):

  (I), wherein the R$^{a1}$, independently of each other, are selected from functional groups substituted with at least one nitrogen group, wherein the functional group is selected from the group composed of C1-C16 alkyl groups, C2-C8 alkenyl groups, C2-C8 alkinyl groups, phenyl groups, C7-C12 alkylaryl groups, and C7-C12 arylalkyl groups, the R$^{b1}$, independently of each other, are selected from the group composed of unsubstituted branched or unbranched C1-C18 alkyl groups, preferably C1-C16 alkyl groups, C2-C8 alkenyl groups, C2-C8 alkinyl groups, phenyl groups, C7-C12 arylalkyl groups, C7-C12 alkylaryl groups, and mixtures thereof, the R$^{b1}$, independently of each other, are selected from alkoxy groups, x1 is 1, 2, or 3, and y1 is selected from the group of the whole numbers from 0 to (3−x1).

Preferably, at least 95 wt. % of the aminosilane components relative to the total weight of the aminosilane components contained in the heteropolysiloxane, and more preferably all of the aminosilane components, are selected from the aforementioned silanes. Moreover, it is preferred that x1 be selected from 1 and 2 and y1 from the group of the whole numbers from 0 to (2−x1).

According to an aspect 12 of the present invention, in the coated metal pigment according to one of aspects 1 to 11, the R$^{a1}$, independently of each other, are selected from functional groups substituted with at least one nitrogen group, wherein the functional group is selected from the group composed of C1-C5 alkyl groups, C2-C5 alkenyl groups, and C2-C5 alkinyl groups, the R$^{b1}$, independently of each other, are selected from the group composed of unsubstituted branched or unbranched C1-C4 alkyl groups, C2-C4 alkenyl groups, C2-C4 alkinyl groups, and phenyl groups, and the R$^{c1}$, independently of each other, are selected from the group of the C1-C4 alkoxy groups. Preferably, the R$^{c1}$ are selected from the group composed of methoxy and ethoxy.

According to an aspect 13 of the present invention, in the coated metal pigment according to one of aspects 1 to 12, the at least one nitrogen group of R$^{a1}$ is preferably selected from the group composed of —NH$_{(2-r1)}$R$^{d1}_{r1}$ and —(NH$_{(3-s1)}$R$^{d1}_{s1}$)$^+$, wherein r1 is selected from the whole numbers from 0 to 2 and s1 is selected from the whole numbers from 0 to 3, and the R$^{d1}$, independently of each other, are selected from the group composed of C1-C16 alkyl groups, C2-C8 alkenyl groups, C2-C8 alkinyl groups, phenyl rings, C7-C12 alkylaryl groups, C7-C12 alkoxyalkyl groups, dialkylenediamine groups and trialkylenetriamine groups, as well as saturated and unsaturated alkylenes and heteroalkylenes such as —(CH$_2$)$_3$—, —(CH$_3$)$_4$—, —(CH$_2$)$_5$—, —CH═CH—CH═CH— or —CH═N—(CH$_2$)$_2$—, if r1 or s1≥2, wherein the heteroatoms in the heteroalkylenes are selected from N and O. Preferably, the heteroatoms of the heteroalkylene are nitrogen atoms. Optionally present substituents of the aforementioned groups are preferably selected from nitrogen-containing substituents such as —NH$_{(2-t1)}$R$^{e1}_{t1}$ and —(NH$_{(2-u1)}$R$^{e1}_{u1}$)$^+$, wherein t1 is selected from the whole numbers from 0 to 2, u1 from the whole numbers from 0 to 3, and the R$^{e1}$ are selected from the group composed of C1-C4 alkyl groups. In particular, it is preferred that the aforementioned R$^{d1}$ be unsubstituted.

According to an aspect 14 of the present invention, in the coated metal pigment according to one of aspects 1 to 13, the R$^{d1}$, independently of each other, are preferably selected from the group composed of C1-C4 alkyl groups, C2-C4 alkenyl groups, C2-C4 alkinyl groups, phenyl rings, C7-C8 alkylaryl groups, C7-C8 alkoxyalkyl groups, dialkylenediamine groups, trialkylenetriamine groups, as well as saturated and unsaturated C4-C7 alkylenes and C3-C6 heteroalkylenes such as —(CH$_2$)$_3$—, —(CH$_3$)$_4$—, —(CH$_2$)$_5$—, —CH═CH—CH═CH— or —CH═N—(CH$_2$)$_2$—, if r1 or s1≥2, wherein the heteroatoms in the heteroalkylenes are selected from N and O.

According to an aspect 15 of the present invention, in the coated metal pigment according to one of aspects 1 to 14, the at least one nitrogen group of the $R^{a1}$ is preferably selected from the group composed of $-NH_{(2-r1)}R^{d1}_{r1}$ and $-(NH_{(3-s1)}R^{d1}_{s1})^+$, wherein r1 is selected from the whole numbers from 0 to 2 and s1 is selected from the whole numbers from 0 to 3, and the $R^{d1}$, independently of each other, are selected from the group composed of unsubstituted and substituted C1-C8 alkyl groups, preferably C1-C4 alkyl groups, wherein the substituents are selected from the group composed of $-NH_{(2-t1)}R^{e1}_{t1}$ and $-(NH_{(3-u1)}R^{e1}_{u1})^+$, wherein t1 is selected from the whole numbers from 0 to 2 and u1 from the whole numbers from 0 to 3, and the $R^{e1}$, independently of each other, are selected from the group composed of unsubstituted C1-C4 alkyl groups and C1-C4 aminoalkyl groups.

According to an aspect 16 of the present invention, in the coated metal pigment according to one of aspects 1 to 15, the at least one alkylsilane is preferably selected from the group composed of (methyl)(trialkoxy)silane, (ethyl)(trialkoxy)silane, (n-propyl)(trialkoxy)silane, (i-propyl)(trialkoxy)silane, (n-butyl)(trialkoxy)silane, (i-butyl)(trialkoxy)silane, (n-octyl)(trialkoxy)silane, (i-octyl)(trialkoxy)silane, (decyl)(trialkoxy)silane, (dodecyl)(trialkoxy)silane, (hexadecyl)(trialkoxy)silane and (dimethyl)(dialkoxy)silane, wherein alkoxy represents methoxy, ethoxy, and mixtures thereof.

According to an aspect 17 of the present invention, in the coated metal pigment according to one of aspects 1 to 16, the at least one alkylsilane preferably has a structure according to formula (II)

$$R^{a2}_{x2}R^{b2}_{(4-x2)}Si \qquad (II),$$

wherein the $R^{a2}$, independently of each other, are selected from the group of unsubstituted C1-C18 alkyl groups, and preferably C1-C16 alkyl groups, the $R^{b2}$, independently of each other, are selected from alkoxy groups, and x2 is selected from 1 and 2. Preferably, at least 95 wt. % of the alkylsilane components relative to the total weight of the alkylsilane components contained in the heteropolysiloxane, and more preferably all of the alkylsilanes, are selected from the aforementioned silanes.

According to an aspect 18 of the present invention, the silane monomer components of the heteropolysiloxanes of the coated metal pigment according to one of aspects 1 to 17 preferably comprise no more than 10 wt. %, more preferably no more than 6 wt. %, even more preferably no more than 4 wt. %, and even more preferably no more than traces of epoxysilane components relative to the total weight of the heteropolysiloxanes.

According to an aspect 19 of the present invention, the heteropolysiloxane of the coated metal pigment according to one of aspects 1 to 18 is preferably completely hydrolyzed according to one of the above aspects.

According to an aspect 20 of the present invention, the at least one first coating layer, and more preferably all of the first coating layers containing the metal oxide of the coated metal pigment according to one of aspects 1 to 19, are preferably composed of at least one metal oxide that preferably has a low refractive index.

According to an aspect 21 of the present invention, the metal oxide of the at least one first surrounding coating layer comprising at least one metal oxide of the coated metal pigment according to one of aspects 1 to 20 is preferably selected from the group composed of silicon oxide, aluminum oxide, boron oxide, zirconium oxide, cerium oxide, iron oxide, titanium oxide, chromium oxide, tin oxide, molybdenum oxide, and mixtures thereof, wherein the aforementioned metal oxides also include their oxide hydrates and hydroxides. Preferably, the metal oxide is selected from the group composed of silicon oxide, aluminum oxide, and mixtures thereof, wherein the aforementioned metal oxides also include their oxide hydrates and hydroxides.

According to an aspect 22 of the present invention, the metal oxide of the at least one first surrounding coating layer comprising at least one metal oxide of the coated metal pigment according to one of aspects 1 to 21 is preferably essentially selected from the group composed of silicon oxide, silicon hydroxide, silicon oxide hydrate, and mixtures thereof.

According to an aspect 23 of the present invention, the metal core of the coated metal pigment according to one of aspects 1 to 22 is preferably composed essentially of aluminum, and the coating comprises at least one first coating layer composed essentially of silicon oxide, silicon hydroxide, silicon oxide hydrate, or mixtures thereof.

According to an aspect 24 of the present invention, the at least one first coating layer of the coated metal pigment according to one of aspects 1 to 23 to which the at least one heteropolysiloxane is applied is preferably composed essentially of at least one metal oxide. Preferably, the relevant layer is composed of at least one metal oxide.

According to an aspect 25 of the present invention, the at least one separate essentially pure organic polymer layer of the coated metal pigment according to one of aspects 1 to 24 is preferably selected from the group composed of polyacrylate, polymethacrylate, or mixtures thereof. This essentially pure organic polymer layer is arranged between the metal pigment and the at least one first coating layer having at least one metal oxide to which the second coating layer containing or composed of heteropolysiloxane is applied.

According to an aspect 26 of the present invention, the metal in the metallic substrate of the coated metal pigment according to one of aspects 1 to 25 is preferably composed largely of a metal selected from the group composed of aluminum, copper, iron, zinc, tin, titanium, chromium, cobalt, silver, stainless steel, nickel, antimony, magnesium, zirconium, silicon and boron, and mixtures thereof.

According to an aspect 27 of the present invention, the metal in the metallic substrate of the coated metal pigment according to one of aspects 1 to 26 is preferably composed to at least 60 wt. % of a ferromagnetic metal relative to the weight of the metal in the metallic substrate without oxygen. The metal in the metallic substrate of the metal pigment according to one of aspects 1 to 26 is preferably composed to at least 60 wt. % of iron, cobalt, nickel, and mixtures thereof.

According to an aspect 28 of the present invention, the ferromagnetic metal of the coated metal pigment according to aspect 27 is preferably selected from the group composed of iron, cobalt, nickel, and mixtures thereof.

According to an aspect 29 of the present invention, the metal in the metallic substrate of the coated metal pigment according to one of aspects 1 to 28 is preferably composed to at least 60 wt. % of iron relative to the weight of the metal in the metallic substrate without oxygen.

According to an aspect 30 of the present invention, the metal in the metallic substrate of the metal pigment according to one of aspects 1 to 29 is preferably composed to at least 95 wt. % of a metal selected from the group composed of aluminum, iron, zinc, tin, silver, gold, copper, chromium, titanium, and mixtures thereof, and preferably from the group composed of aluminum, iron, copper, zinc, and mixtures thereof, relative to the weight of the metal in the metallic substrate without oxygen.

According to an aspect 31 of the present invention, the metal mixtures of the coated metal pigment according to one of aspects 1 to 30 are preferably selected from the group composed of brass (gold bronze), zinc-magnesium alloys and steel.

According to an aspect 32 of the present invention, the metal in the metallic substrate of the coated metal pigment according to one of aspects 1 to 31 is preferably composed to at least 95 wt. % of a metal selected from the group composed of aluminum, iron, zinc, steel, copper and brass, relative to the weight of the metal in the metallic substrate without oxygen.

According to an aspect 33 of the present invention, the metal core of the coated metal pigment according to one of aspects 1 to 32 is preferably composed of flaky carbonyl iron, and preferably of reduced carbonyl iron.

According to an aspect 34 of the present invention, the metal in the metallic substrate of the coated metal pigment according to one of aspects 1 to 33 is preferably composed to at least 95 wt. % of a metal selected from the group composed of aluminum, copper and brass, relative to the weight of the metal in the metallic substrate without oxygen.

According to an aspect 35 of the present invention, the metal in the metallic substrate of the metal pigment according to one of aspects 1 to 34 is preferably composed to at least 95 wt. % of aluminum relative to the weight of the metal in the metallic substrate without oxygen.

According to an aspect 36 of the present invention, the metallic substrate of the metal pigment according to one of aspects 1 to 35 is preferably a metal core.

According to an aspect 37 of the present invention, the metal core of the coated metal pigment according to one of aspects 1 to 36 is preferably a metal pigment obtained by means of grinding with an $h_{50}$ value in the range of 20 to 100 nm, a shape factor of at least 200, and a relative thickness distribution $\Delta H$ value in the range of 30 to 140%, and preferably 70 to 130%, or a metal pigment obtained by means of PVD methods.

According to an aspect 38 of the present invention, at least one surrounding first coating layer of the coated metal pigment according to one of aspects 1 to 37 comprising at least one metal oxide was preferably applied by means of a sol-gel process.

According to an aspect 39 of the present invention, a plurality of coated metal pigments according to one of aspects 1 to 38 is preferably present.

According to an aspect 40 of the present invention, the coated metal pigments according to one of aspects 1 to 39 preferably have a $D_{50}$ value in the range of 2 μm to 66 μm, preferably 4 μm to 50 μm, and more preferably 8 μm to 47 μm.

According to an aspect 41 of the present invention, the coated metal pigments according to one of aspects 1 to 40 preferably have a $D_{90}$ value in the range of 10 μm to 81 μm, more preferably 16 μm to 80 μm, and even more preferably 21 μm to 79 μm.

According to an aspect 42 of the present invention, the coated metal pigments according to one of aspects 1 to 41 preferably have a $D_{10}$ value in the range of 0.5 μm to 34 μm, more preferably in the range of 1 μm to 29 μm, and even more preferably in the range of 2 μm to 27 μm.

According to an aspect 43 of the present invention, the coated metal pigments according to one of aspects 1 to 42 preferably have a $D_{10}$ value in the range of 0.5 μm to 34 μm, a $D_{50}$ value in the range of 2 μm to 66 μm, and a $D_{90}$ value in the range of 10 μm to 81 μm.

According to an aspect 44 of the present invention, the coated metal pigments according to one of aspects 1 to 43 preferably have a span $\Delta D$, which is defined as follows:

$$\Delta D=(D_{90}-D_{10})/D_{50},$$

in the range of 0.6 to 2.1, preferably 0.7 to 1.9, and more preferably 0.75 to 1.7.

According to an aspect 45 of the present invention, the coated metal pigments according to one of aspects 1 to 44 preferably have an $h_{50}$ value in the range of 15 nm to 2 μm, preferably 20 nm to 370 nm, and more preferably 20 nm to 240 nm, wherein the thickness is calculated by means of raster electron microscopy.

According to an aspect 46 of the present invention, the coated metal pigments according to one of aspects 1 to 45 preferably have an aspect ratio ($D_{50}/h_{50}$) in the range of 1500:1 to 10:1, preferably 1200:1 to 15:1, and more preferably 950:1 to 25:1.

According to an aspect 47, the present invention concerns a method for the production of coated metal pigments, comprising
provision of a metal pigment
production of a surrounding first coating layer comprising at least one metal oxide to the metal pigment and
application of at least one second coating layer comprising at least one heteropolysiloxane to the first coating layer comprising at least one metal oxide,
wherein the term metal oxide also includes oxide hydrates and hydroxides, wherein a coating layer comprising at least one heteropolysiloxane constitutes the outermost coating layer of the metal pigment, and
wherein the at least one heteropolysiloxane has at least one aminosilane component and at least one silane component selected from the group of alkylsilanes, vinylsilanes, and arylsilanes and the heteropolysiloxane is used in precondensed form. The metal pigment is preferably flaky.

According to an aspect 48 of the present invention, coated metal pigment obtained in the method according to aspect 47 is preferably flaky.

According to an aspect 49 of the present invention, the surrounding first coating layer applied in the method according to one of aspects 47 to 48 comprising at least one metal oxide is preferably composed essentially of metal oxide.

According to an aspect 50 of the present invention, in the method according to one of aspects 47 to 49, the heteropolysiloxane is preferably selected from the group of heteropolysiloxanes according to one of aspects 9 to 19.

According to an aspect 51 of the present invention, in the method according to one of aspects 47 to 50, the metal oxide of the at least one surrounding first coating layer comprising at least one metal oxide is preferably selected from the group composed of silicon oxide, aluminum oxide, boron oxide, zirconium oxide, cerium oxide, iron oxide, titanium oxide, chromium oxide, tin oxide, molybdenum oxide, their oxide hydrates, their hydroxides, and mixtures thereof.

According to an aspect 52 of the present invention, in the method according to one of aspects 47 to 51, the surrounding first coating layer comprising at least one metal oxide is preferably produced by means of a sol-gel process.

According to an aspect 53 of the present invention, the method according to one of aspects 47 to 52 preferably comprises the application of least one further coating layer comprising at least one metal oxide.

According to an aspect 54 of the present invention, the method according to one of aspects 47 to 53 preferably comprises the application of a coating layer composed essentially of an organic polymer. In this case, the coating layer composed essentially of an organic polymer is applied as a precoating before the application of the at least one surrounding first coating layer comprising at least a metal oxide.

According to an aspect 55 of the present invention, in the method according to one of aspects 47 to 54, the production of the surrounding first coating layer comprising at least a metal oxide is preferably at least largely completed before the coating with the at least one second coating layer comprising at least one heteropolysiloxane is applied.

According to an aspect 56 of the present invention, in the method according to one of aspects 47 to 55, at least one tetraalkoxysilane or an oligomer of at least one tetraalkoxysilane is preferably used in the production of at least one coating layer comprising at least one metal oxide. Preferably, the tetraalkoxysilane is selected from the group composed of tetraethoxysilane and oligomers of tetraethoxysilane.

According to an aspect 57 of the present invention, in the method according to one of aspects 47 to 56, the heteropolysiloxane is preferably applied as the outermost layer to a surrounding coating layer comprising at least one metal oxide.

According to an aspect 58 of the present invention, in the method according to one of aspects 47 to 57, the heteropolysiloxane preferably contains less than 0.5 wt. % of alcohols released during the production of said heteropolysiloxane due to hydrolysis and/or condensation.

According to an aspect 59 of the present invention, in the method according to one of aspects 47 to 58, the metal in the metallic substrate is preferably composed largely of a metal selected from the group composed of aluminum, copper, iron, zinc, tin, titanium, chromium, cobalt, silver, stainless steel, nickel, antimony, magnesium, zirconium, silicon, boron, and mixtures thereof.

According to an aspect 60 of the present invention, in the method according to one of aspects 47 to 59, the metal mixtures are preferably selected from the group composed of brass (gold bronze), zinc-magnesium alloys, and steel.

According to an aspect 61 of the present invention, in the method according to one of aspects 47 to 60 the reaction temperature in steps (b) to (e) is preferably in the range of 0° C. to 180° C., more preferably 40° C. to 120° C., and more preferably 60° C. to 100° C.

According to an aspect 62, the present invention concerns a coated metal pigment produced by a method according to one of the aspects 47 to 61. The coated metal pigment is preferably a plurality of coated metal pigments. In particular, it is preferred that the aforementioned coated metal pigments show the features according to one of aspects 1 to 46.

According to an aspect 63, the present invention concerns the use of at least one precondensed heteropolysiloxane to provide improvements in application properties such as increasing the stability of metal pigments, improving the applicability and orientability of metal pigments in the wet coating or powder coating, particularly in the powder coating, reducing the tendency to agglomerate of metal pigments, and improving the orientation of metal pigments in coating systems, or combinations thereof, wherein the metal pigments have at least one coating layer comprising at least one metal oxide, wherein the term metal oxide also includes oxide hydrates and hydroxides, and the heteropolysiloxane comprises at least one aminosilane component and at least one silane component selected from the group composed of alkylsilanes, vinylsilanes, and arylsilanes. The heteropolysiloxane preferably contains at least one aminosilane component and at least one alkylsilane component. In particular, it is preferred that the aminosilane and alkylsilane be selected according to one of aspects 9 to 17.

According to an aspect 64 of the present invention, in the use according to aspect 63, the heteropolysiloxane is preferably applied as the outermost layer to a surrounding first coating layer comprising at least one metal oxide.

According to an aspect 65 of the present invention, the metal pigment according to one of aspects 63 to 64 preferably comprises at least one inorganic/organic mixed layer.

According to an aspect 66 of the present invention, in the use according to one of aspects 63 to 65, the heteropolysiloxane is preferably applied to a coating layer composed essentially of metal oxide.

According to an aspect 67 of the present invention, in the use according to one of aspects 63 to 66, the metal oxide of the at least one surrounding coating layer is essentially, and more preferably completely, selected from the group composed of silicon oxide, aluminum oxide, boron oxide, zirconium oxide, cerium oxide, iron oxide, titanium oxide, chromium oxide, tin oxide, molybdenum oxide, vanadium oxide, and their oxide hydrates, their hydroxides, and mixtures thereof.

According to an aspect 68, the present invention preferably concerns the use of a coated metal pigment according to one of aspects 63 to 67 in a cosmetic, a plastic, or a coating agent.

According to an aspect 69 of the present invention, in the use according to aspect 68, the coating agent is preferably selected from the group composed of wet coatings, powder coatings, and coloring agents such as printing inks and other inks.

According to an aspect 70, the present invention concerns a coating agent containing coated metal pigments selected from the group composed of coated metal pigments according to one of aspects 1 to 46 and coated metal pigments manufactured according to a method according to one of aspects 47 to 61. Preferably, the coating agent is selected from the group composed of water-based coatings, solvent-containing coatings, and powder coatings.

According to an aspect 71, the present invention concerns an object that contains or has the coated metal pigments according to one of aspects 1 to 46 or coated metal pigments manufactured according to a method according to one of aspects 47 to 61.

In further preferred embodiments of the aforementioned aspects, the corresponding values of the dependent aspects refer not to the metal in the metallic substrate and the weight of the metal in the metallic substrate, but to the metal core and the weight of the metal core.

FIGURES

FIG. 1 shows the drying curves of a coated metal powder according to the invention referring to example 3-1 (A) and comparative example 3-2 (B), as described in application example 1. Here, the weight loss of the pigments is plotted against drying time.

Figure 2:
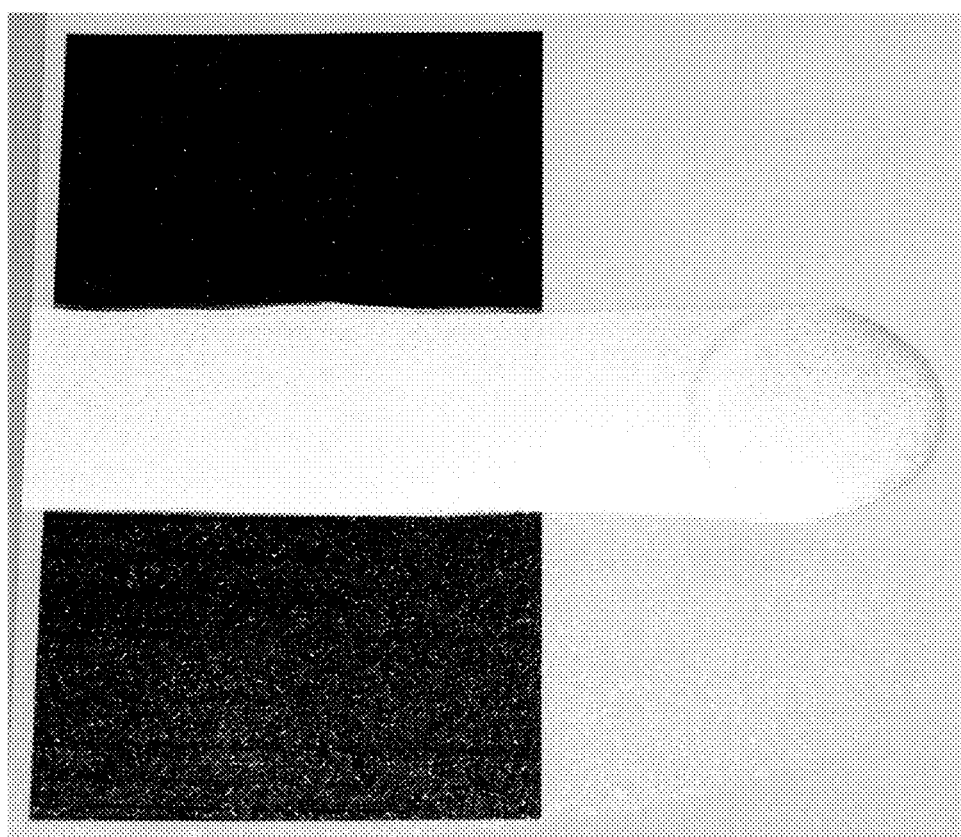
FIG. 2 shows a test card for determining the opacity of a PVD standard type with various coatings after the coatings are dried to powder. Here, A is Metalure A 31510, B is example 3-1, and C is comparative example 3-2.

FIG. 2 shows a test card for determining the opacity of a PVD standard type with various coatings after the coatings are dried to powder. Here, A is Metalure A 31510, B is example 3-1, and C is comparative example 3-2.

EXAMPLE 1

300 g of aluminum effect pigment paste (Silvershine S1500, Eckart GmbH: aluminum pigments produced by grinding of aluminum grit) with a size distribution of $D_{10}$=9

μm, $D_{50}$=15 μm, $D_{90}$=26 μm and a solid content of 25 wt. %, relative to the total weight of the paste, was dispersed in 500 g of ethanol for 10 minutes at room temperature. After this, 40 g of tetraethoxysilane was added, the suspension was heated while stirring to 80° C., and 13 g of triethylamine in 120 g of water was added thereto. After 6 h, the components shown in the table below, dissolved in 20 g of water, were added, and the mixture was stirred for another 2 h. The reaction mixture was then cooled to room temperature, and the pigments were isolated by filtration. The batches of examples 1-5 to 1-8 and 1-20 to 1-22 were produced according to example M below in compliance with the synthesis procedure for precondensed heteropolysiloxanes. The monomeric silanes according to comparative example 1-19 were processed similarly, but without adding water. The monomeric silanes according to example 1-23, similarly to the precondensed heteropolysiloxanes, were directly added to the metal pigment and not precondensed.

TABLE 1

Coating Silvershine S1500

| | |
|---|---|
| Example 1-1 | 4 g Hydrosil 2909 (alkylsilane, aminosilane; Evonik Industries AG, Germany) |
| Example 1-2 | 2 g Hydrosil 2909 |
| Example 1-3 | 6 g Hydrosil 2909 |
| Comparative example 1-4 | 1.3 g methyltriethoxysilane (Dynasylan MTES; Evonik Industries AG, Germany) 2.7 g 3-aminopropyltriethoxysilane (Dynasylan AMEO; Evonik Industries AG, Germany) |
| Example 1-5 | 3.2 g Hydrosil 2909 |
| Example 1-6 | 15 mmol heteropolysiloxane (equimolar amount of DAMO ((N-(2-aminoethyl)-3-aminopropyl)(trimethoxy)silane) and hexadecyltrimethoxysilane)* |
| Example 1-7 | 15 mmol heteropolysiloxane (molar ratio DAMO:hexadecyltrimethoxysilane = 2.5:1)* |
| Example 1-8 | 15 mmol heteropolysiloxane (equimolar amount of DAMO and octyltriethoxysilane)* |
| Example 1-9 | 15 mmol heteropolysiloxane (molar ratio DAMO:octyltriethoxysilane = 2.5:1)* |
| Example 1-10 | 15 mmol heteropolysiloxane (equimolar amount of DAMO and phenyltrimethoxysilane)* |
| Example 1-11 | 15 mmol heteropolysiloxane (molar ratio DAMO:phenyltrimethoxysilane = 2.5:1)* |
| Example 1-12 | 15 mmol heteropolysiloxane (equimolar amount of DAMO and vinyltrimethoxysilane)* |
| Example 1-13 | 15 mmol heteropolysiloxane (molar ratio DAMO:isobutyltrimethoxysilane = 1:2.5)* |
| Example 1-14 | 15 mmol heteropolysiloxane (equimolar amount of AMEO (((3-aminopropyl)(triethoxy)silane) and phenyltrimethoxysilane)* |
| Example 1-15 | 15 mmol heteropolysiloxane (equimolar amount of DAMO and methyltrimethoxysilane)* |
| Example 1-16 | 15 mmol heteropolysiloxane (equimolar amount of AMEO and octyltriethoxysilane)* |
| Example 1-17 | 15 mmol heteropolysiloxane (molar ratio DAMO:octyltriethoxysilane:methyltrimethoxysilane = 2:1:1)* |
| Example 1-18 | 15 mmol heteropolysiloxane (molar ratio DAMO:phenyltrimethoxysilane:methyltrimethoxysilane = 2:1:1)* |
| Comparative example 1-19 | 15 mmol monomeric silanes (equimolar amount of DAMO and hexadecyltrimethoxysilane)* |
| Example 1-20 | 15 mmol heteropolysiloxane (molar ratio DAMO:methyltrimethoxysilane = 2.5:1)* |
| Example 1-21 | 15 mmol heteropolysiloxane (equimolar amount of AMEO and isobutyltrimethoxysilane)* |
| Example 1-22 | 15 mmol heteropolysiloxane (equimolar amount of AMEO and methyltrimethoxysilane)* |
| Comparative example 1-23 | 15 mmol monomeric silanes (equimolar amount of DAMO and hexadecyltrimethoxysilane)* |

*The amount in mmol refers to the total molar amount of the monomers obtained.

EXAMPLE 2

4000 g of aluminum effect pigment paste (Metallux 2156, Eckart GmbH: aluminum pigments produced by grinding of aluminum grit) with a size distribution of $D_{10}$=9 μm, $D_{50}$=17 μm, $D_{90}$=28 μm and a solid content of 60 wt. %, relative to the total weight of the paste, was dispersed in 7500 g of ethanol for 10 minutes at room temperature. After this, 800 g of tetraethoxysilane was added, the suspension was heated while stirring to 80° C., and 260 g of triethylamine in 500 g of water was added. After 6 h, the components shown in the table below, dissolved in 200 g of water, were added, and the mixture was stirred for another 2 h. The reaction mixture was then cooled to room temperature, and the pigments were isolated by filtration.

TABLE 2

Coating Metallux 2156

| | |
|---|---|
| Example 2-1 | 65 g Hydrosil 2909 (alkylsilane, aminosilane; Evonik Industries AG, Germany) |
| Comparative example 2-2 | 21.1 g methyltriethoxysilane (Dynasylan MTES; Evonik Industries AG, Germany) 43.9 g 3-aminopropyltriethoxysilane (Dynasylan AMEO; Evonik Industries AG, Germany) |

EXAMPLE 3

250 g of PVD aluminium effect pigment paste (Metalure A 31510, Eckart GmbH) with a size distribution of $D_{50}$=10 μm and a solid content of 15 wt. % relative to the total weight of the paste was dispersed in 600 g of ethanol for 10 minutes at room temperature. After this, 18 g of tetraethoxysilane was added, the suspension was heated while stirring to 80° C., and 110 g of triethylamine in 500 g of water was added. After 6 h, the components shown in the table below, dissolved in 200 g of water, were added, and the mixture was stirred for another 2 h. The reaction mixture was then cooled to room temperature, and the pigments were isolated by filtration.

TABLE 3

Coating Metalure A 31510

| | |
|---|---|
| Example 3-1 | 2 g Hydrosil 2909 (alkylsilane, aminosilane; Evonik Industries AG, Germany) |
| Comparative example 3-2 | 1.5 g octyltriethoxysilane (Dynasylan OCTEO; Evonik Industries AG, Germany) 0.5 g 3-aminopropyltriethoxysilane (Dynasylan AMEO; Evonik Industries AG, Germany) |
| Comparative example 3-3 | 2 g 3-methacryloxypropyltrimethoxysilane (Dynasylan MEMO; Evonik Industries AG, Germany) |
| Example 3-4 | 2 g Hydrosil 2776 (alkylsilane, aminosilane; Evonik Industries AG, Germany) |
| Example 3-5 | 2 g Hydrosil 2627 (alkylsilane, aminosilane; Evonik Industries AG, Germany) |

EXAMPLE 4

286 g of Ferricon 200 paste (Eckart GmbH, $D_{50}$=18 μm: iron pigments produced by grinding of carbonyl iron grit) with a solid content of 70% was dispersed in 285 g of ethanol and heated to 80° C. After this, 140 g of tetraethoxysilane and a mixture composed of 70 g water and 100 g of triethylamine were added. After 6 h, further reactants were added if applicable, see Table, and the mixture was stirred for another 6 h. The reaction mixture was then cooled to room temperature, and the pigments were isolated by filtration.

TABLE 4

Coating Ferricon 200

| | Other reactants |
|---|---|
| CE 4-1 | — |
| CE 4-2 | 2 g (methacryloxypropyl)(trimethoxy)silane (MEMO) |
| CE 4-3 | 4.5 g MEMO |
| Example 4-4 | 7.0 g Hydrosil 2776 (precoated heteropolysiloxane; Evonik Industries AG, Germany) |
| Example 4-5 | 13.0 g Hydrosil 2776 |
| CE 4-6 | 2.0 g (N-(2-aminoethyl)-3-aminopropyl)(trimethoxy)silane (DAMO) |
| CE 4-7 | 4.5 g DAMO |
| Example 4-8 | 3 g Hydrosil 2776 |
| Example 4-9 | 13 g Hydrosil 2909 (alkylsilane, aminosilane; Evonik Industries AG, Germany) |
| Example 4-10 | 3 g Hydrosil 2909 |

APPLICATION EXAMPLE 1

Drying

In order to determine drying kinetics, metal pigment pastes were initially weighed, and their change in weight during the course of drying was observed. Measurement was conducted using an IR-35 Moisture Analyzer manufactured by Denver Instrument Inc. After 30 min, an extrapolated weight of nonvolatile content (NVC) in the metal pigment pastes was determined. The corresponding measurement values and percentage weight loss corrected for NVC are shown in Table 1.

TABLE 5

Weight loss on drying

| Min | Weight (A) | Weight (B) | Weight loss (A) in % | Weight loss (B) in % |
|---|---|---|---|---|
| 1 | 99 | 99.1 | 100% | 100% |
| 2 | 97.4 | 98.1 | 98% | 99% |
| 3 | 93.7 | 96.1 | 94% | 96% |
| 4 | 87 | 92.3 | 87% | 91% |
| 5 | 78 | 87.9 | 77% | 86% |
| 6 | 67.5 | 82.2 | 65% | 78% |
| 7 | 51.2 | 75 | 47% | 69% |
| 8 | 40.8 | 69.8 | 35% | 62% |
| 9 | 34.8 | 63.5 | 29% | 54% |
| 10 | 24.8 | 58.3 | 17% | 48% |
| 11 | 16.7 | 53 | 8% | 41% |
| 12 | 11.1 | 47.7 | 2% | 34% |
| 13 | 9.2 | 42 | 0% | 27% |
| 14 | 9.1 | 36.7 | 0% | 20% |
| 15 | 9.1 | 31.7 | 0% | 13% |
| 20 | 9.1 | 22.4 | 0% | 1% |
| 30 | 9.1 | 21.3 | 0% | 0% |

A: Example 3-1
B: Comparative example 3-2

The coated metal pigments of the invention thus show significantly improved drying kinetics.

APPLICATION EXAMPLE 2

Agglomeration Behavior

The corresponding paste was dried for determination of agglomeration behavior. After this, 100 g of aluminum powder was sifted on an analysis sieve with a mesh width of 71 µm. In this case, the powder was not forced through the sieve e.g. with brushes. The material remaining on the sieve is determined using a balance with a precision of 0.1 g.

TABLE 6

Agglomeration behavior

| | | Sieve residue |
|---|---|---|
| Example 3-1 | Hydrosil 2909 | approx. 20% |
| Comparative example 3-3 | MEMO | approx. 50% |
| Example 3-4 | Hydrosil 2776 | approx. 1% |
| Example 3-5 | Hydrosil 2627 | approx. 1% |

The use of the heteropolysiloxanes according to the invention thus significantly reduces the agglomerating tendency of the PVD pigments.

APPLICATION EXAMPLE 3

Powder Coating Application

The pastes obtained were vacuum-dried under a slight inert gas flow at 100° C. and then sieved with a mesh width of 71 µm. The respective metal effect pigment was incorporated together with Tiger coating (Tiger Coatings GmbH & Co. KG) and 0.2 wt. % of Aeroxide Alu C (Evonik) using a ThermoMix at level 4 for 4 minutes. The pigmentation level was 5.0 wt. % relative to the total weight of the powder coatings. The total amount of powder coating in the mixer was 300 g plus 0.6 g of Aeroxide Alu C.

The ThermoMix is a commercially-available kitchen mixer (Vorwerk). The additive Aeroxide Alu C is composed of $Al_2O_3$ particles and was used in this application as a flow-regulating agent. The powder coatings were applied to a steel sheet using the OptiSelect (ITWGema) in a commercially-available powder coating booth. In order to evaluate application properties, spraying was conducted for 20 seconds in the powder coating booth according to the parameters listed in Table 1, coating was carried out, and adhesion to the electrodes and the baffle plate was comparatively evaluated. This method makes it possible to draw conclusions concerning long-term behavior of the pigments during practice-oriented coating.

TABLE 7

Behavior in powder coating application

| | Application | Remarks |
|---|---|---|
| CE 4-1 | (−) Poor, pigment fell off sheet | Abrasion resistance not applicable due to insufficient adhesion |
| CE 4-2 | + | Not abrasion-resistant |
| CE 4-3 | + | Not abrasion-resistant |
| Example 4-4 | + | Abrasion-resistant |
| Example 4-5 | + | Abrasion-resistant |
| CE 4-6 | + | Not abrasion-resistant |
| CE 4-7 | + | Not abrasion-resistant |

It was found that in powder coating application, the pigments in comparative example 4-1, which have only a silicon oxide layer, did not adhere to the steel sheet, but fell off it.

APPLICATION EXAMPLE 4

Standard Gassing Test

For the standard gassing test, 15 g of metal pigment paste with a solid content of 25 wt. % was suspended in 13.0 g of butyl glycol with a stirring time of 5 min. 14.4 g of colorless binder (ZK26-6826-402, BASF Coatings) and 0.6 g of 10% dimethylethanolamine solution (with water as a solvent) were added to this suspension, and the mixture was stirred for 5 min.

23.45 g of the suspension was stirred into a mixture of 233.1 g of milky/colorless mixed coating for effect materials testing (ZW42-6008-0101, BASF Coatings), 37.5 g of water-based coating-tinting paste red (ZU560-329-0001, BASF Coatings, containing iron oxide red, $Fe_2O_3$), and 6.0 g of water-based coating-tinting paste black (ZU42-5943-0001, BASF Coatings, containing iron oxide black, $Fe_2O_3{}^*FeO$). The pH of the suspension was then adjusted to 8.2 with 10% dimethylethanolamine solution (with water as a solvent).

265 g of the above composition was placed in a gassing flask, and the flask was sealed with a two-chamber gas bubble counter. The gas washing flask was tempered in a water bath at 40° C. for 1 hour and sealed gastight, and the test was carried out for no more than 28 days. The gas volume generated was read off based on the water volume displaced into the upper chamber of the gas bubble counter. The test was considered to have been passed if no more than 10 ml of hydrogen was produced after 28 days.

TABLE 8

Normal gassing test

| | | Gassing test | | | |
|---|---|---|---|---|---|
| | Surface modification | 7 days | 14 days | 21 days | 28 days |
| Example 1-1 | Hydrosil 2909 | | 3.0 ml | 2.0 ml | 3.0 ml |
| CE 1-4 | Dynasylan MTES, Dynasylan AMEO | | 5.3 ml | 11.6 ml | out-gassed |
| Example 1-5 | Hydrosil 2909 | 0 ml | | | 3 ml |
| Example 1-6 | Heteropolysiloxane (equimolar amount of DAMO and hexadecyltrimethoxysilane) | 0 ml | | | 2 ml |
| Example 1-7 | Heteropolysiloxane (molar ratio DAMO: hexadecyltrimethoxysilane = 2.5:1) | 0 ml | | | 1 ml |
| Example 1-8 | Heteropolysiloxane (equimolar amount of DAMO and octyltriethoxysilane) | 0 ml | | | 2 ml |
| Example 1-9 | Heteropolysiloxane (molar ratio DAMO: octyltriethoxysilane = 2.5:1) | 0 ml | | | 3 ml |
| Example 1-10 | Heteropolysiloxane (equimolar amount of DAMO and phenyltrimethoxysilane) | 0 ml | | | 2 ml |
| Example 1-11 | Heteropolysiloxane (molar ratio DAMO: phenyltrimethoxysilane = 2.5:1) | 0 ml | | | 1 ml |
| Example 1-12 | Heteropolysiloxane (equimolar amount of DAMO and vinyltrimethoxysilane) | 0 ml | | | 1 ml |
| Example 1-13 | Heteropolysiloxane (molar ratio DAMO: isobutyltrimethoxysilane = 2.5:1) | 0 ml | | | 2 ml |
| Example 1-14 | Heteropolysiloxane (equimolar amount of AMEO (((3-aminopropyl)(triethoxy)silane) and phenyltrimethoxysilane) | 0 ml | | | 2 ml |
| Example 1-15 | Heteropolysiloxane (equimolar amount of DAMO and methyltrimethoxysilane) | 1 ml | | | 4 ml |
| Example 1-16 | Heteropolysiloxane (equimolar amount of AMEO and octyltriethoxysilane) | 0 ml | | | 3 ml |
| Example 1-17 | Heteropolysiloxane (molar ratio DAMO: octyltriethoxysilane: methyltrimethoxysilane = 2:1:1) | 0 ml | | | 2 ml |
| Example 1-18 | Heteropolysiloxane (molar ratio DAMO: phenyltrimethoxysilane: methyltrimethoxysilane = 2:1:1) | 0 ml | | | 4 ml |
| Example 1-20 | Heteropolysiloxane (molar ratio DAMO: methyltrimethoxysilane = 2.5:1) | 0 ml | | | 3 ml |
| Example 1-21 | Heteropolysiloxane (equimolar amount of AMEO and isobutyltrimethoxysilane) | 0 ml | | | 2 ml |
| Example 1-22 | Heteropolysiloxane (equimolar amount of AMEO and methyltrimethoxysilane) | 0 ml | | | 2 ml |
| CE 1-23 | monomeric silanes (equimolar amount of DAMO and hexadecyltrimethoxysilane) | 0 ml | | | out-gassed |

CE: Comparative example

APPLICATION EXAMPLE 5

Enhanced Gassing Test

For the enhanced gassing test. 15 g of metal pigment paste with a solid content of 55 wt. % was suspended in 11.0 g of butyl glycol with a stirring time of 5 min. 14.4 g of colorless binder (ZK26-6826-402, BASF Coatings) and 0.6 g of 10% dimethylethanolamine solution (solvent: water) were added to this suspension, and the mixture was stirred for 5 min.

21.96 g of the suspension was stirred into a mixture of 195.0 g of milky/colorless mixed coating for effect materials testing (ZW42-6008-0101, BASF Coatings), 75.6 g of water-based coating-tinting paste red (ZU560-329-0001, BASF Coatings, containing iron oxide red, $Fe_2O_3$), and 6.0 g of water-based coating-tinting paste black (ZU42-5943-0001, BASF Coatings, containing iron oxide black, $Fe_2O_3{}^*FeO$). The pH of the suspension was then adjusted to 9.0 with 10% dimethylethanolamine solution (with water as a solvent).

265 g of the above composition was placed in a gassing flask, and the flask was sealed with a two-chamber gas bubble counter. The gas washing flask was tempered in a water bath at 40° C. for 1 hour and sealed gastight, and the test was carried out for a maximum of 30 days. The gas volume generated was read off based on the water volume displaced into the upper chamber of the gas bubble counter. If a maximum of 10 ml of hydrogen was generated after 30 days, this was considered a passing result.

TABLE 9

Enhanced gassing test

| | Surface modification | Gassing test (30 days) |
|---|---|---|
| Example 2-1 | Hydrosil 2909 | 4.0 ml |
| Comparative example 2-2 | Dynasylan MTES, Dynasylan AMEO | outgassed |

APPLICATION EXAMPLE 6

Opacity

After storage for 40 weeks, the metal pigments were incorporated into a nitrocellulose coating. The pigmented coating was then applied to a test card using a spiral applicator.

Moreover, the PVD pigment Metalure A 31510, example 3-1 and CE 3-2, was tested without being stored, but in dried powder form. The test card is shown in FIG. 2. It was found that strong agglomeration of the coating occurred regardless of whether conventional coating was carried out, causing opacity to be almost completely lost. In contrast, the pigments with the coating according to the invention showed no noticeable deterioration.

TABLE 10

Opacity

| | Surface modification | Opacity |
|---|---|---|
| Metalure A 31510 | — | Opacity lost |
| Example 3-1 | Hydrosil 2909 | + |
| Comparative example 3-2 | Dynasylan OCTEO, Dynasylan AMEO | Opacity lost |

APPLICATION EXAMPLE 7

Flop Index

The pigment samples were incorporated into a commercially available water-based coating system (0.35 wt. % metal content), and the test applications were produced by spray coating on a primed steel sheet. The layer thickness was 6 μm. The base coat was covered with a commercially-available 1K clear coat and then baked. The measurements were conducted with a BYK Mac device (Byk-Gardner).

The flop index is defined in the relevant literature according to Alman as follows:

$$\text{Flop index} = 2.69 \cdot (L_{E1} - L_{E3})^{1.11} / L_{E2}^{0.86}$$

wherein $L_{E1}$ denotes the lightness of the near-specular measuring angle (E1=15° relative to the specular angle), $L_{E2}$ denotes the lightness of the measuring angle between the near-specular and far-specular angle (E2=45° relative to the specular angle), and $L_{E3}$ denotes the lightness of the far-specular measuring angle (E3=110° relative to the specular angle).

TABLE 11

Flop index

| | Color value | | | | | Flop index | Luster 20° | |
|---|---|---|---|---|---|---|---|---|
| | | | | | | | before CT | 24 h after CT |
| | 15° | 25° | 45° | 75° | 110° | | | |
| Example 1-1 | 163.7 | 110.0 | 48.8 | 25.4 | 21.8 | 23.3 | 100.0 | 97.5 |
| CE 1-4 | 155.0 | 116.1 | 57.7 | 29.3 | 24.9 | 18.3 | 92.6 | 88.6 |
| Example 1-5 | 164.6 | 110.0 | 48.6 | 25.2 | 21.6 | 23.5 | 100.0 | 90.1 |
| Example 1-6 | 163.1 | 113.0 | 51.6 | 26.6 | 22.9 | 21.9 | 97.9 | 87.2 |
| Example 1-7 | 163.4 | 110.3 | 49.3 | 25.7 | 22.0 | 23.0 | 100.0 | 88.6 |
| Example 1-11 | 164.0 | 110.4 | 49.1 | 25.6 | 21.9 | 23.2 | 100.0 | 88.6 |
| Example 1-12 | 163.8 | 110.1 | 48.9 | 25.4 | 21.8 | 23.2 | 100.0 | 87.2 |
| Example 1-15 | 164.1 | 110.3 | 49.0 | 25.5 | 21.9 | 23.2 | 100.0 | 88.6 |
| Example 1-18 | 163.4 | 110.6 | 49.7 | 25.9 | 22.1 | 22.8 | 96.9 | 87.2 |
| CE 1-19 | 161.5 | 114.3 | 53.4 | 27.5 | 23.7 | 20.8 | 99.9 | 78.3 |

CE: Comparative example
CT: Condensation test

The condensation test was conducted based on EN ISO 6270-1. Measurement of luster was conducted based on DIN EN ISO 2813.

The higher the numerical value of the flop index, the more strongly the desired dark/light flop is expressed.

APPLICATION EXAMPLE 8

Condensation Test

The pigment samples were incorporated into a commercially available water-based coating system (0.35 wt. % metal content), and the test applications were produced by spray coating on a primed steel sheet. The layer thickness was 6 μm. The base coat was covered with a commercially-available 1K clear coat and then baked. The applications were then tested according to DIN 50 017 (condensed water, constant climate). Adhesive strength was tested by means of the cross-cut method according to DIN EN ISO 2409 immediately after the end of the test compared to a non-loaded sample. Here, 0 means no change and 5 a very large change. Finally, DOI (distinctness of image) was visually evaluated. This can be affected by factors such as the respective substrate and can change essentially based on water retention due to the swelling processes.

TABLE 12

Intercoat adhesion

| | Cross-cut 2 mm | | DOI | |
|---|---|---|---|---|
| Sample | before CT | 24 h after CT | before CT | Δ 24 h after CT |
| Example 1-5 | 1* | 1 | 76.5 | −8.9 |
| Example 1-7 | 1-2* | 1-2 | 76.9 | −10.3 |
| Example 1-11 | 1-2* | 1-2 | 76.2 | −9.5 |
| Example 1-12 | 1-2* | 2 | 76.6 | −10.0 |
| Example 1-15 | 1* | 3 | 76.3 | −9.5 |
| Example 1-18 | 1* | 3 | 76.6 | |
| CE 1-23 | 5* | 5 | 78.7 | |

CT: Condensation test
CE: Comparative example
*Break in the primer, not pigment-based Examples A to M for Production of Precondensed Heteropolysiloxanes Equipment for examples A to G: laboratory stirring tank reactor with 2 l capacity, temperature-controllable, internal temperature measurement, liquid dosing device, distillation bridge with head temperature measurement, product cooler, distillate storage tank, laboratory pressure filter (2 l capacity).

EXAMPLE A

Production of a Water-Soluble Cohydrolysate of Aminopropyltriethoxysilane (AMEO) and Methyltriethoxysilane (MTES) in a Molar Ratio of 1:1

In the equipment described above, 221 g of AMEO and 178 g of MTES were mixed, and 54 g of water was added. After 30 min, an additional 126 g of water was added within 15 minutes while stirring via the dosing device. During this time, the temperature increased from 20° C. to approx. 50° C. Within an additional 15 minutes, 114 g of HCl (32 wt. % in water) was added while stirring via the dosing device. Within approx. 4 h, an ethanol/water mixture was distilled off at a sump temperature of approx. 60° C. and a pressure of approx. 135 mbar until the head temperature was approx. 50° C. and the head product contained only water. During distillation, water was added to the product via the dosing device in an amount equal to the amount of distillate removed.

EXAMPLE B

Like example A, except that 60 g of acetic acid was added for pH adjustment instead of aqueous HCl.

EXAMPLE C

Production of a Water-Soluble Cohydrolysate of AMEO and Propyltrimethoxysilane (PTMO) in a Molar Ratio of 1:1

In the equipment described above, 221 g AMEO and 164 g of PTMO were mixed, and 54 g of water was added. After 30 min, an additional 126 g of water was added within 15 minutes while stirring via the dosing device. During this time, the temperature increased from 20° C. to approx. 57° C. Within an additional 15 minutes, 114 g of HCl (32 wt. % in water) was added while stirring via the dosing device. Within approx. 4 h, an ethanol/methanol/water mixture was distilled off at a sump temperature of up to 102° C. and normal pressure until the head temperature was approx. 100° C. and the head product contained only water. During distillation, water was added to the product via the dosing device in an amount equal to the amount of distillate removed.

EXAMPLE D

Production of a Water-Soluble Cohydrolysate of AMEO and Vinyltrimethoxysilane (VTMO) in a Molar Ratio of 1:1

In the equipment described above, 221 g of AMEO and 164 g of VTMO were mixed, and 54 g of water was added. After 30 min, an additional 126 g of water was added within 15 minutes while stirring via the dosing device. During this time, the temperature increased from 20° C. to approx. 57° C. Within an additional 15 minutes, 114 g of HCl (32 wt. % in water) was added while stirring via the dosing device. Within approx. 4 h, an ethanol/methanol/water mixture was distilled off at a sump temperature of up to 102° C. and normal pressure until to the head temperature was approx. 100° C. and the head product contained only water. During distillation, water was added to the product via the dosing device in an amount equal to the amount of distillate removed.

EXAMPLE E

Production of a Water-Soluble Cohydrolysate of AMEO and Isobutyltrimethoxysilane (IBTMO) in a Molar Ratio of 1:1

In the equipment described above, 221 g of AMEO and 178 g of IBTMO were mixed, and 54 g of water was added. After 30 min, an additional 64 g of water was added within 15 minutes while stirring via the dosing device. During this time, the temperature increased from 20° C. to approx. 60° C. Within an additional 15 minutes, 110 g of HCl (33 wt. % in water) was added while stirring via the dosing device. Within approx. 4 h, an ethanol/methanol/water mixture was distilled off at a sump temperature of up to 52° C. and a pressure of 130 mbar until the head temperature was approx. 50° C. and the head product contained only water. During distillation, water was added to the product via the dosing device in an amount equal to that of the distillate removed.

EXAMPLE F

Production of a Water-Soluble Cohydrolysate of 3-aminopropylmethyldimethoxysilane (Methyl-AMEO) and MTES in a Molar Ratio of 1:1

In the equipment described above, 191 g of methyl-AMEO and 178 g of MTES were mixed, and 54 g of water was added. After 30 min, a mixture of 64 g of water and 110 g of HCl (33 wt. % in water) was added within 30 minutes while stirring via the dosing device. During this time, the temperature increased from 20° C. to approx. 65° C. Within approx. 4 h, an ethanol/water mixture was distilled off at a sump temperature of up to 52° C. and a pressure of 130 mbar until the head temperature was approx. 50° C. and the head product contained only water. During distillation, water was added to the product via the dosing device in an amount equal to the amount of distillate removed.

EXAMPLE G

Production of a Water-Soluble Hydrolysate from N-benzylaminoethylaminopropyltrimethoxysilane (DYNASYLAN 1160)

In the equipment described above, 400 g of DYNASYLAN 1160 (50 wt. % silane solution in methanol, Hüls AG) was prepared and 25 g of water was added. As the silane used was in the form of a 50 wt. % silane solution in methanol, 100 g of methanol was first removed by distillation (sump temperature 60° C., pressure of 300 mbar, falling to <1 mbar). After this, at 40 to 45° C., 49.5 g of acetic acid was added to the methanol-free, viscous silane. Within 15 minutes, 375 g of water was added via the dosing recipient at a sump temperature of 50° C. Within 3 h, 250 g of a methanol/water mixture was distilled off at a maximum sump temperature of 55° C. and a pressure falling from 300 to 130 mbar. During distillation, water was added to the product via the dosing device in an amount equal to the amount of distillate removed.

EXAMPLE H

Production of a Water-Soluble Hydrolysate from Ureidopropyltrimethoxysilane (DYNASYLAN 2201) and Aminopropyltriethoxysilane (AMEO)

In the equipment described above, 400 g of DYNASYLAN 2201 (50 wt. % solution of ureidopropyltriethoxysilane in methanol, Hüls AG) and 200 g of AMEO were first prepared, and 50 g of water was then added. At a sump temperature of 60° C., 200 g of a methanol/ethanol mixture was distilled off at reduced pressure of 300 mbar falling to <1 mbar. Within 10 minutes, 500 g of water was added via a dosing recipient at a sump temperature increasing to 80° C. At ambient pressure, a methanol/ethanol/water mixture was distilled off until the head temperature remained constant at 100° C. During distillation, water was added to the product via the dosing device in an amount equal to the amount of distillate removed.

EXAMPLES I to L

For Production of Precondensed Heteropolysiloxanes

Equipment for examples I to L: esterification equipment: 0.5 l laboratory stirring reactor, temperature-controllable (internal temperature measurement), liquid dosing device, reflux condenser (intensive condenser with downstream freezer to −40° C.), nitrogen overlay, laboratory pressure filter, hydrolysis equipment: laboratory stirring tank reactor with 2 l capacity, temperature-controllable, internal temperature measurement, liquid dosing device, distillation bridge with head temperature measurement, product cooler, distillate storage tank; laboratory pressure filter (2 l capacity).

EXAMPLE I

Production of a Water-Soluble Cohydrolysate of Aminopropyltriethoxysilane (AMEO), Propyltrichlorosilane (PTCS) and Dimethyldichlorosilane (DMDCS)

In the above-described esterification equipment, 38.7 g of DMDCS and 53.3 g of PTCS were prepared. Within 2 h, 50.4 g of methanol was added while stirring. The sump temperature was approx. 60° C. Refluxing was then conducted for 2 h to eliminate the HCl. In order to complete the esterification reaction, the crude product still containing chlorosilane was mixed with a 30 wt. % sodium methylate solution (approx. 39 g) until the crude ester product had a pH of 7 to 8. After filtration, the mixture was fed to the hydrolysis equipment and consecutively mixed within approx. 20 minutes with 132.6 g of AMEO, 64.8 g of water, and 29.5 g of formic acid. The reaction was exothermic, the temperature rose to approx. 60° C., and the solution had a pH of approx. 4 to 5. The hydrolysis alcohols produced were then distilled off within approx. 4 h at a sump temperature of 55° C. and a pressure falling from 292 mbar to 130 mbar, and during distillation, water was added in an amount (by weight) equal to the amount of distillate removed (approx.

350 g). The product was then diluted with 713 g of water to the final concentration for use.

EXAMPLE K

Production of a Water-Soluble Cohydrolysate of Aminopropyltriethoxysilane (AMEO), Propyltrichlorosilane (PTCS), Isobutyltrichlorosilane (IBTCS), Octyltrichlorosilane (OCTCS), and Dimethyldichlorosilane (DMDCS)

In the above-described esterification equipment, 38.7 g of DMDCS, 53.3 g of PTCS, 57.5 g of IBTCS, and 14.9 g of OCTCS were prepared. Within 2 h, 86.7 g of methanol was added while stirring. The sump temperature was approx. 60° C. Refluxing was then conducted for 2 h to eliminate the HCl. In order to complete the esterification reaction, the crude product still containing chlorosilane was mixed with a 30 wt. % sodium methylate solution (approx. 60 g) until the crude ester product had a pH of 7 to 8. After filtration, the mixture was fed to the hydrolysis equipment and consecutively mixed within approx. 20 minutes with 132.6 g of AMEO, 84.2 g of water, and 29.0 g of formic acid. The reaction was exothermic, the temperature rose to approx. 60° C., and the solution had a pH of approx. 4 to 5. The hydrolysis alcohols produced were then distilled off within approx. 4 h at a sump temperature of 55° C. and a pressure falling from 292 mbar to 130 mbar, and during distillation, water was added in an amount equal to the amount of distillate removed (approx. 350 g). The product was then diluted with 1,032 g of water to the final concentration for use.

EXAMPLE L

Production of a Water-Soluble Cohydrolysate of Aminopropyltrichlorosilane (AMEO), Propyltrichlorosilane (PTCS), Propylmethyldichlorosilane (PMDCS), and Dimethyldichlorosilane (DMDCS)

In the above-described esterification equipment, 38.7 g of DMDCS, 106.5 g of PTCS, and 47.1 g of PMDCS were prepared. Within 2 h, 101 g of methanol was added while stirring. The sump temperature was approx. 60° C. Refluxing was then conducted for 2 h to eliminate the HCl. In order to complete the esterification reaction, the crude product still containing chlorosilane was mixed with a 30 wt. % sodium methylate solution (approx. 35 g) until the crude ester product had a pH of 7 to 8. After filtration, the mixture was fed to the hydrolysis equipment and consecutively mixed within approx. 20 minutes with 265.2 g of AMEO, 130 g of water, and 55 g of formic acid. The reaction was exothermic, the temperature rose to approx. 60° C., and the solution had a pH of approx. 4 to 5. The hydrolysis alcohols produced were then distilled off within approx. 4 h at a sump temperature of 55° C. and a pressure falling from 292 mbar to 130 mbar, and during distillation, water was added in an amount equal to the amount of distillate removed (approx. 330 g). The product was then diluted with 1,750 g of water to the final concentration for use.

EXAMPLE M

Production of a Water-Soluble Cohydrolysate of Various Silanes

In the equipment described above, but without a distillation bridge, the silanes listed in the following table were mixed, and 54 g of water was added. After 30 min, an additional 126 g of water was added while stirring within 15 minutes via the dosing device. During this time, the temperature increased from 20° C. to approx. 50° C. Within an additional 15 minutes, 114 g of HCl (32 wt. % in water) was added while stirring via the dosing device. After 4 h, the reaction was completed, and the product obtained was reused.

| Test | Aminosilane | Other silanes |
|---|---|---|
| M-1 | 1 mol DAMO ((N-(2-aminoethyl)-3-aminopropyl)(trimethoxy)silane) | 1 mol hexadecyltrimethoxysilane |
| M-2 | 1 mol DAMO | 0.4 mol hexadecyltrimethoxysilane |
| M-3 | 1 mol DAMO | 1 mol octyltriethoxysilane |
| M-4 | 1 mol DAMO | 0.4 mol octyltriethoxysilane |
| M-5 | 1 mol DAMO | 1 mol phenyltrimethoxysilane |
| M-6 | 1 mol DAMO | 0.4 mol phenyltrimethoxysilane |
| M-7 | 1 mol DAMO | 1 mol vinyltrimethoxysilane |
| M-8 | 0.4 mol DAMO | 1 mol isobutyltrimethoxysilane |
| M-9 | 1 mol AMEO (((3-aminopropyl)(triethoxy)silane) | 1 mol phenyltrimethoxysilane |
| M-10 | 1 mol DAMO | 1 mol methyltrimethoxysilane |
| M-11 | 1 mol AMEO | 1 mol octyltriethoxysilane |
| M-12 | 1 mol DAMO | 0.5 mol octyltriethoxysilane 0.5 mol methyltrimethoxysilane |
| M-13 | 1 mol DAMO | 0.5 mol phenyltrimethoxysilane 0.5 mol methyltrimethoxysilane |
| M-14 | 1 mol DAMO | 0.4 mol methyltrimethoxysilane |
| M-15 | 1 mol AMEO | 1 mol isobutyltrimethoxysilane |
| M-16 | 1 mol AMEO | 1 mol methyltrimethoxysilane |

The invention claimed is:

1. A metal pigment comprising a metallic substrate and coating,
    wherein the coating comprises at least one first coating layer surrounding the metal pigment comprising at least one metal oxide, and at least one second coating layer a comprising at least one heteropolysiloxane,
    wherein the term metal oxide comprises at least one of metal oxides, metal oxide hydrates, metal hydroxides, and mixtures thereof,
    wherein the at least one heteropolysiloxane is prepared from components comprising at least one aminosilane component and at least one silane component selected from the group consisting of alkylsilanes, vinylsilanes, arylsilanes and mixtures thereof,
    wherein the heteropolysiloxane is applied in precondensed form to the at least one first surrounding coating layer, and
    wherein the heteropolysiloxane is the outermost coating layer of the metal pigment.

2. The metal pigment according to claim 1, wherein the heteropolysiloxane, before being applied to the metal pigment, has no more than 25% uncondensed groups.

3. The metal pigment according to claim 1, wherein the heteropolysiloxane is prepared from components comprising at least one aminosilane component and at least one alkylsilane component.

4. The metal pigment according to claim 1, wherein the metal pigment does not have a coating layer comprised of a thermoresponsive polymer.

5. The metal pigment according to claim 1, wherein the metal pigment is a flaky metal pigment.

6. The metal pigment according to claim 1, wherein the metal core of the metal pigment is a flaky metal pigment obtained by grinding with an $h_{50}$ value in the range of 20 to 100 nm, a shape factor of at least 200, and a relative thickness distribution of ΔH as claimed in formula (VII):

$$\Delta H = (h_{90} - h_{10})/h_{50} \qquad (VII)$$

in the range of 30 to 140%, or
a PVD metal pigment.

7. The metal pigment according to claim 1, wherein the metal in the metallic substrate comprises at least 60 wt. % of a ferromagnetic metal relative to the total weight of elemental metal in the metallic substrate.

8. The metal pigment according to claim 1, wherein the coating has an average thickness in the range of 20 nm to 160 nm.

9. The metal pigment according to claim 1, wherein the precondensed heteropolysiloxane is not applied to a surrounding coating layer comprising at least one metal oxide, which constitutes an oxidation product of the metal pigment and is thinner than 20 nm.

10. The metal pigment according to claim 1, wherein the heteropolysiloxane is prepared from components comprising at least 87 wt. % of silane monomer components relative to the total weight of the components used to prepare the heteropolysiloxanes, the silane monomer component being selected from the group consisting of aminosilanes, alkylsilanes, and mixtures thereof.

11. The metal pigment as claimed in one of according to claim 1, wherein at least 97 wt. % of the at least one aminosilane component used to prepare the heteropolysiloxane has 1 or 2 amino groups, relative to the total weight of the aminosilane components used to prepare the heteropolysiloxane.

12. The metal pigment according to claim 1, wherein at least 95 wt. % of the aminosilane components used to prepare the heteropolysiloxane, relative to the total weight of the aminosilane components used to prepare the heteropolysiloxane, are selected from the group of aminosilanes as defined by formula (I):

$$R^{a1}{}_{x1}R^{b1}{}_{y1}R^{c1}{}_{(4-x1-y1)}Si \qquad (I),$$

wherein
    $R^{a1}$, independently of each other, are selected from a functional group substituted with at least one nitrogen group, wherein the functional group is selected from the group composed of C1-C16 alkyl groups, C2-C8 alkenyl groups, C2-C8 alkinyl groups and phenyl groups, C7-C12 alkylaryl groups, C7-C12 arylalkyl groups, and mixtures thereof,
    $R^{b1}$, independently of each other, are selected from the group composed of unsubstituted branched or unbranched C1-C18 alkyl groups, preferably C1-C16 alkyl groups, C2-C8 alkenyl groups, C2-C8 alkinyl groups, phenyl groups, C7-C12 arylalkyl groups, C7-C12 alkylaryl groups, and mixtures thereof,
    $R^{c1}$, independently of each other, are selected from alkoxy groups, and
    $x1=$is 1, 2, or 3 and y1 is selected from the group of the whole numbers from 0 to (3−x1).

13. The metal pigment according to claim 1, wherein the heteropolysiloxane is prepared from at least 95 wt. % of the aminosilane components relative to the total weight of the aminosilane components used to prepare the heteropolysiloxane, and wherein the aminosilane components are selected from the group consisting of $(H_2N(CH_2)_3)Si(OCH_3)_3$ ((3-aminopropyl)(trimethoxy)silane, AMMO), $(H_2N(CH_2)_3Si(OC_2H_5)_3$ ((3-aminopropyl)(triethoxy)silane, AMEO), $(H_2N(CH_2)_2)NH(CH_2)_3)Si(OCH_3)_3$ ((N-(2-aminoethyl)-3-aminopropyl)(trimethoxy)silane, (DAMO)), (N-(2-aminoethyl)-3-aminopropyl)(triethoxy)silane, and mixtures thereof.

14. The metal pigment according to claim 1, wherein the heteropolysiloxane is prepared from alkylsilane components, which are selected to at least 95 wt. % relative to the total weight of the alkylsilane components used to prepare the heteropolysiloxane from the group composed of alkylsilanes having a structure as defined by formula (II)

$$R^{a2}_{x2}R^{b2}_{(4-x2)}Si \qquad (II),$$

wherein $R^{a2}$, independently of each other, are selected from the group of unsubstituted C1-C18 alkyl groups, $R^{b2}$, independently of each other, are selected from alkoxy groups, and x2 is selected from 1 and 2.

15. The metal pigment according to claim 14, wherein $R^{a2}$, independently of each other, are selected from the group of unsubstituted C1-C8 alkyl groups.

16. The metal pigment according to claim 1, wherein the heteropolysiloxane is prepared from no more than 10 wt. % of epoxysilane components relative to the total weight of the components used to prepare heteropolysiloxane.

17. The metal pigment according to claim 1, wherein alkoxy groups of the at least one heteropolysiloxane(s) are completely hydrolyzed.

18. The metal pigment according to claim 1, wherein the at least one metal oxide of the at least one first coating layer is selected from the group consisting of silicon oxide, aluminum oxide, boron oxide, zirconium oxide, cerium oxide, iron oxide, titanium oxide, chromium oxide, tin oxide, zinc oxide, molybdenum oxide, vanadium oxide, and oxide hydrates thereof, and hydroxides thereof, and mixtures thereof.

19. The metal pigment according to claim 1, wherein the metal oxide of the at least one first coating layer comprises at least one metal oxide is selected from the group consisting of silicon oxide, silicon hydroxide, silicon oxide hydrate, and mixtures thereof.

20. The metal pigment according to claim 1, wherein the at least one precondensed heteropolysiloxane is applied to the at least one first coating layer comprising at least one metal oxide.

21. The metal pigment according to claim 1, wherein the coating is in the range of 3 to 25 wt. % relative to the total weight of the coated metal pigment.

22. The metal pigment according to claim 1, wherein the metal in the metallic substrate comprises a metal selected from the group consisting of aluminum, copper, iron, zinc, tin, titanium, chromium, cobalt, silver, stainless steel, nickel, antimony, magnesium, zirconium, silicon, boron, mixtures thereof, and alloys thereof.

23. A method for the production of metal pigments with a metallic substrate and coating, wherein the method comprises:

provision of an optionally precoated metal pigment, production of at least one first coating layer surrounding the metal pigment, wherein the at least one first coating layer comprises at least one metal oxide on the optionally precoated metal pigment, and application of at least one second coating layer comprising at least one precondensed heteropolysiloxane to the at least one first coating layer comprising at least one metal oxide, wherein the term metal oxide comprises at least one of metal oxides, metal oxide hydrates, metal hydroxides, and mixtures thereof, wherein a coating layer comprising at least one precondensed heteropolysiloxane constitutes the outermost coating layer of the metal pigment, and wherein the at least one precondensed heteropolysiloxane is prepared from at least one aminosilane component and at least one silane component selected from the group of alkylsilanes, vinylsilanes, arylsilanes, and mixtures thereof.

24. The method according to claim 23, wherein a flaky metal pigment is prepared.

25. The method according to claim 23, wherein the production of the at least one first coating layer surrounding the metal pigment comprising at least one metal oxide is largely completed before the at least one second coating layer comprising least one heteropolysiloxane is applied.

26. The metal pigment according to claim 1, wherein the at least one precondensed heteropolysiloxane provides improvements in one or more application properties of metal pigments selected from the group consisting of improving the stability of metal pigments, improving the applicability and orientability of metal pigments in the wet coating or powder coating, reducing the tendency to agglomerate of metal pigments, improving the orientation of metal pigments in coating systems, and combinations thereof, wherein the metal pigments comprise at least one first coating layer comprising at least one metal oxide, wherein the term metal oxide comprises at least one of metal oxides, metal oxide hydrates, metal hydroxides, and mixtures thereof, and wherein the heteropolysiloxane is prepared from components comprising at least one aminosilane component and at least one silane component selected from the group consisting of alkylsilanes, vinylsilanes, arylsilanes, and mixtures thereof.

27. The metal pigment according to claim 26, wherein the heteropolysiloxane is applied as the outermost layer to a surrounding coating layer having at least one metal oxide.

28. A coating agent applied to at least a portion of an object, wherein the coating agent comprises the metal pigment according to claim 1.

29. An object, wherein the object comprises the metal pigment according to claim 1.

30. The metal pigment according to claim 14, wherein $R^{a2}$ of formula (II) is selected from the group consisting of unsubstituted C1-C16 alkyl groups.

31. An object, wherein the object comprises the coating agent according to claim 28.

* * * * *

UNITED STATES PATENT AND TRADEMARK OFFICE
CERTIFICATE OF CORRECTION

PATENT NO. : 9,624,378 B2  
APPLICATION NO. : 15/103484  
DATED : April 18, 2017  
INVENTOR(S) : Frank Hippmann et al.

Page 1 of 1

It is certified that error appears in the above-identified patent and that said Letters Patent is hereby corrected as shown below:

In the Claims

Column 63, Line 39, Claim 1, before "comprising" delete "a"

Column 64, Line 27, Claim 11, after "pigment" delete "as claimed in one of"

Column 64, Line 57, Claim 12, delete "x1=is" and insert -- x1 is --

Column 66, Line 25, Claim 25, before "least" insert -- at --

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*